(12) United States Patent
Nichol et al.

(10) Patent No.: US 8,917,962 B1
(45) Date of Patent: Dec. 23, 2014

(54) METHOD OF MANUFACTURING A LIGHT INPUT COUPLER AND LIGHTGUIDE

(75) Inventors: Anthony John Nichol, Boston, MA (US); Zane Coleman, Chicago, IL (US)

(73) Assignee: Flex Lighting II, LLC, Chicago, IL (US)

( * ) Notice: Subject to any disclaimer, the term of this patent is extended or adjusted under 35 U.S.C. 154(b) by 957 days.

(21) Appl. No.: 12/822,937

(22) Filed: Jun. 24, 2010

Related U.S. Application Data

(60) Provisional application No. 61/219,872, filed on Jun. 24, 2009, provisional application No. 61/325,266, filed on Apr. 16, 2010, provisional application No. 61/325,252, filed on Apr. 16, 2010, provisional application No. 61/325,269, filed on Apr. 16, 2010, provisional application No. 61/325,271, filed on Apr. 16, 2010, provisional application No. 61/325,272, filed on Apr. 16, 2010, provisional application No. 61/325,275, filed on Apr. 16, 2010, provisional application No. 61/325,277, filed on Apr. 16, 2010, provisional application No. 61/325,280, filed on Apr. 16, 2010, provisional application No. 61/325,282, filed on Apr. 16, 2010, provisional application No. 61/325,262, filed on Apr. 16, 2010, provisional application No. 61/235,270, filed on Apr. 16, 2010, provisional application No. 61/325,265, filed on Apr. 16, 2010, provisional application No. 61/225,300, filed on Jul. 14, 2009, provisional application No. 61/347,567, filed on May 24, 2010.

(51) Int. Cl.
*G02B 6/26* (2006.01)

(52) U.S. Cl.
USPC .................. 385/31; 362/296.01; 362/311.03

(58) Field of Classification Search
CPC ........................... G06B 6/0018; G06B 6/0076
USPC .......................... 385/31; 362/296.01, 311.03
See application file for complete search history.

(56) References Cited

U.S. PATENT DOCUMENTS 2,732,688 A   1/1956   Dickson
3,535,537 A  10/1970   Powell
(Continued)

FOREIGN PATENT DOCUMENTS

CN      1206661      2/1999
CN      1981221      6/2007
(Continued)

OTHER PUBLICATIONS

Buchner, Diplomarbeit: Kinetmatics of 3D Folded Structures for Nanostructured Origami, Department of Mechanical Engineering, 3D optical Systems Group, Massachusetts Institute of Technology, 2003.*

(Continued)

*Primary Examiner* — Peter Radkowski
(74) *Attorney, Agent, or Firm* — Quarles & Brady LLP

(57) ABSTRACT

In embodiments of this invention, light emitting devices comprise film-based lightguides comprising at least one light input coupler and an array of coupling lightguides that are folded or bent and disposed substantially above one another. The edges of the coupling lightguides may form part of a light input surface. The light emitting device may comprise more than one light input coupler and the film may be less than 500 microns in thickness. In embodiments of this invention, methods of manufacturing lightguides and light input couplers comprise steps that translate linear fold regions of the coupling lightguides relative to each other such that the coupling lightguides are bent or folded above each other. In other embodiments of this invention, an electroluminescent sign, light fixture, frontlight for a reflective display, or a backlight for a transmissive display comprises a lightguide and light input coupler comprising coupling lightguides.

23 Claims, 18 Drawing Sheets

(56) References Cited

U.S. PATENT DOCUMENTS

| | | | |
|---|---|---|---|
| 3,933,556 A | 1/1976 | Strack | |
| 4,026,693 A | 5/1977 | Sato | |
| 4,151,582 A * | 4/1979 | Grunberger | 362/622 |
| 4,228,267 A | 10/1980 | Higashizume et al. | |
| 4,389,698 A | 6/1983 | Cibie | |
| 4,422,719 A * | 12/1983 | Orcutt | 385/123 |
| 4,467,481 A | 8/1984 | Ginsburg | |
| 4,511,215 A | 4/1985 | Butler | |
| 4,551,985 A | 11/1985 | Kovach | |
| 4,667,481 A | 5/1987 | Watanabe et al. | |
| 4,824,194 A * | 4/1989 | Karasawa | 385/146 |
| 4,869,570 A * | 9/1989 | Yokohama et al. | 385/24 |
| 5,009,483 A * | 4/1991 | Rockwell, III | 385/116 |
| 5,106,181 A * | 4/1992 | Rockwell, III | 385/2 |
| 5,134,857 A | 8/1992 | Burley | |
| 5,165,187 A * | 11/1992 | Shahidi-Hamedani et al. | 40/547 |
| 5,315,673 A | 5/1994 | Stetter et al. | |
| 5,328,376 A * | 7/1994 | West | 439/65 |
| 5,379,539 A | 1/1995 | Hannula | |
| 5,390,436 A | 2/1995 | Ashall | |
| 5,506,929 A | 4/1996 | Tai et al. | |
| 5,544,268 A | 8/1996 | Bischel | |
| 5,596,671 A * | 1/1997 | Rockwell, III | 385/147 |
| 5,661,839 A | 8/1997 | Whitehead | |
| 5,737,472 A * | 4/1998 | Bernasson et al. | 385/123 |
| 5,786,665 A | 7/1998 | Ohtsuki et al. | |
| 5,789,710 A * | 8/1998 | Vanderpoel | 174/72 A |
| 5,818,554 A | 10/1998 | Hiyama et al. | |
| 5,888,324 A * | 3/1999 | Nakamura et al. | 156/55 |
| 5,938,991 A | 8/1999 | Pollock | |
| 6,049,641 A | 4/2000 | Deacon | |
| 6,068,381 A | 5/2000 | Ayres | |
| 6,208,788 B1 | 3/2001 | Nosov | |
| RE37,186 E | 5/2001 | Hill | |
| 6,224,269 B1 * | 5/2001 | Engstrand et al. | 385/59 |
| 6,315,433 B1 | 11/2001 | Cavello | |
| 6,490,090 B1 * | 12/2002 | Kumazawa et al. | 359/580 |
| 6,490,401 B2 | 12/2002 | Corneilissen et al. | |
| 6,498,882 B1 * | 12/2002 | Buckelew et al. | 385/114 |
| 6,577,359 B2 | 6/2003 | Ishihara | |
| 6,592,233 B1 | 7/2003 | Parikka | |
| 6,641,880 B1 | 11/2003 | Deyak et al. | |
| 6,700,054 B2 | 3/2004 | Cherney et al. | |
| 6,750,996 B2 | 6/2004 | Jagt et al. | |
| 6,825,895 B2 | 11/2004 | Nakano et al. | |
| 6,847,424 B2 | 1/2005 | Gotoh et al. | |
| 6,964,226 B2 | 11/2005 | Weiss et al. | |
| 7,004,610 B2 | 2/2006 | Yamashita et al. | |
| 7,108,414 B2 * | 9/2006 | McCollum et al. | 362/604 |
| 7,190,425 B2 | 3/2007 | Hong | |
| 7,237,396 B1 | 7/2007 | Nichol | |
| 7,406,245 B2 * | 7/2008 | Page et al. | 385/146 |
| 7,430,355 B2 | 9/2008 | Heikenfeld et al. | |
| 7,452,120 B2 | 11/2008 | Lee et al. | |
| 7,457,509 B2 | 11/2008 | Haenen et al. | |
| 7,490,967 B2 | 2/2009 | Syribeys | |
| 7,534,022 B2 | 5/2009 | Chou | |
| 7,542,635 B2 | 6/2009 | Coleman | |
| 7,565,054 B2 | 7/2009 | Rinko | |
| 7,582,000 B2 | 9/2009 | Pendlebury et al. | |
| 7,635,202 B2 | 12/2009 | Awabayashi | |
| 7,639,916 B2 * | 12/2009 | Fine | 385/131 |
| 7,729,941 B2 | 6/2010 | Zampini, II et al. | |
| 7,742,120 B2 * | 6/2010 | Bayley et al. | 349/58 |
| 7,750,886 B2 | 7/2010 | Sampsell | |
| 7,751,663 B2 | 7/2010 | Van Ostrand | |
| 7,773,849 B2 * | 8/2010 | Shani | 385/131 |
| 7,780,329 B2 * | 8/2010 | McCollum et al. | 362/606 |
| 8,013,831 B2 | 9/2011 | Sampsell | |
| 8,128,271 B2 | 3/2012 | Nichol | |
| 8,164,703 B2 | 4/2012 | Cheng | |
| 8,167,461 B2 * | 5/2012 | Nichol | 362/296.01 |
| 8,434,909 B2 | 5/2013 | Nichol et al. | |
| 2002/0015563 A1 * | 2/2002 | Murakami et al. | 385/53 |
| 2002/0028600 A1 * | 3/2002 | Kondo | 439/502 |

| | | | |
|---|---|---|---|
| 2003/0016930 A1 | 1/2003 | Inditsky | |
| 2003/0174953 A1 * | 9/2003 | Carnevale et al. | 385/39 |
| 2003/0198456 A1 | 10/2003 | Steiner | |
| 2004/0093779 A1 | 5/2004 | Blach | |
| 2004/0228104 A1 | 11/2004 | Birman | |
| 2005/0072032 A1 * | 4/2005 | McCollum et al. | 40/546 |
| 2005/0091886 A1 * | 5/2005 | Kim | 40/124.09 |
| 2005/0219148 A1 * | 10/2005 | Bayley et al. | 345/1.3 |
| 2006/0007108 A1 | 1/2006 | Utsumi et al. | |
| 2006/0008205 A1 | 1/2006 | Meir | |
| 2006/0024017 A1 * | 2/2006 | Page et al. | 385/146 |
| 2006/0061008 A1 | 3/2006 | Karner et al. | |
| 2006/0105149 A1 | 5/2006 | Donahue | |
| 2006/0120106 A1 | 6/2006 | Kuki et al. | |
| 2006/0207134 A1 | 9/2006 | Harry | |
| 2006/0215958 A1 | 9/2006 | Yeo et al. | |
| 2006/0269213 A1 | 11/2006 | Hwang et al. | |
| 2007/0002578 A1 | 1/2007 | Furusawa et al. | |
| 2007/0014110 A1 | 1/2007 | Itaya | |
| 2007/0031097 A1 | 2/2007 | Heikenfeld et al. | |
| 2007/0081360 A1 | 4/2007 | Bailey et al. | |
| 2007/0086712 A1 * | 4/2007 | Shani | 385/101 |
| 2007/0133935 A1 * | 6/2007 | Fine | 385/131 |
| 2007/0153545 A1 | 7/2007 | Lee | |
| 2007/0171330 A1 | 7/2007 | Hung | |
| 2007/0274091 A1 | 11/2007 | Inditsky | |
| 2007/0280593 A1 | 12/2007 | Brychell et al. | |
| 2007/0286562 A1 | 12/2007 | Inditsky | |
| 2008/0007965 A1 | 1/2008 | Kanade et al. | |
| 2008/0025039 A1 | 1/2008 | Guillermo | |
| 2008/0031579 A1 | 2/2008 | Enami et al. | |
| 2008/0037284 A1 | 2/2008 | Rudisill | |
| 2008/0043490 A1 | 2/2008 | Coleman et al. | |
| 2008/0048366 A1 * | 2/2008 | Durney | 264/339 |
| 2008/0148753 A1 | 6/2008 | Welker et al. | |
| 2008/0159693 A1 | 7/2008 | Chang | |
| 2008/0266863 A1 | 10/2008 | Rinko | |
| 2009/0059618 A1 | 3/2009 | Onikiri et al. | |
| 2009/0172978 A1 | 7/2009 | Steenblik et al. | |
| 2009/0173654 A1 | 7/2009 | Steenblik et al. | |
| 2009/0207632 A1 * | 8/2009 | McCollum et al. | 362/619 |
| 2009/0219734 A1 | 9/2009 | Sawada et al. | |
| 2009/0257215 A1 | 10/2009 | Gomi | |
| 2010/0014311 A1 | 1/2010 | Danieli | |
| 2010/0040986 A1 * | 2/2010 | Yamaguchi et al. | 430/321 |
| 2010/0067254 A1 * | 3/2010 | Ohta et al. | 362/606 |
| 2010/0156953 A1 | 6/2010 | Nevitt | |
| 2010/0214786 A1 | 8/2010 | Nichol | |
| 2010/0258419 A1 | 10/2010 | Chung et al. | |
| 2011/0032724 A1 | 2/2011 | Kinoshita | |
| 2011/0176325 A1 | 7/2011 | Sherman et al. | |
| 2011/0227487 A1 | 9/2011 | Nichol et al. | |
| 2011/0255303 A1 | 10/2011 | Nichol et al. | |
| 2011/0273901 A1 | 11/2011 | Nichol et al. | |
| 2011/0273906 A1 | 11/2011 | Nichol et al. | |
| 2011/0277361 A1 | 11/2011 | Nichol et al. | |
| 2011/0283576 A1 | 11/2011 | Nichol | |
| 2011/0286234 A1 | 11/2011 | Nichol | |
| 2012/0287674 A1 | 11/2012 | Nichol et al. | |
| 2013/0155723 A1 | 6/2013 | Coleman | |
| 2013/0208508 A1 | 8/2013 | Nichol et al. | |
| 2013/0250618 A1 | 9/2013 | Nichol et al. | |
| 2013/0314942 A1 | 11/2013 | Nichol et al. | |
| 2014/0049983 A1 | 2/2014 | Nichol et at | |
| 2014/0056028 A1 | 2/2014 | Nichol et al. | |
| 2014/0063853 A1 | 3/2014 | Nichol et at | |

FOREIGN PATENT DOCUMENTS

| | | |
|---|---|---|
| CN | 1985202 | 6/2007 |
| CN | 200962289 Y | 10/2007 |
| CN | 101140335 A1 | 3/2008 |
| EP | 284098 A1 | 9/1988 |
| EP | 1760502 A1 | 3/2007 |
| EP | 2103972 A1 | 9/2009 |
| GB | 198085 | 5/1923 |
| GB | 662514 | 12/1951 |
| JP | 2000 147218 A | 5/2000 |
| JP | 2001 141997 A | 5/2000 |

(56) References Cited

FOREIGN PATENT DOCUMENTS

| | | |
|---|---|---|
| JP | 2000141997 A | 5/2000 |
| JP | 2000147218 A | 5/2000 |
| JP | 2000-258633 | 9/2000 |
| JP | 2001 243818 | 9/2001 |
| JP | 2001243818 | 9/2001 |
| JP | 2001266626 A | 9/2001 |
| JP | 2004199967 A | 7/2004 |
| JP | 2005 340160 A1 | 8/2005 |
| JP | 2006-024561 | 1/2006 |
| JP | 2006 310112 A | 11/2006 |
| JP | 2006310112 A | 11/2006 |
| JP | 2007 053054 A1 | 3/2007 |
| WO | 2006131924 A2 | 12/2006 |
| WO | 2007081862 A2 | 7/2007 |
| WO | 2007123180 A1 | 11/2007 |
| WO | 2007143383 A2 | 12/2007 |
| WO | 2009 048863 | 4/2009 |
| WO | 2009048863 A1 | 4/2009 |
| WO | 2009084176 A1 | 7/2009 |
| WO | 2010005655 A2 | 1/2010 |
| WO | 2010085787 A1 | 7/2010 |
| WO | 2011130715 A2 | 10/2011 |
| WO | 2011130718 A2 | 10/2011 |
| WO | 2011130720 A2 | 10/2011 |
| WO | 2012016047 A1 | 2/2012 |
| WO | 2012068543 A1 | 5/2012 |
| WO | 2012088315 A1 | 6/2012 |
| WO | 2012122511 A1 | 9/2012 |
| WO | 2012158460 A1 | 11/2012 |

OTHER PUBLICATIONS

Nichol, A.J.; Barbastathis, G., "Sub-30nm alignment accuracy between layered photonic nanostructures using optimized nanomagnet arrays," Optical MEMs and Nanophotonics, 2008 IEEE/LEOS Internationall Conference on , vol., no., pp. 9,10, Aug. 11-14, 2008.*
Arora et al., "Membrane folding to achieve three-dimensional nanostructures: Nanopatterned silicon nitride folded with stressed chromium hinges," Appl. Phys. Lett. 88, 053108 (2006).*
European Search Report and Written Opinion for European Application No. EP08838526 dated Sep. 19, 2012 including English language translation and computer translation of JP 2005-340160.
International Search Report for International Application No. PCT/US2012/028578 dated Jun. 28, 2012.
International Search Report for International Application No. PCT/US2012/37317 dated Aug. 22, 2012.
Office Action dated Sep. 10, 2012 by the State Intellectual Property Office of China for Application No. CN201080005385.0.
Written Opinion of the International Searching Authority for International Application No. PCT/US2012/028578 dated Jun. 28, 2012.
Written Opinion of the International Searching Authority for International Application No. PCT/US2012/37317 dated Aug. 22, 2012.
Office action dated Dec. 6, 2012 by the USPTO for U.S. Appl. No. 13/088,231.
Notice of allowance dated Jan. 7, 2013 by the USPTO for U.S. Appl. No. 13/089,311.
Office action dated Mar. 5, 2013 by the Japan Patent Office for Application No. 2010-528972.
Office action dated May 15, 2012 by the USPTO for U.S. Appl. No. 12/682,387.
Office action dated Dec. 23, 2011 by the USPTO for U.S. Appl. No. 12/682,387.
Office action dated Jul. 23, 2012 by IP Australia for Application No. 2010206525.
Office action dated Nov. 22, 2012 by Instituto Mexicano de la Propiedad Industrial for Application MX/a/2011/007770.
Rizzo, et al., "The recovery after bending of polycarbonate sheets." Rheol. Acta 20, 133-138 (1981), ISSN 0035-4511, p. 138, in 1-2.
Lee et al., "LED Light Coupler Design for a Ultra Thin Light Guide," Journal of the Optical Society of Korea, vol. 11, No. 3, Sep. 2007, pp. 113-117.
Chien et al., "The study of LED uniform lightguide for liquid crystal display backlight applications," Tatung University white paper, Taipei, Taiwan, 2008.
Siitonen et al., "Coupling of light from an LED into a thin light guide by diffractive gratings," Applied Optics, vol. 43, No. 30, Oct. 2004, 5631-5636.
Murata et al., "Input couplers for thin light-guides and light-emitting diodes," Optical Engineering 47(2) , Feb. 2008, 027001-027007.
Kim, Joon-Sung, et al. "Stacked Polymeric Multimode Waveguide Arrays for Two-Dimensional Optical Interconnects", Journal of Lightwave Technology, p. 840, Mar. 2004.
Luminus Devices PhlatLight Data Sheet, PDS-001022 Rev 05, 2009.
International Search Report for International Application No. PCT/US08/79041, dated Jan. 8, 2009.
Cardinal Intellectual Property's search report (Work order 5874.5) including the results of a search for the features of the claims included in the U.S. patent application entitled "Light Coupling Into Films", inventor: Anthony Nichol, and having assigned U.S. Appl. No. 13/206,210. The foregoing U.S. patent application is a continuation of U.S. Appl. No. 12/682,387.
Cardinal Intellectual Property's supplemental search report dated Nov. 7, 2011 (Work order 5874.6) including the results of a search for the features of the claims included in the U.S. patent application entitled "Method of Manufacturing a Light Emitting Device", inventor: Anthony Nichol, and having assigned U.S. Appl. No. 13/210,622. The foregoing U.S. patent application is a continuation of U.S. Appl. No. 12/682,387.
International Search Report for International Application No. PCT/US11/032797 dated Nov. 7, 2011.
Written Opinion of the International Searching Authority for International Application No. PCT/US11/032797 dated Nov. 7, 2011.
International Search Report for International Application No. PCT/US11/032795 dated Nov. 16, 2011.
Written Opinion of the International Searching Authority for International Application No. PCT/US11/032795 dated Nov. 16, 2011.
International Search Report for International Application No. PCT/US11/032792 dated Nov. 17, 2011.
Written Opinion of the International Searching Authority for International Application No. PCT/US11/032792 dated Nov. 17, 2011.
Written Opinion of the International Searching Authority for International Application No. PCT/US08/079041 dated Jan. 8, 2009.
International Search Report for International Application No. PCT/US10/22066 dated Mar. 22, 2010.
Written Opinion of the International Searching Authority for International Application No. PCT/US10/22066 dated Mar. 22, 2010.
International Search Report for International Application No. PCT/US11/045730 dated Dec. 23, 2011.
Written Opinion of the International Searching Authority for International Application No. PCT/US11/045730 dated Dec. 23, 2011.
International Search Report for International Application No. PCT/US11/61528 dated Mar. 26, 2012.
Written Opinion of the International Searching Authority for International Application No. PCT/US11/61528 dated Mar. 26, 2012.
International Search Report for International Application No. PCT/US11/066596 dated May 7, 2012.
Written Opinion of the International Searching Authority for International Application No. PCT/US11/066596 dated May 7, 2012.
Cardinal Intellectual Property's search report dated Mar. 21, 2011 (Work Order 5874.6) including the results of a search for the features of the claims included in the U.S. patent application entitled "Method of Manufacturing a Light Emitting Device," inventor: Anthony Nichol. The foregoing U.S. Patent application is a continuation of U.S. Appl. No. 12/682,387.
Notice of allowance dated Jul. 29, 2013 by the China Patent Office for application No. 201080005385.0.
Office action dated Jun. 20, 2013 by Instituto Mexicano de la Propiedad Industrial for application MX/a/2012/012033.
Office action dated Jun. 26, 2013 by Instituto Mexicano de la Propiedad Industrial for application MX/a/2012/012034.
Office action dated Jun. 26, 2013 by Instituto Mexicano de la Propiedad Industrial for application MX/a/2012/012035.
Office action dated Oct. 15, 2013 by the China Patent Office for application No. 201180027439.8.

(56) References Cited

OTHER PUBLICATIONS

Office action dated Nov. 19, 2013 by the China Patent Office for application No. 201180027447.2.

U.S. Appl. No. 12/822,937, Information Disclosure Statement dated Jan. 24, 2014. List of patent applications, which share at least some common disclosure with the instant application, serve as a basis of priority for the instant application, and/or otherwise relate to the instant application.

Office action dated Dec. 3, 2013 by Japan Patent Office for application No. 2010-528972.

* cited by examiner

METHOD OF MANUFACTURING A LIGHT INPUT COUPLER AND LIGHTGUIDE

RELATED APPLICATIONS

This application claims the benefit of priority under 35 U.S.C. 119(e) to U.S. Provisional Application No. 61/219,872, titled "Method and apparatus for coupling light into a film along an edge," filed on Jun. 24, 2009; and U.S. Application No. 61/325,266, titled "Replaceable illuminated signage system for cooler doors," filed on Apr. 16, 2010; and U.S. Application No. 61/325,252 titled "Manufacturing device for ultra-low profile film lightguide," filed on Apr. 16, 2010; and U.S. Application No. 61/325,269 titled "Processing method for optical film lightguide and coupling system," filed on Apr. 16, 2010; and U.S. Application No. 61/325,271 titled "Method and apparatus for aligning lightguides in a coupling system," filed on Apr. 16, 2010; and U.S. Application No. 61/325,272 titled "Center aligned lighting configuration for ultra-thin LED backlight system for LCDs," filed on Apr. 16, 2010, and U.S. Application No. 61/325,275 titled "Low profile battery powered lightguide," filed on Apr. 16, 2010; and U.S. Application No. 61/325,277 titled "Method and apparatus for enhanced LCD backlight," filed on Apr. 16, 2010; and U.S. Application No. 61/325,280 titled "Film coupling system with light propagation modifications," filed on Apr. 16, 2010; and U.S. Application No. 61/325,282 titled "Heatsinking methods for compact film light guide systems," filed on Apr. 16, 2010; and U.S. Application No. 61/325,262 titled "Lamination method for a multi-layer optical lightguide film," filed on Apr. 16, 2010; and U.S. Application No. 61/325,270 titled "Edge-enhancement for film coupling technology," filed on Apr. 16, 2010; and U.S. Application No. 61/325,265 titled "Colored surface illumination by mixing dyes and scattering features into ink," filed on Apr. 16, 2010; and U.S. Application No. 61/225,300 titled "Method and apparatus for backlighting translucent displays," filed on Jul. 14, 2009; and U.S. Application No. 61/347,567, titled "Light emitting device comprising a film-based lightguide," filed on May 24, 2010; the entire contents of which are incorporated herein by reference.

FIELD OF THE INVENTION

This invention generally relates to light emitting devices such as light fixtures, backlights, frontlights, light emitting signs, passive displays, and active displays and their components and method of manufacture.

BACKGROUND OF THE INVENTION

Light emitting device devices are needed which are thinner, lighter weight, cheaper to manufacture, and scalable to large sizes.

BRIEF DESCRIPTION OF THE DRAWINGS

FIG. 29b is a perspective view of an embodiment of this invention for manufacturing an input coupler and lightguide comprising the step of translating one of the linear fold regions of FIG. 29a.

FIG. 30b is a perspective view of the light input coupler and lightguide of FIG. 30a.

DETAILED DESCRIPTION OF THE INVENTION

Figure 1:
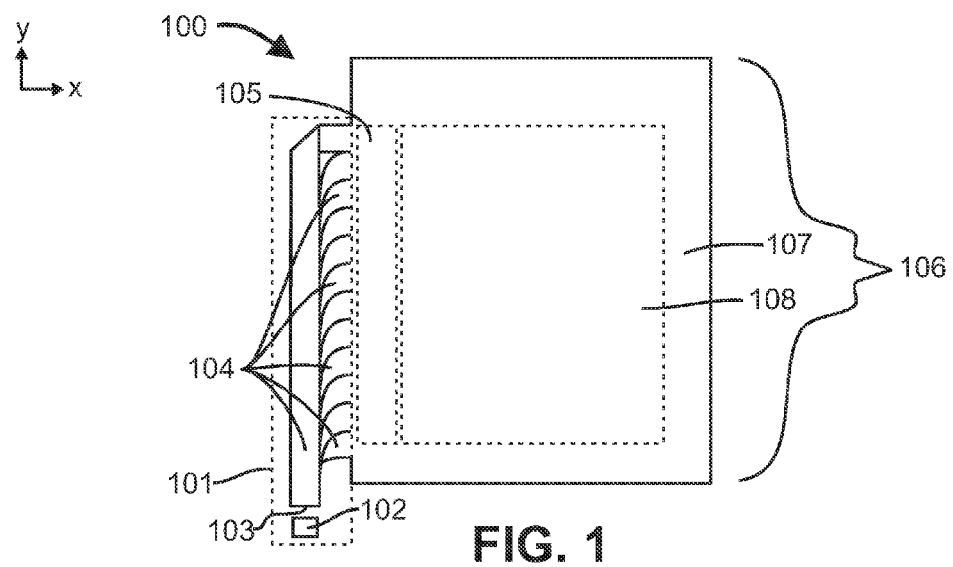
FIG. 1 is a top view of one embodiment of this invention a light emitting device comprising a light input coupler disposed on one side of a lightguide.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

DEFINITIONS

"Electroluminescent sign" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent signs can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Anisotropic scattering" refers to scattering of incident light into directions such that light has different intensities in different directions. It can also be referred to as asymmetric scattering, and can include the forward and backward directions, horizontal and vertical directions. In general, it refers to unequal scattered light intensities in two or more directions within a solid angle of 4 pi steradians.

"Optically coupled" as defined herein refers to coupling of two regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the regions or layers. Examples of "optical coupling" include lamination using an index-matched optical adhesive, coating a region or layer onto another region or layer, or hot lamination using applied pressure to join two or more layers or regions that have substantially close refractive indices. Thermal transferring is another method that can be used to optically couple two regions of material.

A "micro-body", "disperse phase domain," "gaseous void," and "particle" as referred to herein are substantially small regions of material or blend of materials. They also include gaseous or void regions defined by the absence of a solid material. The optical effects of light reflecting from, absorbing or passing through these regions may vary and the method of manufacturing these micro-bodies can affect the resulting material and optical characteristics. Methods of manufacturing these types of micro-bodies are known in the art and include, but are not limited to, dispersing materials in a matrix and extruding the blend into a film, blending the micro-bodies within an extruder and extruding a film, injection molding a blend of materials, stretching a blend in conditions where a region is in the solid state such that a void is created, photopolymerization and monomer diffusion.

A "spherical" or "symmetric" disperse phase domain includes gaseous voids, micro-bodies, or particles that substantially resemble a sphere. A spherical domain may contain surface incongruities and irregularities but has a generally circular cross-section in substantially all directions. A "spheroid" is a type of ellipsoid wherein two of the three axes are equal. An "asymmetric" domain is referred to here as an "ellipsoidal" domain wherein each of the three axes can be a different length. Typically, ellipsoidal domains resemble squashed or stretched spheres. "Non-spherical" domains include ellipsoidal domains and other domains defined by shapes that do not resemble a sphere such as those that do not have constant radii. For example, a non-spherical particle may have finger-like extensions within one plane (amoeba-like) and be substantially planar in a perpendicular plane. Also, fibrous domains are also non-spherical disperse phase domains that may have aspect ratios of 10:1, 100:1 or larger.

"Light guide" or "waveguide" refers to a region bounded by the condition that light rays traveling at an angle that is larger than the critical angle will reflect and remain within the region. In a light guide, the light will reflect or TIR (totally internally reflect) if the angle ($\alpha$) does not satisfy the total internal reflection condition where $n_1$ is the refractive index of the medium inside the light guide and $n_2$ is the refractive index of the medium outside the light guide. Typically, $n_2$ is air with a refractive index of $n \approx 1$, however, high and low refractive index materials can be used to achieve light guide regions. The light guide may comprise reflective components such as reflective films, aluminized coatings, surface relief features, and other components that can re-direct or reflect light. The light guide may also contain non-scattering regions such as substrates. Light can be incident on a lightguide region from the sides or below and surface relief features or light scattering domains, phases or elements within the region can direct light into larger angles such that it totally internally reflects or into smaller angles such that the light escapes the light guide. The light guide does not need to be optically coupled to all of its components to be considered as a light guide. Light may enter from any face (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a light guide may be a 5 micron region or layer of a film or it may be a 3 millimeter sheet comprising a light transmitting polymer.

"In contact" and "disposed on" are used generally to describe that two items are adjacent one another such that the whole item can function as desired. This may mean that additional materials can be present between the adjacent items, as long as the item can function as desired.

A "bend" as used herein refers to deformation or transformation in shape by the movement of a first region of an element relative to a second region. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers the second region. A fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment of this invention, a light emitting device comprises a first light source, a light input coupler, a light mixing region, and a lightguide comprising a light emitting region with a light extraction feature. In one embodiment of this invention, the first light source has a first light source emitting surface, the light input coupler comprises an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment of this invention, the lightguide is a film with light extracting features below a light emitting device output surface within the film and film is separated into coupling lightguide strips which are folded such that they form a light input coupler with a first input surface formed by the collection of edges of the coupling lightguides.

In one embodiment of this invention, the light emitting device has an optical axis defined herein as the direction of peak luminous intensity for light emitting from the light emitting surface of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are not symmetrical about an axis, the light emitting device optical axis is the angular weighted average of the luminous intensity output. For non-planar output surfaces, the light emitting device optical axis is evaluated in two orthogonal output planes and may be a constant direction in a first output plane and at a varying angle in a second output plane orthogonal to the first output plane. For example, light emitting from a cylindrical light emitting surface may have a peak angular luminous intensity (thus light emitting device optical axis) in a light output plane that does not comprise the curved output surface profile and the angle of luminous intensity could be substantially constant about a rotational axis around the cylindrical surface in an output plane comprising the curved surface profile, and thus the peak angular intensity is a range of angles. When the light emitting device has a light emitting device optical axis in a range of angles, the optical axis of the light emitting device comprises the range of angles or an angle chosen within the range.

Light Input Coupler

In one embodiment of this invention, a light input coupler comprises a plurality of coupling lightguides disposed to receive light emitting from light source and channel the light into a lightguide. In one embodiment of this invention, the plurality of coupling lightguides are strips cut from a lightguide film such that they remain un-cut on at least one edge but can be rotated or positioned (or translated) substantially independently from the lightguide to couple light through at least one edge or surface of the strip. In another embodiment of this invention, the plurality of coupling lightguides are not cut from the lightguide film and are separately optically coupled to the light source and the lightguide. In one embodiment of this invention, the light input coupler comprises at least one light source optically coupled to the coupling lightguides which join together in a light mixing region. In another embodiment of this invention, the light input coupler is a collection of strip sections cut from a region film which are arranged in a grouping such that light may enter through the edge of a grouping or arrangement of strips. In another embodiment of this invention, the light emitting device comprises a light input coupler comprising a core region of a core material and a cladding region or cladding layer of a cladding material on at least one face or edge of the core material with a refractive index less than the core material. In other embodiment of this invention, the light input coupler comprises a plurality of coupling lightguides wherein a portion of light from a light source incident on the face of at least one strip is directed into the lightguide such that it travels in a waveguide condition. The light input coupler may also comprise at least one of a strip folding device, a strip holding element, and an input surface optical element.

Light Source

In one embodiment of this invention, a light emitting device comprises at least one light source selected from a group of: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may comprise a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages comprises at least one LED die. In another embodiment of this invention, a light emitting device comprises a plurality of light sources within one package disposed to emit light toward a light input surface. In one embodiment of this invention, the light emitting device comprises 1, 2, 3, 4, 5, 6, 8, 9, 10, or more than 10 light sources.

In one embodiment of this invention, a light emitting device comprises at least one broadband light source that emits light in a wavelength spectrum larger than 100 nanometers. In another embodiment of this invention, a light emitting device comprises at least one narrowband light source that emits light in a narrow bandwidth less than 100 nanometers. In another embodiment of this invention, a light emitting device comprises at least one broadband light source that emits light in a wavelength spectrum larger than 100 nanometers or at least one narrowband light source that emits light in a narrow bandwidth less than 100 nanometers. In one embodiment of this invention a light emitting device comprises at least one narrowband light source with a peak wavelength within a range selected from the group of 300 nm-350 nm, 350 nm-400 nm, 400 nm-450 nm, 450 nm-500 nm, 500 nm-550 nm, 550 nm-600 nm, 600 nm-650 nm, 650 nm-700 nm, 700 nm-750 nm, 750 nm-800 nm, and 800 nm-1200 nm. The light sources may be chosen to match the spectral qualities of red, green and blue such that collectively when used in a light emitting device used as a display, the color gamut area is at least one selected from the group of 70% NTSC, 80% NTSC, 90% NTSC, 100% NTSC, and 60%, 70%, 80%, 90%, and 95% of the visible CIE u' v' color gamut of a standard viewer. In one embodiment of this invention, at least one light source is a white LED package comprising a red, green, and blue LED.

In another embodiment of this invention, at least two light sources with different colors are disposed to couple light into the lightguide through at least one light input coupler. In another embodiment of this invention, a light emitting device comprises at least three light input couplers, at least three light sources with different colors (red, green and blue for example) and at least three lightguides. In another embodiment of this invention, a light source further comprises at least one selected from the group of reflective optic, reflector, reflector cup, collimator, primary optic, secondary optic, collimating lens, compound parabolic collimator, lens, reflective region and input coupling optic. The light source may also comprise an optical path folding optic such as a curved reflector that can enable the light source (and possibly heat-sink) to be oriented along a different edge of the light emitting device. The light source may also comprise a photonic bandgap structure, nano-structure or other three-dimensional arrangement that provides light output with an angular FWHM less than one selected from the group of 120 degrees, 100 degrees, 80 degrees, 60 degrees, 40 degrees, and 20 degrees.

In another embodiment of this invention, a light emitting device comprises a light source emitting light in an angular full-width at half maximum intensity of less than one selected from 150 degrees, 120 degrees, 100 degrees, 80 degrees, 70 degrees, 60 degrees, 50 degrees, 40 degrees, 30 degrees, 20 degrees, and 10 degrees. In another embodiment of this invention, the light source further comprises at least one of a primary optic, secondary optic, and photonic bandgap region and the angular full-width at half maximum intensity of the light source is less than one selected from 150 degrees, 120 degrees, 100 degrees, 80 degrees, 70 degrees, 60 degrees, 50 degrees, 40 degrees, 30 degrees, 20 degrees, and 10 degrees.

Wavelength Conversion Material

In another embodiment of this invention, the LED is a blue or ultraviolet LED combined with a phosphor. In another embodiment of this invention, a light emitting device comprises a light source with a first activating energy and an wavelength conversion material which converts a first portion of the first activating energy into a second wavelength different than the first. In another embodiment, the light emitting device comprises at least one wavelength conversion material selected from the group of a fluorophore, phosphor, a fluorescent dye, an inorganic phosphor, photonic bandgap material, a quantum dot material, a fluorescent protein, a fusion protein, a fluorophores attached to protein to specific functional groups (such as amino groups (Active ester, Carboxylate, Isothiocyanate, hydrazine), carboxyl groups (carbodiimide), thiol (maleimide, acetyl bromide), azide (via click chemistry or non-specifically (glutaraldehyde))), quantum dot fluorophores, small molecule fluorophores, aromatic fluorophores, conjugated fluorophores, a fluorescent dye such as Xanthene derivatives (fluorescein, rhodamine, Oregon green, eosin, Texas red), Cyanine derivatives (cyanine, indocarbocyanine, oxacarbocyanine, thiacarbocyanine and merocyanine), Naphthalene derivatives (dansyl and prodan derivatives), Coumarin derivatives, oxadiazole derivatives (pyridyloxazole, nitrobenzoxadiazole and benzoxadiazole), Pyrene derivatives: (cascade blue), BODIPY (Invitrogen), Oxazine derivatives (Nile red, Nile blue, cresyl violet, oxazine 170), Acridine derivatives (proflavin, acridine orange, acridine yellow etc), Arylmethine derivatives (auramine, crystal violet, malachite green), CF dye (Biotium), Alexa Fluor (Invitrogen), DyLight Fluor (Thermo Scientific, Pierce), Atto and Tracy (Sigma Aldrich), FluoProbes (Interchim), Tetrapyrrole derivatives (porphin, phtalocyanine, bilirubin), other fluorescent dye such as cascade yellow, azure B, acridine orange, DAPI, Hoechst 33258, lucifer yellow, piroxicam, quinine and anthraqinone, squarylium, oligophenylenes, scintillators, phosphors such as Cadmium sulfide, (Ca,Sr)S:Bi, ZnS:Cu, rare-earth doped Sialons, Europium (II)-doped β-SiAlON, CaAlSiN3-based (CASN), Cerium (III)-doped YAG (YAG:Ce3+, or Y3Al5O12:Ce3+), ZnS:Cu, Al, Zn2SiO4:Mn (Willemite), ZnS:Ag+(Zn, Cd)S:Ag, ZnS:Ag+ZnS:Cu+Y2O2S:Eu, ZnO:Zn, KCl, ZnS:Ag, Cl or ZnS:Zn, (KF,MgF2):Mn, (Zn, Cd)S:Ag or (Zn, Cd)S:Cu, Y2O2S:Eu+Fe2O3, ZnS:Cu,Al, ZnS:Ag+Co-on-Al2O3, (KF, MgF2):Mn, (Zn, Cd)S:Cu, Cl, ZnS:Cu or ZnS:Cu,Ag, MgF2:Mn, (Zn,Mg)F2:Mn, Zn2SiO4:Mn,As, ZnS:Ag+(Zn, Cd)S:Cu, Gd2O2S:Tb, Y2O2S:Tb, Y3Al5O12:Ce, Y2SiO5:Ce, Y3Al5O12:Tb, ZnS:Ag,Al, ZnS:Ag, ZnS:Cu,Al or ZnS:Cu, Au,Al, (Zn,Cd)S:Cu,Cl+(Zn, Cd)S:Ag,Cl, Y2SiO5:Tb, Y2OS:Tb, Y3(Al,Ga)5O12:Ce, Y3(Al,Ga)5O12:Tb, InBO3:Tb, InBO3:Eu, InBO3:Tb+InBO3:Eu, InBO3:Tb+InBO3:Eu+ZnS:Ag, (Ba,Eu)Mg2Al16O27, (Ce,Tb)MgAl11O19, BaMgAl10O17:Eu,Mn, BaMg2Al16O27:Eu(II), BaMgAl10O17:Eu,Mn, BaMg2Al16O27:Eu(II),Mn(II), Ce0.67Tb0.33MgAl11O19:Ce,Tb, Zn2SiO4:Mn,Sb2O3, CaSiO3:Pb,Mn, CaWO4 (Scheelite), CaWO4:Pb, MgWO4, (Sr,Eu,Ba,Ca)5(PO4)3Cl, Sr5Cl(PO4)3:Eu(II), (Ca,Sr,Ba)3(PO4)2Cl2:Eu, (Sr,Ca,Ba)10(PO4)6Cl2:Eu, Sr2P2O7:Sn(II), Sr6P5BO20:Eu, Ca5F(PO4)3:Sb, (Ba,Ti)2P2O7:Ti, 3Sr3(PO4)2.SrF2:Sb,Mn, Sr5F(PO4)3:Sb,Mn, Sr5F(PO4)3:Sb,Mn, LaPO4:Ce,Tb, (La,Ce,Tb)PO4, (La,Ce,Tb)PO4:Ce,Tb,Ca3(PO4)2.CaF2:Ce,Mn, (Ca,Zn,Mg)3(PO4)2:Sn, (Zn,Sr)3(PO4)2:Mn, (Sr,Mg)3(PO4)2:Sn, (Sr,Mg)3(PO4)2:Sn(II), Ca5F(PO4)3:Sb,Mn, Ca5(F,Cl)(PO4)3:Sb,Mn, (Y,Eu)2O3, Y2O3:Eu(III), Mg4(F)GeO6:Mn, Mg4(F)(Ge,Sn)O6:Mn, Y(P,V)O4:Eu, YVO4:Eu, Y2O2S:Eu, 3.5MgO.0.5MgF2.GeO2:Mn, Mg5As2O11:Mn, SrAl2O7:Pb, LaMgAl11O19:Ce, LaPO4:Ce, SrAl12O19:Ce, BaSi2O5:Pb, SrFB2O3:Eu(II), SrB4O7:Eu, Sr2MgSi2O7:Pb, MgGa2O4:Mn(II), or other wavelength conversion material.

In one embodiment of this invention, the light source comprises a semiconductor light emitter such as an LED and a wavelength conversion material that converts a portion of the light from the emitter to a shorter or longer wavelength. In another embodiment of this invention, at least one of the light input coupler, cladding region, coupling lightguide, input surface optic, coupling optic, light mixing region, lightguide, light extracting region, and light emitting surface comprises a wavelength conversion material.

Light Input Coupler Input Surface

In one embodiment of this invention, the light input coupler comprises a collection of coupling lightguides with a plurality of edges forming a light coupler input surface. In another embodiment of this invention, an optical element is disposed between the light source and at least one coupling lightguide wherein the optical element receives light from the light source through a light coupler input surface. In some embodiments of this invention, the input surface is substantially polished, flat, or optically smooth such that light does not scatter forwards or backwards from pits, protrusions or other rough surface features. In some embodiments of this invention, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. In another embodiment of this invention, the input surface is curved to refract light more light received from the light source into angles within the lightguide greater than the critical angle within the lightguide than would occur with a flat input surface. In another embodiment of this invention, the optical element comprises radial or linear Fresnel lens features which refract incident light. In another embodiment of this invention, the optical element comprises a refractive-TIR hybrid Fresnel lens (such as one having a low F/# of less than 1.5). In a further embodiment of this invention, the optical element is a reflective and refractive optical element. In one embodiment of this invention, the light input surface may be formed by machine, cutting, polishing, forming, molding, or otherwise removing or adding material to the lightguide couplers to create a smooth, curved, rounded, concave, convex, rigged, grooved, micro-structured, nano-structured, or predetermined surface shape. In another embodiment of this invention, the light input coupler comprises an optical element designed to collect light from the light source and increase the uniformity. Such optical elements can include fly's eye lenses, microlens arrays, integral lenses, lenticular lenses holographic or other diffusing elements with micro-scale features or nano-scale features independent of how they were formed. In another embodiment of this invention, the light input coupler is optically coupled to at least one lightguide and at least one light source. In another embodiment of this invention, the optical element is at least one selected from the group of diffractive element, holographic element, lenticular element, lens, planar window, refractive element, reflective element, waveguide coupling element, anti-reflection coated element, planar element, formed portion or region of at least one coupling lightguide, optical adhesive, UV cured adhesive, and pressure sensitive adhesive. The light coupler or an element therein may be comprised of at least one light transmitting material When light traveling in air is incident to a planar light input surface of a light transmitting material with a refractive index higher than 1.3 at high angles from the normal to the interface, for example, much of the light is reflected from the air-input surface interface. One method of reducing the loss of light due to reflection is to optically couple the input surface of the light input coupler to the light source. Another method to reduce this loss is to use a collimation optic or optic that directs some of the light output from the light source into angles closer to the optical axis of the light source. The collimating optic, or optical element, may be optically coupled to the light source, the coupling lightguides, an adhesive, or other optical element such that it directs more light into the coupling lightguides into a total internal reflection condition within the coupling lightguides. In another embodiment of this invention, the light input surface comprises a recessed cavity or concave region such that the percentage of light from a light source disposed adjacent to the cavity or concave region that is reflected from the input surface is less than one selected from the group of 40%, 30%, 20%, 10%, 5%, 3%, and 2%.

In another embodiment of this invention, the total input area ratio, defined as the total area of the input surface of all of the light input couplers of the light emitting device receiving more than 5% of the total light flux from any light source divided by the total light emitting surface areas of the light sources is greater than one selected from the group of 0.9, 1, 1.5, 2, 4, and 5. In another embodiment of this invention, the individual input area ratio, defined as the area of the input surface of a light input coupler of the light emitting device receiving more than 5% of the total light flux received from a light source divided by the light emitting surface area of the light source is greater than one selected from the group of 0.9, 1, 1.5, 2, 4, and 5. The individual input area ratios of a light emitting device may vary for different input couplers and the individual input area ratio for a particular input coupler may be greater or less than the total input area ratio.

Stacked Strips or Segments of Film Forming a Light Input Coupler

In one embodiment of this invention, the light input coupler is region of a film that comprises the lightguide and the light input coupler which comprises strip sections of the film which form coupling lightguides that are grouped together to form a light coupler input surface. The coupling lightguides may be grouped together such the edges opposite the lightguide region are brought together to form an input surface comprising of their thin edges. A planar input surface for a light input coupler can provide beneficial refraction to redirect a portion of the input light from the surface into angles such that it travels at angles greater than the critical angle for the lightguide. In another embodiment of this invention, a substantially planar light transmitting element is optically coupled to the grouped edges of coupling lightguides. One or more of the edges of the coupling lightguides may be polished, melted, adhered with an optical adhesive, solvent welded, or otherwise optically coupled along a region of the edge surface such that the surface is substantially polished, smooth, flat, or substantially planarized. This polishing can aide to reduce light scattering, reflecting, or refraction into angles less than the critical angle within the coupling lightguides or backwards toward the light source. The light input surface may comprise a surface of the optical element, the surface of an adhesive, the surface of more than one optical element, the surface of the edge of one or more coupling lightguides or a combination of one or more of the aforementioned surfaces. The light input coupler may also comprise an optical element that has an opening or window wherein a portion of light from a light source may directly pass into the coupling lightguides without passing through the optical element. The light input coupler or an element or region therein may also comprise a cladding material or region.

Guide Device for Coupling the Light Source to the Light Input Surface of the Light Input Coupler The light input coupler may also comprise a guide that comprises a mechanical, electrical, manual, guided, or other system or component to facility the alignment of the light source in relation to the light input surface. The guide device may comprise an opening or window and may physically or optically couple together one or more selected from the group of light source (or component physically attached to a light source), a light input coupler, coupling lightguide, housing, and electrical, thermal, or mechanical element of the light emitting device. In one embodiment of this device an optical element comprises one or more guides disposed to physically couple or align the light source (such as an LED strip) to the optical element or coupling lightguides. In another embodiment of this invention, the optical element comprises one or more guide regions disposed to physically couple or align the optical element to the light input surface of the input coupler. The guide may comprise a groove and ridge, hole and pin, male and corresponding female component, or a fastener. In one embodiment of this invention, the guide comprises a fastener selected from the group of a batten, button, clamp, clasp, clip, clutch (pin fastener), flange, grommet, anchor, nail, pin, peg, clevis pin, cotter pin, linchpin, R-clip, retaining ring, circlip retaining ring, e-ring retaining ring, rivet, screw anchor, snap, staple, stitch, strap, tack, threaded fastener, captive threaded fasteners (nut, screw, stud, threaded insert, threaded rod), tie, toggle, hook-and-loop strips, wedge anchor, and zipper.

Coupling Lightguide

In one embodiment of this invention, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments of this invention, may serve to geometrically transform a portion of the flux from a light source from a first shaped area to a second shaped area different from the first. In an example of this embodiment, the light input surface of the light input coupler formed from the edges of folded strips (coupling lightguides) of a planar film has a the dimensions of a rectangle that is 3 millimeters by 2.7 millimeters and the light input coupler couples light into a planar section of a film in the light mixing region with a cross-sectional dimensions of 40.5 millimeters by 0.2 millimeters. In one embodiment of this invention, the input area of the light input coupler is substantially the same as the cross-sectional area of the light mixing region or lightguide disposed to receive light from one or more coupling lightguides. In another embodiment of this invention, the total transformation ratio, defined as the total light input surface area of the light input couplers receiving more than 5% of the light flux from a light source divided by the total cross-sectional area of the light mixing region or lightguide region disposed to receive light from the coupling lightguides is one selected from the group of 1 to 1.1, 0.9 to 1, 0.8 to 0.9, 0.7 to 0.8, 0.6 to 0.7, 0.5 to 0.6, 0.5 to 0.999, 0.6 to 0.999, 0.7 to 0.999, less than 1, greater than 1, equal to 1. In another embodiment of this invention, the input surface area of each light input coupler corresponding to the edges of coupling lightguides disposed to receive light from a light source is substantially the same as the cross-sectional area of the light mixing region or lightguide region disposed to receive light from each corresponding coupling lightguides. In another embodiment of this invention, the individual transformation ratio, defined as the total light input area of a single light input surface of a light input coupler (corresponding to the edges of coupling lightguides) divided by the total cross-sectional area of the light mixing region or lightguide disposed to receive light from the corresponding coupling lightguides is one selected from the group of 1 to 1.1, 0.9 to 1, 0.8 to 0.9, 0.7 to 0.8, 0.6 to 0.7, 0.5 to 0.6, 0.5 to 0.999, 0.6 to 0.999, 0.7 to 0.999, less than 1, greater than 1, equal to 1.

In another embodiment of this invention, a coupling lightguide is disposed to receive light from at least one input surface with a first input surface longest dimension and transmit the light to a lightguide with a light emitting surface with a light emitting surface longest dimension larger than the first input surface largest dimension. In another embodiment of this invention, the coupling lightguide is a plurality of lightguides disposed to collect light from at least one light source through edges or surfaces of the coupling lightguides and direct the light into the surface, edge, or region of a lightguide comprising a light emitting surface. In one embodiment of this invention, the coupling lightguides provide light channels whereby light flux entering the coupling lightguides in a first cross sectional area can be redistributed into a second cross sectional area different from the first cross sectional area at the light output region of the light input coupler. The light exiting the light input coupler or light mixing region may then travel to a lightguide or lightguide region which may be a separate region of the same element (such as a separate region of the same film). In one embodiment of this invention, a light emitting device comprises a light source and a film processed to form a lightguide region with light extraction features, a light mixing region wherein light from a plurality of sources, light input couplers, or coupling lightguides mixes before entering into the lightguide region. The coupling lightguides, light mixing region, and light extraction features may all be formed from, on, or within the same film and they may remain interconnected to each other through one or more regions.

In one embodiment of this invention, at least one coupling lightguide is disposed to receive light from a plurality of light sources of at least two different colors, wherein the light received by the coupling lightguide is pre-mixed angularly, spatially, or both by reflecting through the coupling lightguide and the 9-spot sampled spatial color non-uniformity, $\Delta u'v'$, of the light emitting surface of the light emitting device measured on the 1976 u', v' Uniform Chromaticity Scale as described in VESA Flat Panel Display Measurements Standard version 2.0, Jun. 1, 2001 (Appendix 201, page 249) is less than one selected from the group of 0.2, 0.1, 0.05, 0.01, and 0.004 when measured using a spectrometer based spot color meter.

Coupling Lightguide Folds and Bends

In one embodiment of this invention, light emitting device comprises a light mixing region disposed between a lightguide and strips or segments cut to form coupling lightguides, whereby a collection of edges of the strips or segments are brought together to form a light input surface of the light input coupler disposed to receive light from a light source. In one embodiment of this invention, the light input coupler comprises a coupling lightguide wherein the coupling lightguide comprises at least one fold or bend in one plane such that at least one edge overlaps another edge. In another embodiment of this invention, the coupling lightguide comprises a plurality of folds or bends wherein edges of the coupling lightguide can be abutted together in region such that the region forms a light input surface of the light input coupler of the light emitting device.

In one embodiment of this invention, a light emitting device comprises a light input coupler comprising at least one coupling lightguide that is bent or folded such that light traveling in a first direction within the lightguide before the bend or fold is traveling in a second direction different that the first within the lightguide after the bend or fold.

In one embodiment of this invention, at least one coupling lightguide comprises a strip or segment that is bent or folded to radius of curvature of less than 75 times the thickness of the strip or segment. In another embodiment of this invention, at least one coupling lightguide comprises a strip or segment that is bended or folded to radius of curvature greater than 10 times the times the thickness of the strip or segment. In another embodiment of this invention, at least one coupling lightguide is bent or folded such that longest dimension in a cross-section through the light emitting device or coupling lightguide in at least one plane is less than without the fold or bend. Segments or strips may be bent or folded in more than one direction or region and the directions of folding or bending may be different between strips or segments.

Optical Efficiency of the Light Input Coupler

In an embodiment of this invention, the optical efficiency of the light input coupler, defined as the percentage of the original light flux from the light source that passes through the light input coupler light input surface and out of the light input coupler into a mixing region, lightguide, or light emitting surface, is greater than one selected from the group of 50%, 60%, 70%, 80%, 90%, and 95%. The degree of collimation can affect the optical efficiency of the light input coupler.

Collimation of Light Entering the Coupling Lightguides

In one embodiment of this invention, at least one of the light source, light source primary optic, light source secondary optic, light input surface, optical element disposed between the light source and at least one coupling lightguide, shape of the coupling lightguide, shape of the mixing region, shape of the light input coupler, and shape of an element or region of the light input coupler provides light that within the coupling lightguide with an angular full-width of half maximum intensity chosen from the group of less than 80 degrees, less than 70 degrees, less than 60 degrees, less than 50 degrees, less than 40 degrees, less than 30 degrees, less than 20 degrees, less than 10 degrees, between 10 degrees and 30 degrees, between 30 degrees and 50 degrees, between 10 degrees and 60 degrees and between 30 degrees and 80 degrees. In some embodiments of this invention, light which is highly collimated (FWHM of about 10 degrees or less) does not mix spatially within a lightguide region with light extracting features such that there may be dark bands or regions of non-uniformity. In this embodiment, the light, however, will be efficiently coupled around curves and bends in the lightguide relative to less collimated light and in some embodiments of this invention, the high degree of collimation enables small radii of curvature and thus a smaller volume for the fold or bend in a light input coupler and resulting light emitting device. In another embodiment of this invention, a significant portion of light from a light source with a low degree of collimation (FWHM of about 120 degrees) within the coupling lightguides will be reflected into angles such that it exits the coupling lightguides in regions near bends or folds with small radii of curvature. In this embodiment, the spatial light mixing (providing uniform color or luminance) of the light from the coupling lightguides in the lightguide in areas of the light extracting regions is high and the light extracted from lightguide will appear to have a more uniform angular or spatial color or luminance uniformity.

In another embodiment of this invention, one or more coupling lightguides is bent or folded and the optical axis of the light source is oriented at a first redirection angle to the light emitting device optical axis, oriented at a second redirection angle to a second direction orthogonal to the light emitting device optical axis, and oriented at a third redirection angle to a third direction orthogonal to the light emitting device optical axis and the second direction. In another embodiment of this invention, the first redirection angle, second redirection angle, or third redirection angle is about one selected from the group of 0 degrees, 45 degrees, 90 degrees, 135 degrees, 180 degrees, 0-90 degrees, 90-180 degrees, and 0-180 degrees.

Each light source may be oriented at a different angle. For example, two light sources along one edge of a film with a strip-type light input coupler can be oriented directly toward each other (the optical axes are 180 degrees apart). In another example, the light sources can be disposed in the center of an edge of a film and oriented away from each other (the optical axes are also 180 degrees apart).

The segments or strips may be once folded, for example, with the strips oriented and abutting each other along one side of a film such that the light source optical axis is in a direction substantially parallel with the film plane or lightguide plane. The strips or segments may also be folded twice, for example, such that the light source optical axis is substantially normal to the film plane or normal to the waveguide.

In one embodiment of this invention, the fold or bend in the coupling lightguide, region or segment of the coupling lightguide or the light input coupler has a crease or radial center of the bend in a direction that is at a bend angle relative to the light source optical axis. In another embodiment of this invention, the bend angle is one selected from the group of 0 degrees, 45 degrees, 90 degrees, 135 degrees, 180 degrees, 0-90 degrees, 90-180 degrees, and 0-180 degrees.

The bend or fold may also be of the single directional bend (such as vertical type, horizontal type, 45 degree type or other single angle) or the bend or fold or be multi-directional such as the twisted type wherein the strip or segment is torsional. In one embodiment of this invention, the strip, segment or region of the coupling lightguide is simultaneously bent in two directions such that the strip or segment is twisted.

In another embodiment of this invention, the light input coupler comprises at least one light source disposed to input light into the edges of strips cut into a film wherein the strips are twisted and aligned with their edges forming an input surface and the light source output surface area is substantially parallel with the edge of the coupling lightguide, lightguide, lightguide region, or light input surface or the optical axis of the light source is substantially perpendicular to the edge of the coupling lightguide, lightguide, lightguide region, or light input surface. In another embodiment of this invention, multiple light sources are disposed to couple light into a light input coupler comprising strips cut into a film such that at least one light source has an optical axis substantially parallel to the lightguide edge, coupling lightguide lateral edge or the nearest edge of the lightguide region. In another embodiment of this invention, two groupings of coupling lightguides are folded separately toward each other such that the separation between the ends of the strips is substantially the thickness of the central strip between the two groupings and two or more light sources are disposed to direct light in substantially opposite directions into the strips. In one embodiment of this invention, two groupings of coupling lightguides are folded separately toward each other such and then both folded in a direction away from the film such that the edges of the coupling lightguides are brought together to form a single light input surface disposed to receive light from at least one light source. In this embodiment, the optical axis of the light source may be substantially normal to the substantially planar film-based lightguide.

In one embodiment of this invention, two opposing stacks of coupling lightguides from the same film are folded and recombined at some point away from the end of the coupling apparatus. This can be accomplished by splitting the film into one or more sets of two bundles, which are folded towards each other. In this embodiment, the bundles can be folded at an additional tight radius and recombined into a single stack. The stack input can further be polished to be a flat single input surface or optically coupled to a flat window and disposed to receive light from a light source.

In one embodiment of this invention, the combination of the two film stacks is configured to reduce the overall volume. In one embodiment of this invention, the film is bent or folded to a radius of curvature greater than 10× the film thickness order to retain sufficient total internal reflection for a first portion of the light traveling within the film.

In another embodiment of this invention, the light input coupler comprises at least one coupling lightguide wherein the coupling lightguide comprises an arcuate reflective edge and is folded multiple times in a fold direction substantially parallel to the lightguide edge or nearest edge of the lightguide region wherein multiple folds are used to bring sections of an edge together to form a light input surface with a smaller dimension. In another embodiment of this invention, the light coupling lightguide, the strips, or segments have collimating sections cut from the coupling lightguide which directs light substantially more parallel to the optical axis of the light source. In one embodiment of this invention, the collimating sections of the coupling lightguide, strips or segments direct light substantially more parallel to the optical axis of the light source in at least one plane substantially parallel to the lightguide or lightguide region.

In a further embodiment of this invention, a light input coupler comprises at least one coupling lightguide with an arc, segmented arc, or other light redirect edge cut into a film and the light input coupler comprises a region of the film rolled up to form a spiral or concentric-circle-like light input edge disposed to receive light from a light source.

Coupling Lightguide Lateral Edges

In one embodiment of this invention, the lateral edges, defined herein as the edges of the coupling lightguide which do not substantially receive light directly from the light source and are not part of the edges of the lightguide. The lateral edges of the coupling lightguide receive light substantially only from light traveling within the coupling light guide. In one embodiment of this invention, the lateral edges are at least one of uncoated, coated with a reflecting material, disposed adjacent to a reflecting material, and cut with a specific cross-sectional profile. The lateral edges may be coated, bonded to or disposed adjacent to a specularly reflecting material, partially diffusely reflecting material, or diffuse reflecting material. In one embodiment of this invention, the edges are coated with a specularly reflecting ink comprising nano-sized or micron-sized particles or flakes which substantially reflect the light in a specular manner when the coupling lightguides are brought together from folding or bending. In another embodiment of this invention, a light reflecting element (such as a multi-layer mirror film with high reflectivity such as 3M ESR film) is disposed near the lateral edge of at least one region of a coupling lightguide to receive light from the edge and reflect it and direct it back into the lightguide. In another embodiment of this invention, the lateral edges are rounded and the percentage of incident light diffracted out of the lightguide from the edge is reduced. One method of achieving rounded edges is by using a laser to cut the strips, segments or coupling lightguide region from a film and edge rounding through control of the processing parameters (speed of cut, frequency of cut, laser power, etc.). Other methods for creating rounded edges include mechanical sanding/polishing or from chemical/vapor polishing. In another embodiment of this invention, the lateral edges of a region of a coupling lightguide are tapered, angled serrated, or otherwise cut or formed such that light from a light source traveling within the coupling lightguide reflects from the edge such that it is directed into an angle closer to the optical axis of the light source, toward a folded or bent region, or toward a lightguide or lightguide region.

Width of Coupling Lightguides

In one embodiment of this invention, the dimensions of the coupling lightguides are substantially equal in width and thickness to each other such that the input surface areas for each edge surface are substantially the same. In another embodiment of this invention, the average width of the coupling lightguides, w, is determined by the equation:

$$w = MF * \frac{W_{LES}}{NC},$$

where $W_{LES}$ is the total width of the light emitting surface in the direction parallel to the light entrance edge of the lightguide region or lightguide receiving light from the coupling lightguide, NC is the total number of coupling lightguides in the direction parallel to the light entrance edge of the lightguide region or lightguide receiving light from the coupling lightguide, and MF is the magnification factor. In one embodiment of this invention, the magnification factor is one selected from the group of 0.7, 0.8, 0.9, 1, 1.1, 1.2, 1.3, 1.4, 0.7-1.3, 0.8-1.2, and 0.9-1.1. In another embodiment of this invention, at least one coupling lightguide width, the largest width of a coupling waveguide, the average width of the coupling lightguides, or the width of each coupling lightguides is selected from a group of substantially 0.5 mm-1 mm, 1 mm-2 mm, 2 mm-3 mm, 3 mm-4 mm, 5 mm-6 mm, 0.5 mm-2 mm, 0.5 mm-25 mm, 0.5 mm-10 mm, 10-37 mm, and 0.5 mm-5 mm. In one embodiment of this invention, at least one of the coupling lightguide width, the largest width of a coupling waveguide, the average width of the coupling lightguides, or the width of each coupling lightguides is less than 20 millimeters.

Shaped or Tapered Coupling Lightguides

The width of the coupling lightguides may vary in a predetermined pattern. In one embodiment of this invention, the width of the coupling lightguides varies from a large width in a central coupling lightguide to smaller width in lightguides further from the central coupling lightguide as viewed when the light input edges of the coupling lightguides are disposed together to form a light input surface on the light input coupler. In this embodiment, a light source with a substantially circular light output aperture can couple into the coupling lightguides such that the light at higher angles from the optical axis are coupled into a smaller width strip such that the uniformity of the light emitting surface along the edge of the lightguide or lightguide region and parallel to the input edge of the lightguide region disposed to receive the light from the coupling lightguides is greater than one selected from the group of 60%, 70%, 80%, 90% and 95%.

Other shapes of stacked coupling lightguides can be envisioned, such as triangular, square, rectangular, oval, etc. that provide matched input areas to the light emitting surface of the light source. The widths of the coupling lightguides may also be tapered such that they redirect a portion of light received from the light source. The lightguides may be tapered near the light source, in the area along the coupling lightguide between the light source and the lightguide region, near the lightguide region, or some combination thereof.

In some embodiments, one light source will not provide sufficient light flux to enable the desired luminance or light output profile desired for a particular light emitting device. In this example, one may use more than one light input coupler and light source along and edge of a lightguide or lightguide region. In one embodiment of this invention, the width of the coupling lightguides for at least one light input coupler are in a first width range of one selected from 0.7, 0.8, 0.9, 1, 1.1, 1.2, 1.3, 1.4, 0.7-1.3, 0.8-1.2, and 0.9-1.1. times the largest width of the light output surface of the light source in the direction of the lightguide coupler width.

In one embodiment of this invention, the coupling lightguide dimensional ratio, the ratio of the width of the coupling lightguide (the width is measured as the average dimension orthogonal to the general direction of travel within the coupling lightguide toward the light mixing region, lightguide, or lightguide region) to the thickness of the coupling lightguide (the thickness is the average dimension measured in the direction perpendicular to the travelling plane of the light within the coupling lightguide) is greater than one selected from the group of 5:1, 10:1, 15:1, 20:1, 25:1, 30:1, 40:1, 50:1, 60:1, 70:1, and 100:1. In one embodiment of this invention, the thickness of the coupling lightguide is less than 600 microns and the width is greater than 10 millimeters. In one embodiment of this invention, the thickness of the coupling lightguide is less than 400 microns and the width is greater than 3 millimeters. In a further embodiment of this invention, the thickness of the coupling lightguide is less than 400 microns and the width is greater than 10 millimeters. In another embodiment of this invention, the thickness of the coupling lightguide is less than 300 microns and the width is less than 10 millimeters. In another embodiment of this invention, the thickness of the coupling lightguide or light transmitting film is less than 200 microns and the width is less than 20 millimeters. Imperfections at the lateral edges of the coupling lightguides (deviations from perfect planar, flat surfaces due to the cutting of strips, for example) can increase the loss of light through the edges or surfaces of the coupling lightguides. By increasing the width of the coupling lightguides, one can reduce the effects of edge imperfections since the light within the coupling lightguide bounces (reflects) less off of the later edge surfaces (interacts less with the surface) in a wider coupling lightguide than a narrow coupling lightguide for a give range of angles of light propagation. The width of the coupling lightguides is a factor affecting the spatial color or luminance uniformity of the light entering the lightguide region, light mixing region, or lightguide, and when the width of the coupling lightguide is large compared to the width (in that same direction) of the light emitting region, then spatially non-uniform regions can occur.

In another embodiment of this invention, the ratio of width of the light emitting surface area disposed to receive at least 10% of the light emitted from a grouping of coupling lightguides forming a light input coupler in a direction parallel to the width of the coupling lightguides to the average width of the coupling lightguides is greater than one selected from the group of 5:1, 15:1, 20:1, 25:1, 30:1, 40:1, 50:1, 60:1, 70:1, 100:1, 150:1, 200:1, 300:1, 500:1, and 1000:1. In another embodiment of this invention, the ratio of the total width of the total light emitting surface disposed to receive the light emitted from all of the coupling lightguides directing light toward the light emitting region or surface along the width to the average coupling lightguide width is greater than one selected from the group of 5:1, 15:1, 20:1, 25:1, 30:1, 40:1, 50:1, 60:1, 70:1, 100:1, 150:1, 200:1, 300:1, 500:1, and 1000:1.

Number of Coupling Lightguides in a Light Input Coupler

In one embodiment of this invention, the total number of coupling lightguides, NC, in a direction parallel to the light entrance edge of the lightguide region or lightguide receiving light from the coupling lightguide is $$NC = MF * \frac{W_{LES}}{w},$$

where $W_{LES}$ is the total width of the light emitting surface in the direction parallel to the light entrance edge of the lightguide region or lightguide receiving light from the coupling lightguide, w is the average width of the coupling lightguides, and MF is the magnification factor. In one embodiment of this invention, the magnification factor is one selected from the group of 0.7, 0.8, 0.9, 1, 1.1, 1.2, 1.3, 1.4, 0.7-1.3, 0.8-1.2, and 0.9-1.1. In another embodiment of this invention, the number of coupling lightguides in a light input coupler or the total number of coupling lightguides in the light emitting device is selected from a group of 2, 3, 4, 5, 6, 8, 10, 11, 20, 30, 50, 70, 80, 90, 100, 2-50, 3-50, 4-50, 2-500, 4-500, greater than 10, greater than 20, greater than 30, greater than 40, greater than 50, greater than 60, greater than 70, greater than 80, greater than 90, greater than 100, greater than 120, greater than 140, greater than 200, greater than 300, greater than 400, greater than 500.

Order of Coupling Lightguides

In one embodiment of this invention, the coupling lightguides are disposed together at a light input edge forming a light input surface such that the order of the strips in a first direction is the order of the coupling lightguides as they direct light into the lightguide or lightguide region. In another embodiment of this invention, the coupling lightguides are interleaved such that the order of the strips in a first direction is not the same as the order of the coupling lightguides as they direct light into the lightguide or lightguide region. In one embodiment of this invention, the coupling lightguides are interleaved such that at least one coupling lightguide receiving light from a first light source of a first color is disposed between two coupling lightguides at a region near the lightguide region or light mixing region that receive light from a second light source with a second color different from the color of the first light source. In one embodiment, the color non-uniformity, Δu'v', along a direction parallel to the edge of the lightguide region along the light emitting surface is less than one selected from the group of 0.2, 0.1, 0.05, 0.01, and 0.004. In another embodiment of this invention, the coupling lightguides are interleaved such that at least one pair of coupling lightguides adjacent to each other at the output region of the light input coupler near the light mixing region, lightguide, or lightguide region, are not adjacent to each other near the input surface of the light input coupler. In one embodiment of this invention, the interleaved coupling lightguides are arranged such that the non-uniform angular output profile is made more uniform at the output of the light input coupler by distributing the coupling lightguides such that output from the light output coupler does not spatially replicate the angular non-uniformity of the light source. For example, the strips of a light input coupler could alternate among four different regions of the lightguide region as they are combined at the light input surface so that the middle region would not have very high luminance light emitting surface region that corresponds to the typically high intensity from a light source at 0 degrees or along its optical axis.

In another embodiment of this invention, the coupling lightguides are interleaved such that at least one pair of coupling lightguides adjacent to each other near the light mixing region, lightguide, or lightguide region, do not receive light from at least one of the same light source, the same light input coupler, and the same mixing region. In another embodiment of this invention, the coupling lightguides are interleaved such that at least one pair of coupling lightguides adjacent to each other near a light input surface do not couple light to at least one of the same light input coupler, the same light mixing region, the same lightguide, the same lightguide region, the same film, the same light output surface. In another embodiment of this invention, the coupling lightguides are interleaved at the light input surface in a two-dimensional arrangement such that at least two neighboring coupling lightguides in a vertical, horizontal or other direction at the input surface do not couple light to a neighboring region of at least one selected from the group of the same light input coupler, the same light mixing region, the same lightguide, the same lightguide region, the same film, and the same light output surface.

Coupling Lightguides Bonded to the Surface of a Lightguide Region

In one embodiment of this invention, the coupling lightguides are not segmented (or cut) regions of the same film which comprises the lightguide or lightguide region. In one embodiment of this invention, the coupling lightguides are formed and physically or optically attached to the lightguide, light mixing region, or lightguide region using at least one of an optical adhesive, bonding method (solvent welding, thermally bonding, ultrasonic welding, laser welding, hot gas welding, freehand welding, speed tip welding, extrusion welding, contact welding, hot plate welding, high frequency welding, injection welding, friction welding, spin welding, welding rod), and adhesive or joining techniques suitable for polymers. In one embodiment of this invention, the coupling lightguides are formed and optically coupled to the lightguide, mixing region, or lightguide region such that a significant portion of the light from the coupling lightguides is transferred into a waveguide condition within the mixing region, lightguide region, or lightguide. The coupling lightguide may be attached to the edge or a surface of the light mixing region, lightguide region, or lightguide. In one embodiment of this invention, the coupling lightguides are disposed within a first film wherein a second film comprising a lightguide region is extruded onto a region of the first film such that the coupling lightguides are optically coupled to the lightguide region. In another embodiment of this invention, the coupling lightguides are tapered in a region optically coupled to the lightguide. By separating out the production of the coupling lightguides with the production of the lightguide region, materials with different properties may be used for each region such as materials with different optical transmission properties, flexural modulus of elasticity, impact strength (Notched Izod), flexural rigidity, impact resistance, mechanical properties, physical properties, and other optical properties. In one embodiment of this invention, the coupling lightguides comprise a material with a flexural modulus less than 2 GPa and the lightguide or lightguide region comprises a material with a flexural modulus greater than 2 GPa. In one embodiment of this invention, the lightguide is a relatively stiff polycarbonate material and the coupling lightguides comprise a flexible elastomer or polyethylene. In another embodiment of this invention, the lightguide is an acrylic material and the coupling lightguides comprise a flexible fluoropolymer, elastomer or polyethylene. In one embodiment of this invention, the average thickness of the lightguide region or lightguide is more than 0.1 mm thicker than the average thickness of at least one coupling lightguide.

In one embodiment of this invention, at least one coupling lightguide is optically coupled to at least one of a surface, edge, or interior region, of an input light coupler, light mixing region, lightguide region, or lightguide. In another embodiment of this invention, a film comprising parallel linear cuts along the a direction of a film is bonded to a surface of a film in the extrusion process such that the strips are optically coupled to the lightguide film and the cut regions can be cut in the transverse direction to "free" the strips so that they can be brought together to form a light input surface of a light input coupler.

Coupling Lightguides Ending within the Lightguide Region

In one embodiment of this invention, a film comprising parallel linear cuts along the machine direction of a film is guided in-between two extrusion layers or coatings such that the ends of the strips are effectively inside the other two layers or regions. In another embodiment of this invention, one or more edges of the coupling lightguide are optically couple to a layer or coating (such a an adhesive) within a lightguide to reduce scattering and increase light coupling into the lightguide. This could be done in a single step or in sequential steps. By having strips or coupling lightguides terminate within a lightguide, lightguide region, or light mixing region, there are fewer back reflections from the air-end edge interface as there would be on a simple surface bonding because the edge would effectively be optically coupled into the volume of the light transmitting material forming the light mixing region, lightguide region or lightguide (assuming the material near the edge could flow or deform around the edge or another material is used (such as an adhesive) to promote the optical coupling of the edge and potentially surfaces.

Strip or Coupling Lightguide Registration or Securing Feature

In one embodiment of this invention, at least one strip near the central region of a light input coupler is used to align or guide the coupling strips or to connect the coupling lightguides to a lightguide or housing. In a fold-design wherein the coupling lightguides are folded toward the center of the light input coupler, a central strip or lightguide may not be folded to receive light from the light source due to geometrical limitations on the inability to fold the central strip or coupling lightguide. This central strip or coupling lightguide may be used for one selected from the group of aligning the light input coupler or housing to the strips (or lightguide), tightening the fold of the strips or coupling lightguide stack to reduce the volume, registering, securing or locking down the position of the light input coupler housing, provide a lever or arm to pull together components of a folding mechanism which bend or fold the coupling lightguides, coupling lightguides, lightguide or other element relative to one of the aforementioned elements. In one embodiment of this invention, one or more of the strips or coupling lightguides comprises a tab or tab region that is used to register, align, or secure the location of the strip or coupling lightguide relative to the housing, folder, holder, lightguide, light source, light input coupler, or other element of the light emitting device. In another embodiment of this invention, at least one strip or coupling lightguide comprises a pin, hole, cut-out, tab, or other feature useful for registering, aligning, or securing the location of the strip or coupling lightguide.

Varying Coupling Lightguide Thickness

In one embodiment of this invention, at least one coupling lightguide or strip varies in the thickness direction along the path of the light travelling through the lightguide. In one embodiment of this invention, at least one coupling lightguide or strip varies in the thickness direction substantially perpendicular to the path of the light travelling through the lightguide. In another embodiment of this invention, the dimension of at least one coupling lightguide or strip varies in a direction parallel to the optical axis of the light emitting device along the path of the light travelling through the lightguide. In one embodiment of this invention, the thickness of the coupling lightguide increases as the light travels from a light source to the light mixing region, lightguide, or lightguide region. In one embodiment of this invention, the thickness of the coupling lightguide decreases as the light travels from a light source to the light mixing region, lightguide, or lightguide region. In one embodiment of this invention, the thickness of a coupling lightguide in a first region divided by the thickness of the coupling lightguide in a second region is greater than one selected from the group of 1, 2, 4, 6, 10, 20, 40, 60 and 100.

Light Mixing Region

In one embodiment of this invention, a light emitting device comprises a light mixing region disposed in an optical path between the light input coupler and the lightguide region. The light mixing region can provide a region for the light output from individual coupling lightguides to mix together and improve at least one of the spatial luminance uniformity, spatial color uniformity, angular color uniformity, angular luminance uniformity, angular luminous intensity uniformity or any combination thereof within a region of the lightguide or of the surface or output of the light emitting region or light emitting device. In one embodiment of this invention, the width of the light mixing region is selected from a range from 0.1 mm (for small displays) to more than 10 feet (for large billboards). In one embodiment of this invention, the light mixing region is the region disposed along an optical path near the end region of the coupling lightguides whereupon light from two or more coupling lightguides may inter-mix and subsequently travel to a light emitting region of the lightguide. In one embodiment of this invention, the light mixing region is formed from the same component or material as at least one of the lightguide, lightguide region, light input coupler, and coupling lightguides. In another embodiment of this invention, the light mixing region comprises a material that is different than at least one selected from the group of the lightguide, lightguide region, light input coupler, and coupling lightguides. The light mixing region may be a rectangular, square or other shaped region or it may be a peripheral region surrounding all or a portion of the light emitting region or lightguide region. In one embodiment of this invention, the surface area of the light mixing region of a light emitting device is one selected from the group of less than 1%, less than 5%, less than 10%, less than 20%, less than 30%, less than 40%, less than 50%, less than 60%, less than 70%, greater than 20%, greater than 30%, greater than 40% greater than 50%, greater than 60%, greater than 70%, greater than 80%, greater than 90%, 1-10%, 10-20%, 20-50%, 50-70%, 70-90%, 80-95% of the total outer surface area of the light emitting surface or the area of the light emitting surface from which light is emitted.

Cladding Layer

In one embodiment of this invention, at least one of the light input coupler, coupling lightguide, light mixing region, lightguide region, and lightguide comprises a cladding layer optically coupled to at least one surface. A cladding region, as used herein, is a layer optically coupled to a surface wherein the cladding layer comprises a material with a refractive index, $n_{clad}$, less than the refractive index of the material, $n_m$, of the surface to which it is optically coupled. In one embodiment of this invention, $n_m$-$n_{clad}$ is one selected from the group of 0.001-0.005, 0.001-0.01, 0.001-0.1, 0.001-0.2, 0.001-0.3, 0.001-0.4, 0.01-0.1, 0.1-0.5, 0.1-0.3, 0.2-0.5, greater than 0.01, greater than 0.1, greater than 0.2, greater than 0.3. In one embodiment of this invention, the cladding is one selected from the group of methyl based silicone pressure sensitive adhesive, fluoropolymer material (applied with using coating comprising a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. Components or objects such as additional films, layers, objects, fingers, dust etc. that come in contact or optical contact directly with a core or core region of a lightguide may couple light out of the lightguide, absorb light or transfer the totally internally reflected light into a new layer. By adding a cladding layer with a lower refractive index than the core, a portion of the light will totally internally reflect at the core-cladding layer interface. Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment of this invention, a cladding layer is optically coupled to a rear polarizer in a backlit liquid crystal display. In another embodiment of this invention, the cladding layer is optically coupled to a polarizer or outer surface of a front-lit display such as an electrophoretic display, e-book display, e-reader display, MEMs type display, E Ink® type display, reflective or partially reflective LCD display, cholesteric display, or other display capable of being illuminated from the front. In another embodiment of this invention, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment of this invention, the cladding layer is separated from the lightguide or lightguide region core layer by at least one additional layer or adhesive.

In one embodiment of this invention, a region of cladding material is removed or is absent in the region wherein the lightguide layer or lightguide is optically coupled to another region of the lightguide wherein the cladding is removed or absent such that light can couple between the two regions. In one embodiment of this invention, the cladding is removed or absent in a region near an edge of a lightguide, lightguide region, strip or region cut from a lightguide region, or coupling lightguide such that light nearing the edge of the lightguide can be redirected by folding or bending the region back onto a region of the lightguide wherein the cladding has been removed where the regions are optically coupled together. In another embodiment of this invention, the cladding is removed or absent in the region disposed between the lightguide regions of two coupling lightguides disposed to receive light from a light source or near a light input surface. By removing or not applying or disposing a cladding in the region in-between the input end of two or more coupling lightguides disposed to receive light from a light source, light is not directly coupled into the cladding region edge.

Cladding Location

In one embodiment of this invention, the cladding region is optically coupled to at least one of the lightguide, lightguide region, light mixing region, one surface of the lightguide, two surfaces of the lightguide, light input coupler, coupling lightguides, and an outer surface of the film. In another embodiment of this invention, the cladding is disposed in optical contact with the lightguide, lightguide region, or layer or layers optically coupled to the lightguide and the cladding material is not disposed on one or more coupling lightguides. In one embodiment of this invention, the coupling lightguides do not comprise a cladding region on either planar side and optical loss at the bends or folds in the coupling lightguides is reduced. In another embodiment of this invention, the coupling lightguides do not comprise a cladding region on either planar side and the light input surface input coupling efficiency is increased due to the light input surface area having a higher concentration of lightguide received surface relative to a lightguide with at least one cladding. In a further embodiment of this invention, the light emitting region has at least one cladding region or layer and the percentage of the area of the light input surface of the coupling lightguides disposed to transmit light into the lightguide portion of the coupling lightguides is greater than one selected from the group of 70%, 80%, 85%, 90%, 95%, 98% and 99%. The cladding may be on one side only of the lightguide or the light emitting device could be designed to be optically coupled to a material with a refractive index lower than the lightguide, such as in the case with a plasticized PVC film (n=1.53) (or other low-tack material) temporarily adhered to a glass window (n=1.51).

In one embodiment of this invention, the cladding on at least one surface of the lightguide is applied (such as coated or co-extruded) and the cladding on the coupling lightguides is subsequently removed. In a further embodiment of this invention, the cladding applied on the surface of the lightguide (or the lightguide is applied onto the surface of the cladding) such that the regions corresponding to the coupling lightguides do not have a cladding. For example, the cladding material could be extruded or coated onto a lightguide film in a central region wherein the outer sides of the film will comprise coupling lightguides. Similarly, the cladding may be absent on the coupling lightguides in the region disposed in close proximity to one or more light sources or the light input surface.

In a further embodiment of this invention, the total thickness of the coupling lightguides in the region disposed to receive light from a light source to be coupled into the coupling lightguides is less than n times the thickness of the lightguide region where n is the number of coupling lightguides. In a further embodiment of this invention, the total thickness of the coupling lightguides in the region disposed to receive light from a light source to be coupled into the coupling lightguides is substantially equal to n times the thickness of the lightguide layer within the lightguide region.

Cladding Layer Materials

In one embodiment of this invention, the cladding layer comprises an adhesive such as a silicone-based adhesive, acrylate-based adhesive, epoxy, radiation curable adhesive, UV curable adhesive, or other light transmitting adhesive. The cladding layer material may comprise light scattering domains and may scatter light anisotropically or isotropically. In one embodiment of this invention, the cladding layer is an adhesive such as those described in U.S. Pat. No. 6,727,313 the contents of which are incorporated by reference herein. In another embodiment of this invention, the cladding material comprises domains less than 200 nm in size with a low refractive index such as those described in U.S. Pat. No. 6,773,801, the contents of which are incorporated by reference herein. Other low refractive index materials, fluoropolymer materials, polymers and adhesives may be used such as those disclosed U.S. Pat. Nos. 6,887,334 and 6,827,886 and U.S. patent application Ser. No. 11/795,534, the contents of each are incorporated by reference herein.

Fluoropolymer materials may be used a low refractive index cladding material and may be broadly categorized into one of two basic classes. A first class includes those amorphous fluoropolymers comprising interpolymerized units derived from vinylidene fluoride (VDF) and hexafluoropropylene (HFP) and optionally tetrafluoroethylene (TFE) monomers. Examples of such are commercially available from 3M Company as Dyneon™ Fluoroelastomer FC 2145 and FT 2430. Additional amorphous fluoropolymers contemplated by this invention are, for example, VDF-chlorotrifluoroethylene copolymers. One such VDF-chlorotrifluoroethylene copolymer is commercially known as Kel-F™ 3700, available from 3M Company. As used herein, amorphous fluoropolymers are materials that contain essentially no crystallinity or possess no significant melting point as determined for example by differential scanning caloriometry (DSC). For the purpose of this discussion, a copolymer is defined as a polymeric material resulting from the simultaneous polymerization of two or more dissimilar monomers and a homopolymer is a polymeric material resulting from the polymerization of a single monomer.

The second significant class of fluoropolymers useful in an embodiment of this invention are those homo and copolymers based on fluorinated monomers such as TFE or VDF which do contain a crystalline melting point such as polyvinylidene fluoride (PVDF, available commercially from 3M company as Dyneon™ PVDF, or more preferable thermoplastic copolymers of TFE such as those based on the crystalline microstructure of TFE-HFP-VDF. Examples of such polymers are those available from 3M under the trade name Dyneon™ Fluoroplastics THV™ 200.

A general description and preparation of these classes of fluoropolymers can be found in Encyclopedia Chemical Technology, Fluorocarbon Elastomers, Kirk-Othmer (1993), or in Modern Fluoropolymers, J. Scheirs Ed, (1997), J Wiley Science, Chapters 2, 13, and 32. (ISBN 0-471-97055-7), the contents of each are incorporated by reference herein.

In one embodiment of this invention, the fluoropolymers are copolymers formed from the constituent monomers known as tetrafluoroethylene ("TFE"), hexafluoropropylene ("HFP"), and vinylidene fluoride ("VdF," "VF2,"). The monomer structures for these constituents are shown below as (1), (2) and (3):

$$\text{TFE: } CF_2=CF_2 \quad (1)$$

$$\text{VDF: } CH_2=CF_2 \quad (2)$$

$$\text{HFP: } CF_2=CF-CF_3 \quad (3)$$

In one embodiment of this invention, the preferred fluoropolymer consists of at least two of the constituent monomers (HFP and VDF), and more preferably all three of the constituents monomers in varying molar amounts. Additional monomers not depicted above but may also be useful in the present invention include perfluorovinyl ether monomers of the general structure: $CF_2=CF-OR_f$, wherein $R_f$ can be a branched or linear perfluoroalkyl radical of 1-8 carbons and can itself contain additional heteroatoms such as oxygen. Specific examples are perfluoromethyl vinyl ether, perfluoropropyl vinyl ether, and perfluoro(3-methoxy-propyl) vinyl ether. Additional examples incorporated by reference herein are found in WO00/12754 to Worm, assigned to 3M, and U.S. Pat. No. 5,214,100 to Carlson. Other fluoropolymer materials may be used such as those disclosed in U.S. patent application Ser. No. 11/026,614.

In one embodiment of this invention, the cladding material is birefrengent and the refractive index in at least a first direction is less than refractive index of the lightguide region, lightguide core, or material to which it is optically coupled.

Other Reflective or Protective Layers

In one embodiment of this invention, at least one of the light source, light input surface, light input coupler, coupling lightguide, lightguide region, and lightguide comprises a reflective element or surface optically coupled to it, disposed adjacent to it, or disposed to receive light from it wherein the reflective region is one selected from the group of specularly reflecting region, diffusely reflecting region, metallic coating on a region (such as an ITO coating, Aluminized PET, Silver coating, etc.), multi-layer reflector dichroic reflector, multi-layer polymeric reflector (such as ESR film from 3M), reflective ink or particles within a coating or layer, and a white reflective film comprising at least one of titanium dioxide, Barium sulfate, and voids. In one embodiment of this invention, the light emitting device is a backlight illuminating a display or other object to be illuminated and the light emitting region, lightguide, or lightguide region is disposed between a reflective surface or element and the object to be illuminated. In another embodiment of this invention, the reflective element is a voided white PET film such as TETORON® film UX Series from TEIJIN (Japan). In one embodiment of this invention, the reflective element or surface has a diffuse reflectance d/8 with the specular component included (DR-SCI) measured with a Minolta CM508D spectrometer greater than one selected from the group of 60%, 70%, 80%, 90%, and 95%. In another embodiment of this invention, the reflective element or surface has a diffuse reflectance d/8 with specular component excluded (DR-SCE) measured with a Minolta CM508D spectrometer greater than one selected from the group of 60%, 70%, 80%, 90%, and 95%. In another embodiment of this invention, the reflective element or surface has a specular reflectance greater than one selected from the group of 60%, 70%, 80%, 90%, and 95%. The specular reflectance, as defined herein, is the percentage of light reflected from a surface illuminated by a 532 nanometer laser that is within a 10 degree (full angle) cone centered about the optical axis of the reflected light. This can be measured by using an integrating sphere wherein the aperture opening for the integrating sphere is positioned at a distance from the point of reflection such that the angular extent of the captured light is 10 degrees full angle. The percent reflection is measured against a reflectance standard with a known specular reflectance, a reflectance standard, film, or object that have extremely low levels of scattering.

In one embodiment of this invention, at least one of the light input surface, light input coupler, coupling lightguide, lightguide region, and lightguide comprises a protective element or layer optically coupled to it, physically coupled to it, disposed adjacent to it, or disposed between it and a light emitting surface of the light emitting device. A protective film element can have a higher scratch resistance, higher impact resistance, hardcoating layer, impact absorbing layer or other layer or element suitable to protect at least one of the light input surface, light input coupler, coupling lightguide, lightguide region, and lightguide from scratches, impacts, dropping the device, interaction with sharp objects, etc.

Coupling Light into the Surface of the Coupling Lightguide

In one embodiment of this invention, the light input surface of the light input coupler is at least one surface of at least one coupling lightguide. In one embodiment of this invention, light is coupled into a coupling lightguide such that it remains in the lightguide for multiple total internal reflections by at least one optical element or feature on at least one surface or optically coupled to at least one surface comprising an optical region selected from the group of lens, prismatic lens, prismatic film, diffraction grating, holographic optical element, diffractive optical element, diffuser, anisotropic diffuser, refractive surface relief features, diffractive surface relief features, volumetric light re-directing features, micro-scale volumetric or surface relief features, nano-scale volumetric or surface relief features, and total-internal-reflection volumetric or surface features. The optical element or feature may be incorporated on one or several coupling lightguides in a stacked or predetermined physically arranged distribution of coupling lightguides. In one embodiment of this invention, the optical element or feature is arranged spatially in a pattern within or on one coupling lightguide or across multiple coupling lightguides. In one embodiment of this invention, the coupling efficiency of an optical element or feature is greater than one selected from the group of 50%, 60%, 70%, 80%, and 90% for a wavelength range selected from one selected from the group of 350 nm-400 nm, 400 nm-700 nm, 450 nm-490 nm, 490 nm-560 nm, and 635 nm-700 nm. The coupling efficiency as defined herein is the percent of incident light from a light source disposed to direct light onto at least one coupling lightguide which is coupled into the at least one coupling lightguide disposed to receive light from the light source which remains within the coupling lightguide at an angle greater than the critical angle further along in the region of the lightguide just past the light input surface region. In one embodiment of this invention, two or more coupling lightguides are stacked or bundled together wherein they each have an optical element or feature disposed to couple light into the coupling lightguide and the optical element or feature has a coupling efficiency less than one selected from the group of 50%, 60%, 70%, 80%, and 90% for a wavelength range selected from one selected from the group of 350 nm-400 nm, 400 nm-700 nm, 450 nm-490 nm, 490 nm-560 nm, and 635 nm-700 nm. By stacking a group of coupling lightguides, for example, one can use lower coupling efficiencies to enable a portion of the incident light to pass through a first coupling lightguide onto a second coupling lightguide to allow light to be coupled into the second coupling lightguide. In one embodiment of this invention, the coupling efficiency is graded or varies in a first direction through an arrangement of coupling lightguides and a light reflecting element or region is disposed on the opposite side of the arrangement of coupling lightguides disposed to reflect a portion of incident light back through the coupling lightguides.

Coupling Light into Two or More Surfaces

In one embodiment of this invention, light is coupled through light input couplers, coupling lightguides, optical elements, or a combination thereof to at least two surfaces or surface regions of a at least one lightguide in a light emitting device. In another embodiment of this invention, the light coupled through the surface of a lightguide or lightguide region is directed by the light extraction features into an angular range different than that of the light directed by the same or different light extraction features from light coupled through a second surface or second surface region of a lightguide or lightguide region of a light emitting device. In another embodiment of this invention, a first light extracting region comprising a first set of light re-directing features or light extraction features that directs light incident through a first surface or edge into a first range of angles upon exiting the light emitting surface of the lightguide and a second light extracting region comprises a second set of light re-directing or light extraction features that direct light incident through a second surface or edge into a second range of angles upon exiting the light emitting surface of the lightguide. Variations in the light re-directing features include, but are not limited to, feature height, shape, orientation, density, width, length, material, angle of a surface, location in the x, y, and z direction and include dispersed phase domains, grooves, pits, microlenses, prismatic elements, air cavities, hollow microspheres, dispersed microspheres, and other known light extraction features or elements. In another embodiment of this invention, a light emitting device comprises at least one lightguide and a first light source disposed to couple light through a surface of at least one lightguide and a second light source disposed to couple light through the edge of at least one lightguide wherein the coupling mechanism is at least one selected from the group of light input couplers, optical element, coupling lightguide, optical components or coupling lightguides optically coupled to a surface or edge, diffractive optics, holographic optical element, diffraction grating, Fresnel lens element, prismatic film, light redirecting optic, and other optical element.

Light Input Couplers Disposed Near More than One Edge of a Lightguide

In one embodiment of this invention, a light emitting device comprises a plurality of light input couplers disposed to couple light into a lightguide from at least two input regions disposed near two different edges of a lightguide. In another embodiment of this invention, two light input couplers are disposed on opposite sides of a lightguide. In another embodiment, light input couplers are disposed on three or four sides of a film-type lightguide.

Strip Folding Device

In one embodiment of this invention, the light emitting device comprises frame members which assist in at least one of the folding or holding of the coupling lightguides or strips. Methods for folding and holding coupling lightguides such as film-based lightguides using frame members are disclosed in International (PCT) Publication No. WO 2009/048863 and PCT application titled "ILLUMINATION VIA FLEXIBLE THIN FILMS" filed on Jan. 26, 2010 by Anthony Nichols and Shawn Pucylowski, U.S. Provisional patent applications Ser. Nos. 61/147,215 and 61/147,237, the contents of each are incorporated by reference herein. In one embodiment of this invention, the coupling lightguide folding (or bending) and/or holding (or housing) element is formed from at least one selected from the group of rigid plastic material, black colored material, opaque material, semi-transparent material, metal foil, metal sheet, aluminum sheet or foil. In one embodiment of this invention, the folding or holding material has a flexural rigidity or (flexural modulus) at least twice the flexural rigidity (or modulus) of the film or coupling lightguides which it folds or holds.

Housing or Holding Device for Light Input Coupler

In one embodiment of this invention, a light emitting device comprises a housing or holding device that holds or contains at least part of a light input coupler and light source. The housing or holding device may house or contain within at least one selected from the group of light input coupler, light source, coupling lightguides, lightguide, optical components, electrical components, heat sink or other thermal components, attachment mechanisms, registration mechanisms, folding mechanisms devices or frames. The housing or holding device may comprise a plurality of components or any combination of the aforementioned components. The housing or holding device may serve one or more of functions selected from the group of protect from dust and debris contamination, provide air-tight seal, provide a water-tight seal, house or contain components, provide a safety housing for electrical or optical components, assist with the folding or bending of the coupling lightguides, assist in the alignment or holding of the lightguide, coupling lightguide, light source or light input coupler relative to another component, maintain the arrangement of the coupling lightguides, recycle light (such as with reflecting inner walls), provide attachment mechanisms for attaching the light emitting device to an external object or surface, provide an opaque container such that stray light does not escape through specific regions, provide a translucent surface for displaying indicia or providing illumination to an object external to the light emitting device, comprise a connector for release and interchangeability of components, and provide a latch or connector to connect with other holding devices or housings.

In one embodiment of this invention, the coupling lightguides are terminated within the housing or holding element. In another embodiment of this invention, the inner surface of the housing or holding element has a specular or diffuse reflectance greater than 50% and the inner surface appears white or mirror-like. In another embodiment of this invention, the outer surface of the housing or holding device has a specular or diffuse reflectance greater than 50% and the outer surface appears white or mirror-like. In another embodiment of this invention, at least one wall of the housing or holding device has a specular or diffuse reflectance less than 50% and the inner surface appears gray, black or like a very dark mirror. In another embodiment of this invention, at least one wall or surface of the housing or holding device is opaque and has an transmittance measured according to ASTM D1003 of less than 50%. In another embodiment of this invention, at least one wall or surface of the housing or holding device has a transmittance measured according to ASTM D1003 greater than 30% and the light exiting the wall or surface from the light source within the housing or holding device provides illumination for a component of the light emitting device, illumination for an object external to the light emitting device, or illumination of a surface to display a sign, indicia, passive display, a second display or indicia, or an active display such as providing backlight illumination for an LCD.

In one embodiment of this invention, the housing or holding device comprises at least one connector, pin, clip, latch, adhesive region, clamp, a joining mechanism, or other connecting element or mechanical means to connect or hold the housing or holding device to another housing or holding device, the lightguide, the coupling lightguides, films, strips, the light source, the electronics or electrical components, the circuit board for the electronics or light source such as an LED, the heat sink or other thermal control element, the frame of the light emitting device, or other component of the light emitting device.

In a another embodiment of this invention, the input ends and output ends of the coupling lightguides are held in physical contact with the relative position maintaining elements by at least one selected from the group of magnetic grips, mechanical grips, clamps, screws, mechanical adhesion, chemical adhesion, dispersive adhesion, diffusive adhesion, electrostatic adhesion, vacuum holding, or an adhesive.

Detachable Cartridge

In one embodiment of this invention, the light emitting device comprises a detachable section or cartridge to enable removal of at least one of the lightguide, light emitting region, coupling lightguides, optical element, light source, electrical components, and thermal components. In another embodiment of this invention, the light emitting device comprises a housing or holding device that comprises a detachable section or cartridge which allows the removal, re-registration, and re-attachment of a lightguide and light input coupler comprising the coupling lightguides while leaving the light source and electronics connected to the housing or holding device. This detachable device or cartridge can allow for the lightguide comprising the light extracting features representing indicia (such as for a sign or logo) and the light input coupler to be easily replaced to change the indicia displayed (such in the case of an electroluminescent sign) without needing to replace the light source, electronics, and possibly without having to un-mount or uninstall the housing or holding device. In another embodiment of this invention, the detachable cartridge comprises at least one selected from the group of the light source, light input coupler, and the lightguide, the thermal transfer element disposed to thermally couple to the light source (or the a thermal transfer component attached to the light source), and the electrical driving source such as the LED driver. In this embodiment, when improved, higher efficiency light sources or different colors or different elements or configurations are desired, they may be included with the cartridge.

Curved or Flexible Housing

In another embodiment of this invention, the housing comprises at least one curved surface. A curved surface can permit non-linear shapes or devices or facilitate incorporating non-planer or bent lightguides or coupling lightguides. In one embodiment of this invention, a light emitting device comprises a housing with at least one curved surface wherein the housing comprises curved or bent coupling lightguides. In another embodiment of this invention, the housing is flexible such that it may be bent temporarily, permanently or semi-permanently. By using a flexible housing, for example, the light emitting device may be able to be bent such that the light emitting surface is curved along with the housing, the light emitting area may curve around a bend in a wall or corner, for example. In one embodiment of this invention, the housing or lightguide may be bent temporarily such that the initial shape is substantially restored (bending a long housing to get it through a door for example). In another embodiment of this invention, the housing or lightguide may be bent permanently or semi-permanently such that the bent shape is substantially sustained after release (such as when it is desired to have a curved light emitting device to provide a curved sign or display, for example).

Housing Including a Thermal Transfer Element

In one embodiment of this invention, the housing comprises a thermal transfer element disposed to transfer heat from a component within the housing to an outer surface of the housing. In another embodiment of this invention, the thermal transfer element is one selected from the group of heat sink, metallic or ceramic element, fan, heat pipe, synthetic jet (such as those manufactured by Nuventix), active cooling element, passive cooling element, rear portion of a metal core or other conductive circuit board, thermally conductive adhesive, or other component known to thermally conduct heat. In one embodiment of this invention, the thermal transfer element has a thermal conductivity $(W/(m \cdot K))$ greater than one selected from the group of 0.2, 0.5, 0.7, 1, 3, 5, 50, 100, 120, 180, 237, 300, and 400.

Size of the Housing or Coupling Lightguide Holding Device

In one embodiment of this invention, the sizes of the two smaller dimensions of the housing or coupling lightguide holding device are less than one selected from the group of 500, 400, 300, 200, 100, 50, 25, 10, and 5 times the thickness of the lightguide or coupling lightguides. In another embodiment of this invention, at least one dimension of the housing or lightguide holding device is smaller due to the use of more than one light input coupler disposed along an edge of the lightguide. In this embodiment, the thickness of the housing or holding device can be reduced because for a fixed number of strips or coupling lightguides, they can be arranged into multiple smaller stacks instead of a single larger stack. This also enables more light to be coupled into the lightguide by using multiple light input couplers and light sources.

Lightguide Configuration and Properties

The use of plastic film with thickness less than 0.5 mm for edge lit lightguides can hold many advantages over using plastic plate or sheets. A flexible film may be able to be shaped to surfaces, be folded up for storage, change shape as needed, or wave in the air. Another advantage may be lower cost. The reduction in thickness helps reduce the cost for material, fabrication, storage and shipping for a lightguide of a given width and length. Another reason may be that decreased thickness makes it able to be added to surfaces without appreciable change in the surface's shape, thickness and or appearance. For example, it can be added to the surface of a window easily without changing the look of the window. Another advantage may be that the film or lightguide can be rolled up. This helps in transportability, can hold some functionality, and may be particularly useful for hand-held devices where a roll-out screen is used. A fifth reason is that the film can weigh less, which again makes it easier to handle and transport, A sixth reason may be that film is commonly extruded in large rolls so larger edge-lit signage can be produced. Finally, a seventh reason may be that there are many companies set up to coat, cut, laminate and manipulate film since film is useful for many other industries. Plastic films are made by blown or cast-extrusion in widths up to 20 ft or longer and in rolls thousands of feet long. Co-extrusion of different materials from two to 100 layers can be achieved with special extrusion dies.

Thickness of the Film or Lightguide

In one embodiment of this invention, the thickness of the film, lightguide or lightguide region is within a range of 0.005 mm to 0.5 mm. In another embodiment of this invention, the thickness of the film or lightguide is within a range of 0.025 millimeters (0.001 inches) to 0.5 millimeters (0.02 inches). In a further embodiment of this invention, the thickness of the film, lightguide or lightguide region is within a range of 0.050 millimeters to 0.175 millimeters. In one embodiment of this invention, the thickness of the film, lightguide or lightguide region is less than 0.2 millimeters or less than 0.5 millimeters. In one embodiment of this invention, at least one thickness, largest thickness, average thickness, greater than 90% of the entire thickness of the film, lightguide, or lightguide region is less than 0.2 millimeters. In another embodiment of this invention, the size to thickness ratio, defined as the largest dimension of the light emitting region in the plane of the light emitting region divided by the average thickness within the light emitting region is greater than one selected from the group of 100; 500; 1,000; 3,000; 5,000; 10,000; 15,000; 20,000; 30,000; and 50,000.

Optical Properties of the Lightguide or Light Transmitting Material

With regards to the optical properties of lightguides or light transmitting materials for embodiments of this invention, the optical properties specified herein may be general properties of the lightguide, the core, the cladding, or a combination thereof or they may correspond to a specific region (such as a light emitting region, light mixing region, or light extracting region), surface (light input surface, diffuse surface, flat surface), and direction (such as measured normal to the surface or measured in the direction of light travel through the lightguide). In one embodiment of this invention, the average transmittance of the lightguide measured within at least one of the light emitting region, light mixing region, or lightguide according to ASTM D1003 with a BYK Gardner haze meter is greater than one selected from the group of 70%, 80%, 88%, 92%, 94%, 96%, 98%, and 99%. In another embodiment of this invention, the average transmittance of the lightguide measured within the major light emitting area (the area comprising greater than 80% of the total light emitted from the lightguide) according to ASTM D1003 with a BYK Gardner haze meter is greater than one selected from the group of 70%, 80%, 88%, 92%, 94%, 96%, 98%, and 99%.

In another embodiment of this invention, the average haze of the lightguide measured within at least one of the light emitting region, light mixing region, or lightguide according to ASTM D1003 with a BYK Gardner haze meter is less than one selected from the group of 70%, 60%, 50%, 40%, 30%, 20%, 10%, 5% and 3%. In another embodiment of this invention, the average clarity of the lightguide measured within at least one of the light emitting region, light mixing region, or lightguide according to the measurement procedure associated with ASTM D1003 with a BYK Gardner haze meter is greater than one selected from the group of 70%, 80%, 88%, 92%, 94%, 96%, 98%, and 99%.

In a further embodiment of this invention, the diffuse reflectance of the lightguide measured within at least one of the light emitting region, light mixing region, or lightguide using a Minolta CM-508d spectrophotometer is less than one selected from the group of 30%, 20%, 10%, 7%, 5%, and 2% with the spectral component included or with the spectral component excluded when placed above a light absorbing 6"×6"×6" box comprising Light Absorbing Black-Out Material from Edmund Optics on the inner walls. In another embodiment of this invention, the diffuse reflectance of the lightguide measured within the major light emitting area (the area comprising greater than 80% of the total light emitted from the lightguide) using a Minolta CM-508d spectrophotometer is less than one selected from the group of 30%, 20%, 10%, 7%, 5%, and 2% with the spectral component included or with the spectral component excluded when placed above a light absorbing 6"×6"×6" box comprising Light Absorbing Black-Out Material from Edmund Optics on the inner walls.

In another embodiment of this invention, the average clarity of the lightguide measured within at least one of the light emitting region, light mixing region, or lightguide according to the measurement procedure associated with ASTM D1003 with a BYK Gardner haze meter is greater than one selected from the group of 70%, 80%, 88%, 92%, 94%, 96%, 98%, and 99%.

Factors which can determine the transmission of light through the film (in the thickness direction) include inherent material absorption, refractive index (light loss due to Fresnel reflections), scattering (refraction, reflection, or diffraction) from particles or features within the volume or on a surface or interface (size, shape, spacing, total number of particles or density in two orthogonal directions parallel to the film plane and the plane orthogonal to the film), absorption/scattering/reflection/refraction due to other materials (additional layers, claddings, adhesives, etc), anti-reflection coatings, surface relief features.

In one embodiment of this invention, the use of a thin film for the lightguide permits the reduction in size of light extraction features because more waveguide modes will reach the light extraction feature when the thickness of the film is reduced. In a thin lightguide, the overlap of modes is increased when the thickness of the waveguide is reduced.

In one embodiment of this invention, the film-based lightguide has a graded refractive index profile in the thickness direction. In another embodiment of this invention, the thickness of the lightguide region or lightguide is less than 10 microns and the lightguide is a single mode lightguide.

In one embodiment of this invention, the light transmitting material used in at least one of the coupling lightguide, lightguide, lightguide region, optical element, optical film, core layer, cladding layer, optical adhesive has an optical absorption (dB/km) less than one selected from the group of 50, 100, 200, 300, 400, and 500 dB/km for a wavelength range of interest. The optical absorption value may be for all of the wavelengths throughout the range of interest or an average value throughout the wavelengths of interest. The wavelength range of interest for high transmission through the light transmitting material may cover the light source output spectrum, the light emitting device output spectrum, optical functionality requirements (IR transmission for cameras, motion detectors, etc, for example), or some combination thereof. The wavelength range of interest may be a wavelength range selected from the group of 400 nm-700 nm, 300 nm-800 nm, 300 nm-1200 nm, 300 nm-350 nm, 300-450 nm, 350 nm-400 nm, 400 nm-450 nm, 450 nm-490 nm, 490 nm-560 nm, 500 nm-550 nm, 550 nm-600 nm, 600 nm-650 nm, 635 nm-700 nm, 650 nm-700 nm, 700 nm-750 nm, 750 nm-800 nm, and 800 nm-1200 nm.

In one embodiment of this invention, the lightguide has a low absorption in the UV and blue region and the lightguide further comprises a phosphor film or wavelength conversion element. By using a blue or UV light source and a wavelength conversion element near the output surface of the lightguide for generation of white light, the light transmitting material can be optimized for very high blue or UV light transmission. This can increase the range of materials suitable for lightguides to include those that have high absorption coefficients in the green and red wavelength regions for example.

In another embodiment of this invention, the lightguide is the substrate for a display technology. Various high performance films are known in the display industry as having sufficient mechanical and optical properties. These include, but are not limited to polycarbonate, PET, PMMA, PEN, COC, PSU, PFA, FEP, and films made from blends and multilayer components. In one embodiment of this invention, the light extraction feature is formed in a lightguide region of a film before or after the film is utilized as a substrate for the production or use as a substrate for a display such as an OLED display, MEMs based display, polymer film based display, bi-stable display, electrophoretic display, electrochromic display, electro-optical display, passive matrix display, or other display that can be produced using polymer substrates.

Refractive Index of the Light Transmitting Material

In one embodiment of this invention, the core material of the lightguide has a high refractive index and the cladding material has a low refractive index. In one embodiment of this invention, the core is formed from a material with a refractive index ($n_D$) greater than one selected from the group of 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment of this invention, the refractive index ($n_D$) of the cladding material is less than one selected from the group of 1.1, 1.2, 1.3, 1.4, 1.5, 1.6, 1.7, 1.8, 1.9, 2.0, 2.1, 2.2, 2.3, 2.4, and 2.5.

The core or the cladding or other light transmitting material used within an embodiment of this invention may be a thermoplastic, thermoset, rubber, polymer, silicone or other light transmitting material. Optical products can be prepared from high index of refraction materials, including monomers such as high index of refraction (meth)acrylate monomers, halogenated monomers, and other such high index of refraction monomers as are known in the art. High refractive index materials such as these and others are disclosed, for example, in U.S. Pat. Nos. 4,568,445; 4,721,377; 4,812,032; 5,424,339; 5,183,917; 6,541,591; 7,491,441; 7,297,810, 6,355,754, 7,682,710; 7,642,335; 7,632,904; 7,407,992; 7,375,178; 6,117,530; 5,777,433; 6,533,959; 6,541,591; 7,038,745 and U.S. patent application Ser. Nos. 11/866,521; 12/165,765; 12/307,555; and 11/556,432 the contents of each are incorporated by reference herein. High refractive index pressure sensitive adhesives such as those disclosed in U.S. patent application Ser. No. 12/608,019 may also be used as a core layer or layer component.

Low refractive index materials include sol gels, fluoropolymers, fluorinated sol-gels, PMP, and other materials such fluoropolyether urethanes such as those disclosed in 7,575,847, and other low refractive index material such as those disclosed in U.S. patent application Ser. Nos. 11/972,034; 12/559,690; 12/294,694; 10/098,813; 11/026,614; and U.S. Pat. Nos. 7,374,812; 7,709,551; 7,625,984; 7,164,536; 5,594,830 and 7,419,707, the contents of each are incorporated by reference herein.

Materials such a nanoparticles (Titanium dioxide, and other oxides for example), blends, alloys, doping, sol gel, and other techniques may be used to increase or decrease the refractive index of a material.

In another embodiment of this invention the refractive index or location of a region of lightguide or lightguide region changes in response to environmental changes or controlled changes. These changes can include electrical current, electromagnetic field, magnetic field, temperature, pressure, chemical reaction, movement of particles or materials (such as electrophoresis or electrowetting), optical irradiation, orientation of the object with respect to gravitational field, MEMS devices, MOEMS devices, and other techniques for changing mechanical, electrical, optical or physical properties such as those known in the of smart materials. In one embodiment of this invention, the light extraction feature couples more or less light out of the lightguide in response to an applied voltage or electromagnetic field. In one embodiment of this invention, the light emitting device comprises a lightguide wherein properties of the lightguide (such as the position of the lightguide) which change to couple more less light out of a lightguide such as those incorporated in MEMs type displays and devices as disclosed in U.S. patent application Ser. Nos. 12/511,693; 12/606,675; 12/221,606; 12/258,206; 12/483,062; 12/221,193; 11/975,411 11/975,398; 10/312,003; 10/699,397 and U.S. Pat. Nos. 7,586,560; 7,535,611; 6,680,792; 7,556,917; 7,532,377; and 7,297,471, the contents of each are incorporated by reference herein.

Edges of the Lightguide

In one embodiment of this invention, the edges of the lightguide or lightguide region are coated, bonded to or disposed adjacent to a specularly reflecting material, partially diffusely reflecting material, or diffuse reflecting material. In one embodiment of this invention, the lightguide edges are coated with a specularly reflecting ink comprising nano-sized or micron-sized particles or flakes which reflect the light substantially specularly. In another embodiment of this invention, a light reflecting element (such as a multi-layer mirror film with high reflectivity such as 3M ESR film) is disposed near the lightguide edge and is disposed to receive light from the edge and reflect it and direct it back into the lightguide. In another embodiment of this invention, the lightguide edges are rounded and the percentage of light diffracted from the edge is reduced. One method of achieving rounded edges is by using a laser to cut the lightguide from a film and achieve edge rounding through control of the processing parameters (speed of cut, frequency of cut, laser power, etc.). In another embodiment of this invention, the edges of the lightguide are tapered, angled serrated, or otherwise cut or formed such that light from a light source traveling within the coupling lightguide reflects from the edge such that it is directed into an angle closer to the optical axis of the light source, toward a folded or bent region, or toward a lightguide or lightguide region, or toward the optical axis of the light emitting device.

Surfaces of the Lightguide

In one embodiment of this invention, at least one surface of the lightguide or lightguide region is coated, bonded to or disposed adjacent to a specularly reflecting material, partially diffusely reflecting material, or diffuse reflecting material. In one embodiment of this invention, at least on lightguide surface is coated with a specularly reflecting ink comprising nano-sized or micron-sized particles or flakes which reflect the light substantially specularly. In another embodiment of this invention, a light reflecting element (such as a multi-layer mirror film with high reflectivity such as 3M ESR film) is disposed near the lightguide surface opposite the light emitting surface and is disposed to receive light from the surface and reflect it and direct it back into the lightguide. In another embodiment of this invention, the outer surface of at least one lightguide or component coupled to the lightguide comprises a microstructure to reduce the appearance of fingerprints. Such microstructures are known in the art of hardcoatings for displays and examples are disclosed in U.S. patent application Ser. No. 12/537,930, the contents of which are incorporated by reference herein.

Shape of the Lightguide

In one embodiment of this invention, at least a portion of the lightguide shape or lightguide surface is at least one selected from the group of substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism and other known geometrical solids or shapes. In one embodiment of this invention, the lightguide is a film which has been formed into a shape by thermoforming or other forming technique. In another embodiment of this invention, the film or region of the film is tapered in at least one direction. In a further embodiment of this invention, a light emitting device comprises a plurality of lightguides and a plurality of light sources physically couple or arranged together (such as tiled in a 1×2 array for example). In another embodiment of this invention, the lightguide region of the film is substantially in the shape of one selected from the group of rectangular, square, circle, doughnut shaped (elliptical with a hole in the inner region), elliptical, linear strip, tube (with a circular, rectangular, polygonal, or other shaped cross-section).

In one embodiment of this invention, a light emitting device comprises a lightguide formed from a film into a hollow cylindrical tube comprises coupling lightguide strips branching from the film on a short edge toward the inner portion of the cylinder. In another embodiment of this invention, a light emitting device comprises a film lightguide with coupling lightguides cut into the film so that they remain coupled to the lightguide region and the central strip is not optically coupled to the lightguide and provides a spine with increased stiffness in at least one direction near the central strip region or lightguide region near the strip. In a further embodiment of this invention, a light emitting device comprises lightguides with light input couplers arranged such that the light source is disposed in the central region of the edge of the lightguide and that the light input coupler (or a component thereof) does not extend past the edge and enables the lightguides to be tiled in at least one of a 1×2, 2×2, 2×3, 3×3 or larger array. In another embodiment of this invention, a light emitting device comprises light emitting lightguides wherein the separation between the lightguides in at least one direction along the light emitting surface is less than one selected from the group of 10 mm, 5 mm, 3 mm, 2 mm, 1 mm and 0.5 mm.

In another embodiment of this invention, the lightguide comprises single fold or bend near an edge of the lightguide such that the lightguide folds under or over itself. In this embodiment, light which would ordinarily be lost at the edge of a lightguide may be further extracted from the lightguide after the fold or bend to increase the optical efficiency of the lightguide or device. In another embodiment of this invention, the light extraction features on the lightguide disposed in the optical path of the light within the lightguide after the fold or bend provide light extraction features that increase at least one selected from the group of the luminance, luminance uniformity, color uniformity, optical efficiency, image or logo clarity or resolution.

Edges Fold Around Back onto the Lightguide

In one embodiment of this invention, at least one edge region of the lightguide, lightguide region or coupling lightguides folds or bends back upon itself and is optically coupled to the lightguide, lightguide region or coupling lightguide such that a portion entering the edge region is coupled back into the lightguide, lightguide region, or coupling lightguide in a direction away from the edge region. The edge regions may be adhered using an adhesive such as PSA or other adhesive, thermally bonded, or otherwise optically coupled back onto the lightguide, lightguide region, or coupling lightguide. In one embodiment of this invention, folding the edge regions of the lightguide redirects light that would normally exit the edge of the film back into the lightguide, and the optical efficiency of the system is increased.

In another embodiment of this invention, the thickness of the lightguide, lightguide region, or coupling lightguide is thinner in the region near an edge than the average thickness of the lightguide in the light emitting region or lightguide region. In another embodiment of this invention, the thickness of the lightguide, lightguide region, or coupling lightguide is less than one selected from the group of 90%, 80%, 70%, 60%, 50%, 40%, 30%, 20%, 10%, and 5% of the average thickness of the lightguide in the light emitting region or lightguide region.

In one embodiment of this invention, the thickness of the lightguide, lightguide region, or coupling lightguide is tapered in the region near an edge. In one embodiment of this invention, tapering the thickness in the region near edge permits more light to couple back into the lightguide when it is optically coupled to the surface of the lightguide or lightguide region.

In one embodiment of this invention, the light emitting device has an optical efficiency, defined as the luminous flux of the light exiting the light emitting device in the light emitting region divided by the luminous flux of the light exiting the light source disposed to direct light into the input coupler, greater than one selected from the group of 50%, 60%, 70%, 80%, and 90%.

In another embodiment of this invention, the edge region of a lightguide not disposed to receive light directly from a light source or light input coupler is formed or coupled into a light output coupler comprising coupling lightguides which are folded or bent to create a light output surface. In another embodiment of this invention, the light output surface is optically coupled to or disposed proximal to a light input surface of a light input coupler for the same lightguide or film or a second lightguide or film. In this embodiment, the light reaching the edge of a lightguide may be coupled into coupling strips which are folded and bent to direct light back into the lightguide and recycle the light.

Lightguide Material

In one embodiment of this invention, a light emitting device comprises a lightguide or lightguide region formed from at least one light transmitting material. In one embodiment of this invention, the lightguide is a film comprising at least one core region and at least one cladding region, each comprising at least one light transmitting material. In one embodiment of this invention, the core material is substantially flexible (such as a rubber or adhesive) and the cladding material supports and provides at least one of the increased flexural modulus, impact strength, tear resistance, and scratch resistance for the combined element. In another embodiment of this invention, the cladding material is substantially flexible (such as a rubber or adhesive) and the core material supports and provides at least one of the increased flexural modulus, impact strength, tear resistance, and scratch resistance for the combined element.

The light transmitting material used within an embodiment of this invention may be a thermoplastic, thermoset, rubber, polymer, high transmission silicone, glass, composite, alloy, blend, silicone, other light transmitting material, or a combination thereof.

In one embodiment of this invention, a component or region of the light emitting device comprises a light transmitting material selected from the group of cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins(e.g., homopolyesters, for example, polyalkylene terephthalates such as polyethylene terephthalate and polybutylene terephthalate, polyalkylene naphthalates corresponding to the polyalkylene terephthalates; copolyesters containing an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer.

The styrenic resin includes, for example, a homopolymer such as a polystyrene; styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer.

The acrylic resin includes, for example, a homo- or copolymer of a (meth)acrylate (e.g., poly(C.sub.1-4 alkyl (meth)acrylate) such as poly(methyl methacrylate); a homo- or copolymer of (meth)acrylic acid; polyacrylonitrile.

In one embodiment of this invention, at least one of the light input coupler, coupling lightguide, light mixing region, lightguide region, or lightguide comprises a first polymer or second polymer. In one embodiment of this invention, the first polymer is processed to obtain a high birefringence. In another embodiment of this invention, the second polymer is processed to obtain a low level of birefringence. Although many polymers may be chosen as the first polymer, certain of the polyesters have the capability for particularly large birefringence. Among these, polyethylene 2,6-naphthalate (PEN) is frequently chosen as a first polymer for films of the present invention. It has a very large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4- cyclohexanedicarboxylic acid and its isomers and 2,6-decahydronaphthalene dicarboxylic acid and its isomers, bi- or multi-cyclic dicarboxylic acids (such as the various isomeric norbornene and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications of the current invention.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids maybe used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a polymer is dependent not only on the intended application of the film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly (4-methyl)pentene), fluorinated polymers and copolymers (such as polytetrafluoroethylene, polytrifluoroethylene, polyvinylidene fluoride, polyvinyl fluoride, fluorinated ethylenepropylene copolymers, perfluoroalkoxy resins, polychlorotrifluoro ethylene, polyethylene-co-trifluoro ethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

In one embodiment of this invention, the thermoplastic resin is a polycarbonate resin or the like. The polycarbonate resin is obtained by reacting a diphenol with a carbonate precursor by solution polymerization or melt polymerization. The diphenol is preferably 2,2-bis(4-hydroxyphenyl)propane (so-called "bisphenol A") but other diphenol may be used as part or all of the diphenol. Examples of the other diphenol include 1,1-bis(4-hydroxyphenyl)ethane, 1,1-bis(4-hydroxyphenyl)cyclohexane, 2,2-bis(4-hydroxy-3,5-dimethylphenyl-)propane, 2,2-bis(4-hydroxy-3-methylphenyl)propane, bis(4-hydroxyphenyl)sulfideandbis(4-hydroxyphenyl)sulfone. The polycarbonate resin is preferably a resin which comprises bisphenol A in an amount of 50 mol % or more, particularly preferably 70 mol % or more of the total of all the diphenols. Examples of the carbonate precursor include phosgene, diphenyl carbonate, bischloroformates of the above diphenols, di-p-tolyl carbonate, phenyl-p-tolyl carbonate, di-p-chlorophenyl carbonate and dinaphthyl carbonate. Out of these, phosgene and diphenyl carbonate are particularly preferred.

When a polycarbonate material is used in a component in one embodiment of this invention, the polymerization degree of the polycarbonate resin is not particularly limited. A suitable molecular weight control agent, a branching agent for improving workability, catalyst for promoting the reaction, stabilizer such as a phosphorous acid ester, phosphoric acid ester or phosphonic acid ester, flame retardant such as tetrabromobisphenol A, a low molecular weight polycarbonate of tetrabromobisphenol A, decabromodiphenyl ether, colorant and lubricant may be optionally added to produce the polycarbonate resin.

The light transmitting material of one embodiment of this invention may also be a cellulosic material or cellulosic derivatives (such as ethyl cellulose, cellulose acetate, cellulose propionate, cellulose acetate butyrate, and cellulose nitrate). Raw materials for the cellulose ester used in the invention are not specifically limited, and include cotton lint, tree pulp and kenaf. The cellulose ester derived from these raw materials may be used in combination in an arbitrary amount ratio.

The cellulose ester in one embodiment of this invention is prepared by esterifying cellulose as raw material with an acylating agent, for example, an acid anhydride (acetic anhydride, propionic anhydride, or butyric anhydride), in an organic acid such as acetic acid or in an organic solvent such as methylene chloride in the presence of a protic catalyst such as sulfuric acid or by esterifying cellulose as raw material with an acylating agent, an acid chloride (for example, $CH_3COCl$, $C_2H_5COCl$, or $C_3H_7COCl$) in the presence of a basic compound as a catalyst such as an amine A cellulose ester can be prepared according to a method described, for example, in Japanese Patent O.P.I. Publication No. 10-45804. The cellulose ester is obtained by substituting the hydrogen of the hydroxyl group of the cellulose with an acyl group. The cellulose ester molecule is comprised of many glucose units connected, each glucose unit having three hydroxyl groups. The number of hydrogen groups of the hydroxyl group substituted by the acyl group is referred to as an acyl substitution degree. For example, cellulose triacetate is one in which all the hydrogens of the hydroxyl groups of cellulose are substituted with an acyl group.

In one embodiment of this invention, the cellulose ester has in addition to an acetyl group, further an propionyl group and/or a butyryl group such as cellulose acetate propionate, cellulose acetate butyrate (n-butyrate or iso-butyrate), or cellulose acetate propionate butyrate (n-butyrate or iso-butyrate). A cellulose acetate propionate having a high substitution degree of a propionate group has excellent water resistance. Other light transmitting materials may be used in an embodiment of this invention such as a thermoplastic resin containing an alicyclic structure, for example, (1) norbornene-based polymers, (2) monocyclic cyclic olefin-based polymers, (3) cyclic conjugated diene-based polymers, (4) vinyl alicyclic hydrocarbon-based polymers, and others such as those disclosed in U.S. Pat. No. 6,835,440, the contents of which are incorporated by reference herein.

Outermost Surface of the Film or Lightguide

In one embodiment of this invention, the outermost surface of the film, lightguide or lightguide region comprises at least one of a cladding, surface texture to simulate a soft feel or match the surface texture of cloth or upholstery, a refractive elements to collimate light from the light extraction features (such as microlens array), adhesive layer, removable backing material, and rubber surface.

Light Extraction Method

In one embodiment of this invention, at least one of the lightguide, lightguide region, or light emitting region comprises at least one light extraction feature or region. In one embodiment, the light extraction region may be a raised or recessed surface pattern or a volumetric region. Raised and recessed surface patterns include scattering material, raised lenses, scattering surfaces, pits, grooves, surface modulations, microlenses, lenses, diffractive surface features, holographic surface features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces or a combination thereof. The volumetric scattering regions within the light extraction region may comprise dispersed phase domains, voids, absence of other materials or regions (gaps, holes), air gaps, boundaries between layers and regions, and other refractive index discontinuities within the volume of the material different that co-planar layers with parallel interfacial surfaces. In one embodiment of this invention, the light extracting region comprises angled or curved surface or volumetric light extracting features that redirect a first redirection percentage of light into an angular range within 5 degrees of the normal to the light emitting surface of the light emitting device. In another embodiment of this invention, the first redirection percentage is greater than one selected from the group of 5, 10, 20, 30, 40, 50, 60, 70, 80, and 90. In one embodiment of this invention, the light extraction features are light redirecting features, light extracting regions or light output coupling features.

Visibility of Light Extraction Features

In one embodiment of this invention, at least one light extraction region comprises light extraction features which have a low visibility to the viewer when the region is not illuminated by light from within the lightguide (such as when the device is in the off-state or the particular lightguide in a multi-lightguide device is not illuminated). In one embodiment of this invention, the luminance at a first measurement angle of at least one selected from the group of lightguide region, square centimeter measurement area of the light emitting surface corresponding to light redirected by at least one light extraction feature, light emitting region, light extraction feature, or light extracting surface feature or collection of light extraction features is less than one selected from the group of 0.5 cd/m$^2$, 1 cd/m$^2$, 5 cd/m$^2$, 10 cd/m$^2$, 50 cd/m$^2$, and 100 cd/m$^2$ when exposed to diffuse illuminance from an integrating sphere of one selected from the group of 10 lux, 50 lux, 75 lux, 100 lux, 200 lux, 300 lux, 400 lux, 500 lux, 750 lux, and 1000 lux when place over a black, light absorbing surface (such as a black velour cloth material, black anodized aluminum, or over a window to a light trap box (box with light absorbing black velour or other material lining the walls). In one embodiment of this invention, the first measurement angle for the luminance is one selected from the group of 0 degrees, 5 degrees, 8 degrees, 10 degrees, 20 degrees, 40 degrees, 0-10 degrees, 0-20 degrees, 0-30 degrees, 0-40 degrees. In one embodiment of this invention, the luminance of the light emitted from a 1 cm$^2$ measurement area of the light emitting surface corresponding to light redirected by at least one light extracting feature is less than 100 cd/m2 when exposed to a diffuse illuminance of 200 lux from an integrating sphere when placed over Light Absorbing Black-Out Material from Edmund Optics. In another embodiment of this invention, the luminance of the light emitted from a 1 cm$^2$ measurement area of the light emitting surface corresponding to light redirected by at least one light extracting feature is less than 50 cd/m$^2$ when exposed to a diffuse illuminance of 200 lux from an integrating sphere when placed over Light Absorbing Black-Out Material from Edmund Optics. In another embodiment of this invention, the luminance of the light emitted from a 1 cm$^2$ measurement area of the light emitting surface corresponding to light redirected by at least one or an average of all light extracting features is less than 25 cd/m$^2$ when exposed to a diffuse illuminance of 200 lux from an integrating sphere when placed over Light Absorbing Black-Out Material from Edmund Optics. In one embodiment of this invention, the thin lightguide film permits smaller features to be used for light extraction features or light extracting surface features to be spaced further apart due to the thinness of the lightguide. In one embodiment of this invention, the average largest dimensional size of the light extracting surface features in the plane parallel to the light emitting surface corresponding to a light emitting region of the light emitting device is less than one selected from the group of 3 mm, 2 mm, 1 mm, 0.5 mm, 0.25 mm, 0.1 mm, 0.080, 0.050 mm, 0.040 mm, 0.025 mm, and 0.010 mm.

In one embodiment of this invention, the individual light extracting surface features or regions (pixel) is not discernable as an individual pixel when the device is emitting light in an on state and is not readily discernable when the light emitting device is in the off state when viewed at a distance greater than one selected from the group of 10 centimeters, 20 centimeters, 30 centimeters, 40 centimeters, 50 centimeters, 100 centimeters, and 200 centimeters. In this embodiment, the area may appear to be emitting light, but the individual pixels or sub-pixels cannot be readily discerned from one another. In another embodiment of this invention, the intensity or color of a light emitting region of the light emitting device is controlled by spatial or temporal dithering or halftone printing. In one embodiment of this invention, the average size of the light extracting regions in a square centimeter of a light emitting region on the outer surface of the light emitting device is less than 500 microns and at least one of the color or luminance is varied by increasing or decreasing the number of light extracting regions within a predetermined area.

In one embodiment of this invention, the light emitting device is a sign with a light emitting surface comprising at least one light emitting regions, light extracting regions, or light extraction feature which is not readily discernable by a person with a visual acuity between 0.5 and 1.5 arcminutes at a distance of 20 cm when illuminated with 200 lux of diffuse light in front of Light Absorbing Black-Out Material from Edmund Optics.

In another embodiment of this invention, the fill factor of the light extracting features, defined as the percentage of the area comprising light extracting features in a square centimeter in a light emitting region, surface or layer of the lightguide or film, is one selected from the group of less than 80%, less than 70%, less than 60%, less than 50%, less than 40%, less than 30%, less than 20%, and less than 10%. The fill factor can be measured within a full light emitting square centimeter surface region or area of the lightguide or film (bounded by region is all directions within the plane of the lightguide which emit light) or it may be the average of the light emitting areas of the lightguides. The fill factor may be measured when the light emitting device is in the on state or in the off state (not emitting light) where in the off state, the light extracting features are defined as visual discontinuities seen by a person with average visual acuity at a distance of less than 10 cm.

In another embodiment of this invention, the light emitting device is a sign with a light emitting surface comprising light emitting regions wherein when the device is not emitting light, the angle subtended by two neighboring light extracting features that are visible when the device is on, at a distance of 20 cm is less than one selected from the group of 0.001 degrees, 0.002 degrees, 0.004 degrees, 0.008 degrees, 0.010 degrees, 0.015 degrees, 0.0167 degrees, 0.02 degrees, 0.05 degrees, 0.08 degrees, 0.1 degrees, 0.16 degrees, 0.2 degrees, 0.3 degrees, 0.4 degrees, 0.5 degrees, 0.6 degrees, 0.7 degrees, 0.8 degrees, 1 degree, 2 degrees, and 5 degrees. In another embodiment of this invention, the light emitting device is a sign with a light emitting surface comprising light emitting regions wherein when the device is not emitting light, the angle subtended by two neighboring light extracting features (that are which are not easily visible when the device is off when illuminated with 200 lux of diffuse light) at a distance of 20 cm is less than one selected from the group of 0.3 degrees, 0.4 degrees, 0.5 degrees, 0.6 degrees, 0.7 degrees, 0.8 degrees, 1 degree, 2 degrees, and 5 degrees.

In a further embodiment of this invention, the light extraction features of the light emitting device comprise light scattering domains of a material with a different refractive index than the surrounding material. In one embodiment of this invention, the light scattering domain has a concentration within the continuous region having light scattering domains (such as an inkjet deposited white ink pixel) less than one selected from the group of 50%, 40%, 30%, 20%, 10%, 5%, 3%, 1%, 0.5%, and 0.1% by volume or weight. The concentration or thickness of the light scattering domains may vary in the x, y, or z directions and the pixel or region may be overprinted to increase the thickness. In another embodiment of this invention, the light extracting features have a light absorbing region disposed between the light extracting feature and at least one output surface of the light emitting device. For example, the light extracting features could be titanium dioxide based white inkjet deposited pixels deposited on a lightguide and the light absorbing ink (such as a black dye or ink comprising carbon black particles) is deposited on top of the white ink such that 50% of the light scattered from the white pixel is transmitted through the light absorbing ink. In this example, the ambient light that would have reflected from the white ink if there were no light absorbing ink is reduced by 75% (twice passing through the 50% absorbing ink) and the visibility of the dots is reduced while sufficient light from the lightguide is emitted from the light emitting device in the region near the white pixel. In another embodiment of this invention, a light absorbing material absorbing at least one selected from the group of 5%, 10%, 20%, 30%, 40%, 50%, 60%, and 70% of the light emitted from a first light extracting feature is disposed between the light extracting feature and at least one outer surface of the light emitting device.

Multiple Lightguides

In one embodiment of this invention, a light emitting device comprises more than one lightguide to provide at least one of color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, large area light emitting devices comprised of smaller light emitting devices. In another embodiment of this invention, a light emitting device comprises a plurality of lightguides optically coupled to each other. In another embodiment of this invention, at least one lightguide or a component thereof comprises a region with anti-blocking features such that the lightguides do not substantially couple light directly into each other due to touching. In some embodiments, the need for a cladding can be reduced or alleviated by using anti-blocking materials to maintain separation (and air gap) over regions of the lightguide surfaces.

Lightguide Folding Around Components

In one embodiment of this invention, at least one of the lightguide, lightguide region, light mixing region, plurality of lightguides, coupling lightguides or light input coupler bends or folds such that other components of the light emitting device are hidden from view, located behind them, or are partially or fully enclosed. These components around which they may bend or fold include components of the light emitting device such as light source, electronics, driver, circuit board, thermal transfer element, housing, holder, or other components are disposed behind the folded or bent lightguide or other region or comp. In one embodiment of this invention, a frontlight for a reflective display comprises a lightguide, coupling lightguides and a light source wherein the light source is disposed substantially behind the display.

Curled Edge of Lightguide to Recycle Light

In one embodiment of this invention, a lightguide edge region is curled back upon itself and optically coupled to a region of the lightguide such that light traveling toward the edge will follow the curl and travel back into the lightguide. In one embodiment of this invention, the cladding area is removed from the lightguide from both surfaces which are to be optically coupled or bonded together. More than one edge may be curled or bent back upon itself to recycle light back into the lightguide.

Registration Holes

In one embodiment of this invention, at least one lightguide, lightguide region, light mixing region, light input coupler, housing, holding device and plurality of lightguides comprises at least one hole suitable for registration with another component of the device that contains at least one pin or object which may pass through the at least one hole.

Multiple Lightguides Connected by Coupling Lightguides

In one embodiment of this invention, two or more lightguides are optically coupled together by a plurality of coupling lightguides. In one embodiment of this invention a film comprises a first continuous lightguide region and strip-like sections cut in a region disposed between the first continuous lightguide region and a second continuous lightguide region. In one embodiment of this invention, the strips are cut and the first and second continuous lightguide regions are translated relative to each other such that the strips (coupling lightguides in this embodiment) are folding and overlapping. The resulting first and second lightguide regions may be separate regions such as a keypad illuminator and an LCD backlight for a cellphone which are connected by the coupling lightguides. The first and second lightguide regions may also both intersect a light normal to the film surface in one or more regions such that the first and second lightguide regions at least partially overlap. The first and second lightguide regions may have at least one light input coupler. By coupling the first and second lightguide regions together through the use of coupling lightguides, the light from an input coupler coupled into the first lightguide region is not lost, coupled out of, or absorbed when it reaches the end of the first lightguide region and may further travel on to the second lightguide region. This can allow more light extraction regions for a specific region since the lightguides overlap in a region. In one embodiment of this invention, at least one region disposed to receive light between the first and second lightguide regions may comprise a light absorbing filter such that the light reaching the second lightguide region comprises a different wavelength spectral profile and a second color can be extracted from the second lightguide region different to the first color extracted from the first lightguide extracting region. More than two lightguide regions illuminated by a first input coupler with one, two, or more than two light emitting colors may be used and separate lightguides (or lightguide regions) with separate light input couplers may be disposed behind, in-between, or above one or more of the lightguide regions illuminated by the first input coupler. For example, a first light input coupler directs white light from an LED into the first lightguide region wherein the light extracting regions extract light creating a first white image, and the light which is not extracted passes into coupling lightguides on the opposite end which have a striped region optically coupled to the lightguide (such as an red colored ink stripe) which substantially absorbs the non-red portions of the spectrum. This light further travels into the second lightguide region where a portion of the light is extracted out of the lightguide as red light in a red image. Similarly, other colors including subtractive colors may be used to create a multiple-colors of light emitting from multiple lightguide regions and the light extracting region may overlap to create additive color mixing. Two or more lightguides or lightguide regions may overlap wherein the optical axes of the light traveling within the lightguide are at approximately 90 degrees to each other.

Other Components

In one embodiment of this invention, the light emitting device comprises at least one selected from the group of power supply, batteries (which may be aligned for a low profile or low volume device), thermal transfer element (such as a heat sink, heat pipe, or stamped sheet metal heat sink), frame, housing, heat sink extruded and aligned such that it extends parallel to at least one side of the lightguide, multiple folding or holding modules along a thermal transfer element or heat sink, thermal transfer element exposed to thermally couple heat to a surface external to the light emitting device, and solar cell capable of providing power, communication electronics (such as needed to control light sources, color output, input information, remote communication, Wi-Fi control, Bluetooth® control, wireless internet control, etc.), a magnet for temporarily affixing the light emitting device to a ferrous or suitable metallic surface, motion sensor, proximity sensor, forward and backwards oriented motion sensors, optical feedback sensor (including photodiodes or LEDs employed in reverse as detectors), controlling mechanisms such as switches, dials, keypads (for functions such as on/off, brightness, color, color temp, presets (for color, brightness, color temp, etc.), wireless control), externally triggered switches (door closing switch for example), synchronized switches, and light blocking elements to block external light from reaching the lightguide or lightguide region or to block light emitted from a region of the light emitting device from being seen by a viewer.

In another embodiment of this invention, a light emitting device comprises a film lightguide that emits light and also detects light changes within the lightguide and provides touch screen functionality. In one embodiment of this invention, a film lightguide comprises coupling lightguides disposed to receive light from a light source and direct the light into a lightguide to provide a backlight or frontlight and at least one coupling lightguide disposed to detect changes in light intensity (such as lower light levels due to light being frustrated and absorbed by coupling light into a finger in touched location). More than one light intensity detecting lightguide may be used. Other configurations for optical lightguide based touch screens are known in the art and may be used in conjunction with embodiments of this invention.

In another embodiment of this invention a touchscreen comprises at least two film lightguides. In another embodiment of this invention, a touchscreen device comprises a light input coupler used in reverse to couple light from a film lightguide into a detector. In another embodiment of this invention, the light emitting device or touch screen is sensitive to pressure in that when a first film or first lightguide is pressed or pressure is applied, the first film is moved into sufficient optical contact with a second film or second lightguide wherein at least one of light from the first lightguide or first lightguide is coupled into is coupled into the second film or second lightguide, light from the second film or second lightguide is coupled into the first film or first lightguide, or light couples from each lightguide or film into the other.

Light Absorbing Region or Layer

In one embodiment of this invention, at least one of the cladding, adhesive, layer disposed between the lightguide or lightguide region and the outer light emitting surface of the light emitting device, patterned region, printed region, or extruded region on one or more surfaces or within the volume of the film comprises a light absorbing material which absorbs a first portion of light in a first predetermined wavelength range. In one embodiment of this invention, the first predetermined wavelength range includes light from 300 nm to 400 nm and the region absorbs UV light that could degrade or yellow the lightguide region, layer or other region or layer. In one embodiment of this invention, the cladding region is disposed between the light absorbing region and the lightguide such that the light traveling through the lightguide and the evanescent portion of the light travelling within the lightguide is not absorbed due to the absorbing region since it does not pass through the absorbing region unless it is extracted from the lightguide. In another embodiment of this invention, the light absorbing region or layer is an arrangement of light absorbing, light fluorescing, or light reflecting and absorbing regions which selectively absorb light in a predetermine pattern to provide a light emitting device with spatially varying luminance or color (such as in a dye-sublimated or inject printed overlay which is laminated or printed onto a layer of the film to provide a colored image, graphic, logo or indicia). In another embodiment of this invention, the light absorbing region is disposed in close proximity to the light extracting region such that the light emitted from the light emitting device due to the particular light extraction feature has a predetermined color or luminous intensity. For example, inks comprising titanium dioxide and light absorbing dyes can be disposed on the lightguide regions such that a portion of the light reaching the surface of the lightguide in that region passes through the dye and is extracted due to the light extraction feature or the light is extracted by the light extraction feature and passes through the dye.

In one embodiment of this invention, a light emitting device comprises a five layer lightguide region with a UV light absorbing material disposed in the outer layers which are both optically coupled to cladding layers which are both optically coupled to the inner lightguide layer. In one embodiment of this invention, a 5 layer film comprises a polycarbonate material in the central lightguide layer with low refractive index cladding layers of a thickness between 1 micron and 150 microns optically coupled to the lightguide layer and a UV light absorbing material in the outer layers of the film.

In another embodiment of this invention, a light absorbing material is disposed on one side of the light emitting device such that the light emitted from the device is contrasted spatially against a darker background. In one embodiment of this invention, a black PET layer or region is disposed in proximity to one side or region of the light emitting device. In another embodiment of this invention, white reflecting regions are disposed in proximity to the light extracting region such that the light escaping the lightguide in the direction of the white reflecting region is reflected back toward the lightguide. In one embodiment of this invention, a lightguide comprises a lightguide region and a cladding region and a light absorbing layer is disposed (laminated, coated, co-extruded, etc.) on the cladding region. Light from a laser cuts (or ablates) regions in the light absorbing layer and also creates cut or a light extracting regions in at least one of the cladding region and lightguide region. A white reflecting film such as a white PET film with voids is disposed next to the light absorbing region. The white film may be laminated or spaced by an airgap, adhesive or other material. In this example, a portion of the light extracted in the light extracting regions formed by the laser is directed toward the white film and reflected back through the lightguide where a portion of this light escapes the lightguide on the opposite side and increases the luminance of the region. This example illustrates an example where registration of the white reflecting region, black reflection region, and light extracting regions are not necessary since the laser created holes in the black film and created the light extracting features at the same time. This example also illustrates the ability for the light emitting device to display an image, logo, or indicia in the off state where light is not emitted from the light source since the white reflective regions reflect ambient light. This is useful, for example, in a sign application where power can be saved during the daytime since ambient light can be used to illuminate the sign. The light absorbing region or layer may also be a colored other than black such as red, green, blue, yellow, cyan, magenta, etc.

In another embodiment of this invention, the light absorbing region or layer is a portion of another element of the light emitting device. In one embodiment of this invention, the light absorbing region is a portion of the black housing comprising at least a portion of the input coupler that is optically coupled to the cladding region using an adhesive.

In another embodiment of this invention, the cladding, outer surface or portion of the lightguide of a light emitting device comprises a light absorbing region such as a black stripe region that absorbs more than one selected from the group of 50%, 60%, 70%, 80% and 90% of the visible light traveling within the cladding region. In another embodiment of this invention, the lightguide is less than 200 microns in thickness and a light absorbing region optically coupled to the cladding absorbs more than 70% of the light traveling within the cladding which passes through the lightguide passing the light absorbing region, wherein the thickness of the cladding in the direction of the light traveling within the lightguide is less than one selected from the group of 10 millimeters, 5 millimeters, 3 millimeters, 2 millimeters, and (millimeter. In another embodiment of this invention, the light absorbing region has a width in the direction of propagation of light within the lightguide between one selected from the group of 0.5-3 millimeters, 0.5-6 millimeters, and 0.5-12 millimeters.

In one embodiment of this invention, the light absorbing region is at least one selected from the group of a black line, a patterned line, a pattern shape or collection of shapes, patterned on one or both sides of the film, cladding, or layer optically coupled to the cladding, patterned on one or more lightguide couplers, patterned in the light mixing region, patterned in the lightguide, patterned in the lightguide region. In another embodiment of this invention, the light absorbing region is patterned during the cutting step for the film, coupling lightguides, or cutting step of other regions, layers or elements. In another embodiment of this invention, the light absorbing region covers at least one percentage of surface area of the coupling lightguides selected from the group of 1%, 2%, 5%, 10%, 20%, and 40%.

Adhesion Properties of the Lightguide, Film, Cladding or Other Layer

In one embodiment of this invention, at least one of the lightguide, light transmitting film, cladding, and layer disposed in contact with a layer of the film has adhesive properties. In one embodiment of this invention, the cladding is a "low tack" adhesive that allows the film to be removed from a window or substantially planar surface while "wetting out" the interface. By "wetting out" the interface as used herein, the two surfaces are optically coupled such that the Fresnel reflection from the interfaces at the surface is less than 2%. The adhesive layer or region may comprise a polyacrylate adhesive, animal glue or adhesive, carbohydrate polymer as an adhesive, natural rubber based adhesive, polysulfide adhesive, tannin based adhesive, lignin based adhesive, furan based adhesive, urea formaldehyde adhesive, melamine formaldehyde adhesive, isocyanate wood binder, polyurethane adhesive, polyvinyl and ethylene vinyl acetate, hot melt adhesive, reactive acrylic adhesive, anaerobic adhesive, or epoxy resin adhesive.

In one embodiment of this invention, the adhesive layer or region has an ASTM D 903 (modified for 72 hour dwell time) peel strength to standard window glass less than one selected from the group 70 oz/in, 50 oz/in, 40 oz/in, 30 oz/in, 20 oz/in and 10 oz/in. In another embodiment of this invention, the adhesive, when adhered to glass, will support the weight of the light emitting device.

Removable Protective Layer

In one embodiment of this invention, the light emitting device comprises a removable protective layer. In another embodiment of this invention, a light transmitting film is disposed on the outer surface of the light emitting device and the ASTM D 903 (modified for 72 hour dwell time) peel strength to the lightguide is less than one selected from the group 70 oz/in, 50 oz/in, 40 oz/in, 30 oz/in, 20 oz/in and 10 oz/in. In another embodiment of this invention, when the outer surface of the light emitting device becomes scratched, damaged, or reduces the optical performance of the light emitting device, the outer layer of the film may be removed. In a further embodiment of this invention, a tag or extended region of the protective layer allows the individual layer to be removed while maintaining the integrity or position of the lightguide beneath which may have one or more additional protective layers disposed thereupon. In one embodiment of this invention, a thin film-based lightguide disposed as a frontlight for a reflective display comprises removable protective layers. The protective layers may be thin or thick and may comprise materials such as those used as display screen protectors, anti-reflection coatings, anti-glare coatings or surfaces, hardcoatings, circular polarizers, or surface structures that reduce the visibility of fingerprints such as those disclosed in U.S. patent application Ser. No. 12/537,930, the contents of which are incorporated by reference herein.

Removable Component Comprising Automatic Identification or Data Capture

In one embodiment of this invention, a removable component or cartridge of the light emitting device comprises an automatic identification and data capture method such as indicia or an information carrying method to provide information readable by the light emitting device. In another embodiment of this invention, at least one of the light input coupler, coupling lightguides, light mixing region, lightguide region, lightguide, film, cladding region, housing for light input coupler or separate component of the device comprises indicia or information carrying method that provides information to the light emitting device. The information provided by the indicia or information carrying method may comprise information related to changing the light output of the light emitting device from a first state to a second state. In one embodiment of this invention, the indicia or information carrying method provides information to the light emitting device that directs the light emitting device to at least one of turn on, turn off, adjust the overall intensity of the light output, adjust the relative intensity of light output from one or more light sources (such as to change the color from warm white to a cool white, from red to blue, change the color over time based on expected LED degradation rates, from a white based on RGB to white based on white LEDs, etc.) in one or more regions (such as turn on blue only in one region to illuminate a blue region of a logo corresponding to water) or lightguides (turning on one lightguide for the flashing "Sale" logo within the lightguide to be illuminated on top of a soft drink bottle advertisement), preset average colors, preset times for on and off, preset identification lights for time to change the lightguide film or light source, alarms or special turn on times, information related to authenticity of the component for anti-counterfeiting, location specific information, component lifetime information (the light emitting device could display information relating to "Time to change the film" or "Battery life is low" or "Call for Service (555) 555-5555". In another embodiment of this invention, the removable component comprises multiple lightguide layers and information and an information carrying method to prescribe which lightguide or combination of lightguides should turn on in relation to the date or time information in a clock within the light emitting device. For example, a stack of lightguides could comprise lightguides with images corresponding to images for Christmas, Thanksgiving, St. Patrick's Day, Halloween, etc which could come on at the appropriate predetermined time of year for a light emitting window display.

In one embodiment of this invention, the indicia comprises information in the form of a pattern, text, or arrangement of ink, light extracting surface or volumetric features, or other optically detectable pattern or indicia on a component of the light emitting device. The component may be designed to be field removable such that the new information or configuration specific for the new component can be read by the device and it can be configured appropriately. In one embodiment of this invention, the indicia is a pattern of dots, letters, characters, or indicia on the film, lightguide, lightguide region, lightguide, housing or surface of a component of the removable components. The pattern of dots, characters, letters or indicia may vary in size, shape, spacing, color (for example, red, green blue, black, and white dots), or percent reflectance. In one embodiment of this invention, the indicia is an arrangement of 1D bars as in a barcode or 2D matrix or 2D barcode.

In another embodiment of this invention, the information carrying method is one selected from physical protrusions or notches in a component, physical switches, indentations or grooves in a component, an active, passive, or battery assisted Radio-Frequency Identification (RFID) tag or label, High-frequency RFID or HFID/HighFID, Ultra-HighFID or UHFID, a magnetic stripe, a smart card component, an optical RFID (or OPID). In one embodiment of this invention, an RFID tag is printed onto the surface or the surface of a layer within the film used as the coupling lightguide, lightguide region, light mixing region, or lightguide. In another embodiment of this invention, the RFID tag is adhered to a component of the cartridge and the reader is within the base unit. In one embodiment of this invention, at least one light source within the light emitting device is used to illuminate a printed pattern or light extraction feature pattern disposed on the lightguide, lightguide region, light mixing region or lightguide. In another embodiment of this invention, the lightguide, lightguide region, light mixing region, or coupling lightguide comprises a plurality of light absorbing or scattering regions arranged to provide information when illuminated by a plurality of light sources. For example, in one embodiment of this invention, each base unit comprising a visible light source and an IR LED which is used as a detector or transmitter. When the cartridge is inserted (or at some other event such as a reset or power on, or a change of state such as lightguide replacement), the various light sources may cycle through a pattern (such as sequentially, or turning the top 3 light source modules, then the side modules). Each IR LED may be used as a detector or a transmitter and may be electrically configured to switch between the two states. The location of the light absorbing or light reflecting regions will determine the relative intensities detected by the IR light emitting diodes that are not emitting light. In this embodiment, the light absorbing (such as an IR absorbing dye) or light reflecting regions can be coded to provide information specific to the lightguide film or cartridge. In another embodiment of this invention, visible LEDs are used and an at least one LED is configured to detect light within a specific wavelength range within the lightguide when the lightguide is illuminated by the other LEDs. The visible LEDs may cycle through and provide coded information based on the intensity reaching the visible light LED used as a detector. The relative intensity detected when a plurality of LEDs are illuminated by the light emitting device can provide coded information. More than one LED can be used in a detector only mode, detector and illuminator mode, or illumination mode only.

In a further embodiment of this invention, each module of the light emitting device comprises an infra-red (IR) LED designed to operate in at least one of a detector mode or illumination mode and the light emitting device can electronically cycle through each module independently to illuminate the IR LEDs. By incorporating IR light scattering or reflecting regions or IR light absorbing regions in at least one coupling lightguide, light mixing region, lightguide region or lightguide, the relative intensities of the IR light at a plurality of modules can be used to decode the information provided encoded by the IR light absorbing or light reflecting or light scattering regions. In another embodiment of this invention, a dye which absorbs a portion of light greater than 700 nm can be used in a region and white LEDs which emit a portion of light at wavelengths greater than 700 nm can be used as illumination sources and IR LEDs can be used as detectors and provide information based on the light reaching other IR LEDs configured in reverse mode. In this embodiment, for example, IR scattering flakes, powders or materials or IR absorbing dyes may be used on at least one coupling lightguide to provide relative intensity information to the IR LED when used as a detector.

In one embodiment of this invention, the pattern is an arrangement of colored indicia which is illuminated sequentially or simultaneously by more than one light source in the device. In one embodiment of this invention, the pattern is an array of colored indicia in which the reflected intensity of light from a plurality of indicia changes depending on the color of the light source. For example, the indicia pattern could be an array comprising a red dot, a blue dot, a purple dot, and an orange dot. An optical reading device such as a linear array of photovoltaic cells, photodiodes, CMOS imager, CCD imager, etc.) with or without color filters will detect different relative reflected intensities depending on the illumination wavelength spectrum. For example, when the blue LED is turned on, the blue dots will have a high intensity of reflected light and the purple dot will have a medium or high intensity of reflected light and the red dot will have a low level of reflected intensity. The relative reflectances for different illumination spectrums for different dots can provide encoded information.

The reading device on the light emitting device of one embodiment of this invention, may be an array of detectors or a single detector. In the case of the array of detectors, the detecting device could be a CCD or CMOS imaging device with a lens, microlens array, or other optical element to project the array of indicia onto the light detecting array elements.

In another embodiment of this invention, the detector on the light emitting device is a detecting element that provides for the information to be read serially when the removable component is attached (or removed) from the light emitting device. For example, the holding device for array of coupling lightguides could have a magnetic stripe which is read by the light emitting device with the holding device for the array of coupling lightguides is placed into the main base light emitting device unit comprising a light source. In another embodiment of this invention, the removable component or cartridge comprises a photovoltaic element coupled to the lightguide that powers a transmitter (Radio frequency for example), or light source such that information is relayed back to the base unit.

In a further embodiment of this invention, the cartridge comprises mechanical holes, protrusions, or switches, or arrays or matrixes thereof that provide information to the light emitting device when the cartridge is attached to the light emitting device base unit.

In another embodiment of this invention, the coupling lightguides comprise printed regions on the low refractive index region, the lightguide region of the coupling lightguides, or another layer disposed on a surface or in-between a coupling lightguide. In one embodiment of this invention, a portion of light input into the coupling lightguide scatters out of the coupling lightguides and is detected by an optical detector such as a CCD or CMOS imager or photovoltaic cell or light emitting diode.

Backlights

In one embodiment of this invention, a light emitting display backlight or frontlight comprises a light source, a light input coupler, and a lightguide. In one embodiment of this invention, the frontlight or backlight illuminates a display or spatial light modulator selected from the group of liquid crystal displays (LCD's), MEM's based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display (such as those by Liquidvista), bistable TN displays, micro-cup EPD displays, grating aligned zenithal display, photonic crystal display (such as those by Opalux), electrofluidic display (such as those by Gamma Dynamics), and electrochromic displays (such as those by Acreo, Aveso, and Ntera).

Liquid Crystal Displays

In one embodiment of this invention, a backlight or frontlight suitable for use with a liquid crystal display panel comprises at least one light source, light input coupler, and lightguide. In one embodiment of this invention, the backlight or frontlight comprises a single lightguide wherein the illumination of the liquid crystal panel is white. In another embodiment, the backlight or frontlight comprises a plurality of lightguides disposed to receive light from at least two light sources with two different color spectra such that they emit light of two different colors. In another embodiment, the backlight or frontlight comprises a single lightguide disposed to receive light from at least two light sources with two different color spectra such that they emit light of two different colors. In another embodiment, the backlight or frontlight comprises a single lightguide disposed to receive light from a red, green and blue light source.

In a further embodiment of this invention, the backlight or frontlight comprises a lightguide disposed to receive light from a blue or UV light emitting source and further comprises a region comprising a wavelength conversion material such as a phosphor film. In another embodiment of this invention, the backlight comprises 3 layers of film lightguides wherein each lightguide illuminates a display with substantially uniform luminance when the corresponding light sources is turned on. In this embodiment, the color gamut can be increased by reducing the requirements of the color filters and the display can operate in a color sequential mode or all-colors-on simultaneously mode. In a further embodiment, the backlight or frontlight comprises 3 layers of film lightguides with 3 spatially distinct light emitting regions comprising light extraction features wherein each light extraction region for a particular lightguide corresponds to a set of color pixels in the display. In this embodiment, by registering the light extracting features (or regions) to the corresponding red, green, and blue pixels (for example) in a display panel, the color filters are not necessarily needed and the display is more efficient. In this embodiment, color filters may be used, however, to reduce crosstalk. In one embodiment of this invention a color sequential display comprises at least one light source, light input coupler, lightguide and a display panel wherein the panel has a refresh rate faster than one selected from the group of 150 hz, 230 hz, 270 hz, 350 hz, 410 hz, 470 hz, 530 hz, 590 hz, 650 hz, and 710 hz.

In another embodiment of this invention, a backlight or frontlight comprises at least one light source, light input coupler, and lightguide wherein lightguide comprises core regions that are substantially thinner than the film and are printed onto a film such that the color or flux of the light reaching light extracting regions can be controlled.

In another embodiment of this invention, a backlight or frontlight comprises at least one light source, light input coupler, and lightguide wherein lightguide forms a substrate or protective region within the display panel. In one embodiment of this invention, the lightguide is the substrate for the liquid crystal display. In a further embodiment of this invention, the lightguide is optically coupled to an outer surface of the display, is disposed within the display, within the liquid crystal cell, or in-between two substrates of the display.

In another embodiment of this invention, a backlight or frontlight comprises at least one light source and a light input coupler comprising at least one coupling lightguide optically coupled to at least one display component (such as a substrate, film, glass, polymer or other layer of a liquid crystal based display or other display) wherein the component guides light received from the at least one coupling lightguide in a waveguide condition. By optically coupling the coupling lightguides to a display component such as an LCD glass substrate for example, the component can function as the lightguide and alleviate the need for additional backlighting films or components.

In another embodiment of this invention, a display capable of operating in stereoscopic display mode comprises a backlight or frontlight wherein at least one lightguide or light extracting region is disposed within or on top of a film based lightguide wherein at least two sets of light emitting regions can be separately controlled to produce at least two sets of images in conjunction with a stereoscopic display. The 3D display may further comprise parallax barriers, lenticular elements, or other optical components to effectively convert the spatially separated light regions into angularly separated light regions either before or after spatially modulating the light.

Flexible Backlight or Frontlight

In another embodiment of this invention, a display comprises a film based light emitting device comprising a light source, light input coupler, and lightguide wherein the lightguide or lightguide region can be bent or folded to radius of curvature of less than 75 times the thickness of lightguide or lightguide region and function similarly to similar lightguide or lightguide region that has not been similarly bent. In another embodiment of this invention, the lightguide or lightguide region can be bent or folded to radius of curvature greater than 10 times the times the thickness lightguide or lightguide region and function similarly to similar lightguide or lightguide region that has not been similarly bent. In another embodiment of this invention, a display comprises a film based light emitting device comprising a light source, light input coupler, and lightguide wherein the display can be bent or folded to radius of curvature of less than 75 times the thickness of display or lightguide region and function similarly to similar display that has not been similarly bent. In another embodiment of this invention, the display is capable of being bent or folded to radius of curvature greater than 10 times the times the thickness lightguide or lightguide region and function similarly to similar display that has not been similarly bent.

In another embodiment of this invention, the backlight or frontlight is incorporated into a portable device such as a cellphone, smartphone, pda, laptop, ebook, e-reader, or other computing device.

Frontlight Light Emitting Device

In one embodiment of this invention, the light emitting device emits light toward a display with reflective components such that the display is frontlit. In another embodiment of this invention, a display comprises a film based light emitting device comprising a light source, light input coupler, and lightguide lighting a display from the front wherein the light extracting regions of the lightguide direct light toward an interferometric modulator or IMOD such as those disclosed in U.S. Pat. Nos. 6,680,792; 7,556,917; 7,532,377 and 7,297,471, the contents of each are incorporated by reference herein. The lightguide may be a component external to the display, an integral component of the display, or optical coupled to a surface or layer of the display.

In another embodiment of this invention, a display comprises a film based light emitting device comprising a light source, light input coupler, and lightguide lighting a display from the front wherein the light extracting regions of the lightguide direct light toward at least one of a reflective LCD, electrophoretic display, cholesteric display, zenithal bistable device, reflective LCD, electrostatic display, electrowetting display (such as those by Liquidvista), bistable TN displays, micro-cup EPD displays, grating aligned zenithal display, photonic crystal display (such as those by Opalux), electrofluidic display (such as those by Gamma Dynamics), and electrochromic displays (such as those by Acreo, Aveso, and Ntera). In another embodiment of this invention, a display comprises a film based light emitting device comprising a light source, light input coupler, and lightguide lighting a display wherein the light extraction features of the lightguide direct light toward a time-multiplexed optical shutter display such as one disclosed in U.S. patent application Ser. Nos. 12/050,045; 12/050,032; 12/050,045; 11/524,704; 12/564,894; 12/574,700; 12/546,601; 11/766,007 and U.S. Pat. Nos. 7,522,354 and 7,450,799, the contents of each are incorporated herein by reference.

In one embodiment of this invention, the light emitting device comprises a reflective spatial light modulator disposed between the lightguide and the light source for the light emitting device. For example, the lightguide could be disposed on the front of an electrophoretic display and at least one of the lightguide, lightguide region, light mixing region, or coupling lightguides could wrap around the electrophoretic display and the light source could be disposed behind the display.

In one embodiment of this invention, the lightguide serves as an illuminator for a frustrated total internal reflection type display such as the TMOS (time-multiplexed optical shutter) display by Unipixel or a MEMs type display such as Digital Micro Shutters displays by Pixtronix or reflective MEMS based displays such as mirasol from Qualcomm MEMS Technologies.

In another embodiment of this invention, a display comprises a film based light emitting device comprising a light source, light input coupler, and lightguide illuminating a display or providing a lightguide for a display to couple light out of wherein the display or light emitting device is a type disclosed in U.S. patent application Ser. Nos. 12/511,693; 12/606,675; 12/221,606; 12/258,206; 12/483,062; 12/221,193; 11/975,411 11/975,398; 10/312,003; 10/699,397 or U.S. Pat. Nos. 7,586,560; 7,535,611; 6,680,792; 7,556,917; 7,532,377; 7,297,471; 6,680,792; 6,865,641; 6,961,175; 6,980,350; 7,012,726; 7,012,732; 7,035,008; 7,042,643; 7,046,374; 7,060,895; 7,072,093; 7,092,144; 7,110,158; 7,119,945; 7,123,216; 7,130,104; 7,136,213; 7,138,984; 7,142,346; 7,161,094; 7,161,728; 7,161,730; 7,164,520; 7,172,915; 7,193,768; 7,196,837; 7,198,973; 7,218,438; 7,221,495; 7,221,497; 7,236,284; 7,242,512; 7,242,523; 7,250,315; 7,256,922; 7,259,449; 7,259,865; 7,271,945; 7,280,265; 7,289,256; 7,289,259; 7,291,921; 7,297,471; 7,299,681; 7,302,157; 7,304,784; 7,304,785; 7,304,786; 7,310,179; 7,317,568; 7,321,456; 7,321,457; 7,327,510; 7,333,208; 7,343,080; 7,345,805; 7,345,818; 7,349,136; 7,349,139; 7,349,141; 7,355,779; 7,355,780; 7,359,066; 7,365,897; 7,368,803; 7,369,252; 7,369,292; 7,369,294; 7,369,296; 7,372,613; 7,372,619; 7,373,026; 7,379,227; 7,382,515; 7,385,744; 7,385,748; 7,385,762; 7,388,697; 7,388,704; 7,388,706; 7,403,323; 7,405,852; 7,405,861; 7,405,863; 7,405,924; 7,415,186; 7,417,735; 7,417,782; 7,417,783; 7,417,784; 7,420,725; 7,420,728; 7,423,522; 7,424,198; 7,429,334; 7,446,926; 7,446,927; 7,447,891; 7,450,295; 7,453,579; 7,460,246; 7,460,290; 7,460,291; 7,460,292; 7,470,373; 7,471,442; 7,471,444; 7,476,327; 7,483,197; 7,486,429; 7,486,867; 7,489,428; 7,492,502; 7,492,503; 7,499,208; 7,502,159; 7,515,147; 7,515,327; 7,515,336; 7,517,091; 7,518,775; 7,520,624; 7,525,730; 7,526,103; 7,527,995; 7,527,996; 7,527,998; 7,532,194; 7,532,195; 7,532,377; 7,532,385; 7,534,640; 7,535,621; 7,535,636; 7,542,198; 7,545,550; 7,545,552; 7,545,554; 7,547,565; 7,547,568; 7,550,794; 7,550,810; 7,551,159; 7,551,246; 7,551,344; 7,553,684; 7,554,711; 7,554,714; 7,556,917; 7,556,981; 7,560,299; 7,561,323; 7,561,334; 7,564,612; 7,564,613; 7,566,664; 7,566,940; 7,567,373; 7,570,865; 7,573,547; 7,576,901; 7,582,952; 7,586,484; 7,601,571; 7,602,375; 7,603,001; 7,612,932; 7,612,933; 7,616,368; 7,616,369; 7,616,781; 7,618,831; 7,619,806; 7,619,809; 7,623,287; 7,623,752; 7,625,825; 7,626,581; 7,626,751; 7,629,197; 7,629,678; 7,630,114; 7,630,119; 7,630,121; 7,636,151; 7,636,189; 7,642,110; 7,642,127; 7,643,199; 7,643,202; 7,643,203; 7,643,305; 7,646,529; 7,649,671; 7,653,371; 7,660,031; 7,663,794; 7,667,884; 7,668,415; 7,675,665; 7,675,669; 7,679,627; 7,679,812; 7,684,104; 7,684,107; 7,692,839; 7,692,844; 7,701,631; 7,702,192; 7,702,434; 7,704,772; 7,704,773; 7,706,042; 7,706,044; 7,706,050; 7,709,964; 7,710,629; 7,710,632; 7,710,645; 7,711,239; 7,715,079; 7,715,080; 7,715,085; 7,719,500; 7,719,747; and 7,719,752, the contents of each are incorporated by reference herein.

Keypad & Backlight

In another embodiment of this invention, a light emitting device provides light as a frontlight or backlight of a display and also illuminates an object. The lightguide, for example, may extend from the display region to a keypad region for a laptop or cellphone. In another embodiment, the object of illumination is a wall or mountable object to which the display is affixed, the surface of the keys of a keyboard to be pressed, other buttons, or a second display. In another embodiment of this invention, the light emitting device provides light as a frontlight or backlight of a display and also provides external white or color illumination as an illuminating device such as a light fixture or flashlight.

Lightguide is Also Sound Emitting Device

In one embodiment of this invention, the lightguide is also a thin, flexible, diaphragm which may be vibrated by a transducer to emit sound such as disclosed in U.S. Pat. Nos. 6,720,708 and 7,453,186 and U.S. patent application Ser. No. 09/755,895, the contents of each are incorporated by reference herein. In one embodiment of this invention, the lightguide is a frontlight for lighting a reflective display and the lightguide is also speaker which emits audio. In one embodiment of this invention, the lightguide comprises multiple layers of polymers (such as core lightguide and two cladding layers) which increase the rigidity of the lightguide film and provide improved acoustic performance. In one embodiment of this invention, at least one of the high light transmittance, low haze, high clarity, or low diffuse reflectance improves the visibility of the lightguide or diaphragm.

Lightguide is Also a Touchscreen

In one embodiment of this invention, the lightguide is also a touchscreen for detecting haptic feedback, contact, proximity, or location of user input by finger or stylus or other device. In one embodiment of this invention, the lightguide carries at least one of the illumination or light modified by the input as well as providing frontlight, backlight, audio, or other functionality. In one embodiment of this invention, the lightguide is an optical touchscreen. Optical based touchscreens are known in the art and in one embodiment of this invention, the optical based touchscreen is one disclosed in U.S. patent application Ser. Nos. 11/826,079, 12/568,931, or 12/250,108, the contents of each are incorporated by reference herein. In another embodiment of this invention, the lightguide is an optical touchscreen suitable for a nightvision display or nightvision display mode. In a further embodiment of this invention, the lightguide is a nightvision compatible touchscreen as describe in U.S. patent application Ser. No. 11/826,236, the contents of which are incorporated by reference herein.

In another embodiment of this invention, the lightguide is a surface acoustic wave based touchscreen such as disclosed in U.S. Pat. Nos. 5,784,054, 6,504,530 or U.S. patent application Ser. No. 12/315,690, the contents of each are incorporated by reference herein Head-Up Display In another embodiment of this invention, a head-up display comprises a film based light emitting device comprising a light source, light input coupler, and lightguide. Head-up displays are used in automobiles, aircraft and marine craft. In one embodiment of this invention, the lightguide of a head-up display is one selected from the group of incorporated into a windshield, an integral part of a windshield, formed with light extracting features before becoming encapsulated within a windshield, formed with light extracting features after becoming encapsulated within a windshield, disposed on an inner or outer surface a windshield, an after-market HUD, a free-standing HUD suitable for placement on an automobile dashboard, formed where the lightguide comprises PVB as a core or cladding material.

Luminance Uniformity of the Backlight, Frontlight, or Light Emitting Device

In one embodiment of this invention, a light emitting device comprises a light source, a light input coupler, and a film-based lightguide wherein the 9-spot spatial luminance uniformity of the light emitting surface the light emitting device measured according to VESA Flat Panel Display Measurements Standard version 2.0, Jun. 1, 2001 is greater than one selected from the group of 60%, 70%, 80%, 90%, and 95%. In another embodiment of this invention, a display comprises a spatial light modulator and a light emitting device comprising a light source, a light input coupler, and a film-based lightguide wherein the 9-spot spatial luminance uniformity of the light reaching the spatial light modulator (measured by disposing a white reflectance standard surface such as Spectralon in the location where the spatial light modulator would be located to receive light from the lightguide and measuring the light reflecting from the standard surface in 9-spots according to VESA Flat Panel Display Measurements Standard version 2.0, Jun. 1, 2001) is greater than one selected from the group of 60%, 70%, 80%, 90%, and 95%. In another embodiment of this invention, a display comprises a spatial light modulator and a light emitting device comprising a light source, a light input coupler, and a film-based lightguide wherein the 9-spot spatial luminance uniformity of the display measured according to VESA Flat Panel Display Measurements Standard version 2.0, Jun. 1, 2001) is greater than one selected from the group of 60%, 70%, 80%, 90%, and 95%.

Color Uniformity of the of the Backlight, Frontlight, or Light Emitting Device

In one embodiment of this invention, a light emitting device comprises a light source, a light input coupler, and a film-based lightguide wherein the 9-spot sampled spatial color non-uniformity, $\Delta u'v'$, of the light emitting surface of the light emitting device measured on the 1976 u', v' Uniform Chromaticity Scale as described in VESA Flat Panel Display Measurements Standard version 2.0, Jun. 1, 2001 (Appendix 201, page 249) is less than one selected from the group of 0.2, 0.1, 0.05, 0.01, and 0.004 when measured using a spectrometer based spot color meter. In another embodiment of this invention, a display comprises a spatial light modulator and a light emitting device comprising a light source, a light input coupler, and a film-based lightguide wherein the 9-spot sampled spatial color non-uniformity, $\Delta u'v'$, of the of the light reaching the spatial light modulator (measured by disposing a white reflectance standard surface such as Spectralon in the location where the spatial light modulator would be located to receive light from the lightguide and measuring the color of the standard surface on the 1976 u', v' Uniform Chromaticity Scale as described in VESA Flat Panel Display Measurements Standard version 2.0, Jun. 1, 2001 (Appendix 201, page 249) is less than one selected from the group of 0.2, 0.1, 0.05, 0.01, and 0.004 when measured using a spectrometer based spot color meter. In another embodiment of this invention, a display comprises a spatial light modulator and a light emitting device comprising a light source, a light input coupler, and a film-based lightguide wherein the 9-spot sampled spatial color non-uniformity, $\Delta u'v'$, of the display measured on the 1976 u', v' Uniform Chromaticity Scale as described in VESA Flat Panel Display Measurements Standard version 2.0, Jun. 1, 2001 (Appendix 201, page 249) is less than one selected from the group of 0.2, 0.1, 0.05, 0.01, and 0.004 when measured using a spectrometer based spot color meter.

Angular Profile of Light Emitting from the Light Emitting Device

In one embodiment of this invention, the light emitting from at least one surface of the light emitting device has an angular full-width at half-maximum intensity (FWHM) less than one selected from the group of 120 degrees, 100 degrees, 80 degrees, 60 degrees, 40 degrees, 20 degrees and 10 degrees. In another embodiment of this invention, the light emitting from at least one surface of the light emitting device has at least one angular peak of intensity within at least one angular range selected from the group of 0-10 degrees, 20-30 degrees, 30-40 degrees, 40-50 degrees, 60-70 degrees, 70-80 degrees, 80-90 degrees, 40-60 degrees, 30-60 degrees, and 0-80 degrees from the normal to the light emitting surface. In another embodiment of this invention, the light emitting from at least one surface of the light emitting device has two peaks within one or more of the aforementioned angular ranges and the light output resembles a "bat-wing" type profile known in the lighting industry to provide uniform illuminance over a predetermined angular range. In another embodiment of this invention, the light emitting device emits light from two opposing surfaces within one or more of the aforementioned angular ranges and the light emitting device is one selected from the group of a backlight illuminating two displays on either side of the backlight, a light fixture providing up-lighting and down-lighting, a frontlight illuminating a display and having light output on the viewing side of the frontlight that has not reflected from the modulating components of the reflective spatial light modulator with a peak angle of luminance greater than 40 degrees, 50 degrees, or 60 degrees. In another embodiment of this invention, the optical axis of the light emitting device is within an angular range selected from the group of 0-20, 20-40, 40-60, 60-80, 80-100, 100-120, 120-140, 140-160, 160-180, 35-145, 45-135, 55-125, 65-115, 75-105, and 85-95 degrees from the normal to a light emitting surface. In a further embodiment of this invention, the shape of the lightguide is substantially tube light wherein the light substantially propagates through the tube in a direction parallel to the longer (length) dimension of the tube and the light exits the tube wherein at least 70% of the light output flux is contained within an angular range of 35 degrees to 145 degrees from the light emitting surface. In a further embodiment of this invention, the light emitting device emits light from a first surface and a second surface opposite the first surface wherein the light flux exiting the first and second surfaces, respectively, is chosen from the group of 5-15% and 85-95%, 15-25% and 75-85%, 25-35% and 65-75%, 35-45% and 65-75%, 45-55% and 45-55%. In another embodiment of this invention, the first light emitting surface emits light in a substantially downward direction and the second light emitting surface emits light substantially in an upward direction. In another embodiment of this invention, the first light emitting surface emits light in a substantially upward direction and the second light emitting surface emits light substantially in a downward direction.

In one embodiment of this invention, the light emitting device comprises a plurality of LEDs or LED packages wherein the plurality of LEDs or LED packages comprises an array of LEDs. The array components (LEDs or electrical components) may be physically (and/or electrically) coupled to a single circuit board or they may be coupled to a plurality of circuit boards that may or may not be directly physically coupled (i.e. such as not on the same circuit board). In one embodiment of this invention, the array of LEDs is an array comprising at least red, green, blue, and white LEDs. In this embodiment, the variation in the white point due to manufacturing or component variations can be reduced. In another embodiment of this invention, the LED array comprise at least one white LED and one red LED. In this embodiment, the CRI, or Color Rendering Index, may be higher. In one embodiment of this invention, the CRI of at least one of a light emitting region, the light emitting surface, light fixture, light emitting device, display driven in a white mode comprising the light emitting device, or sign is greater than one selected from the group of 70, 75, 80, 85, 90, 95, and 99. In another embodiment of this invention, the NIST Color Quality Scale (CQS) of at least one of a light emitting region, the light emitting surface, light fixture, light emitting device, display driven in a white mode comprising the light emitting device, or sign is greater than one selected from the group of 70, 75, 80, 85, 90, 95, and 99. In another embodiment of this invention, a display comprising the light emitting device has a color gamut greater than 70%, 80%, 85%, 90%, 95%, 100%, 105%, 110%, 120%, and 130% that of the NTSC standard. In another embodiment of this invention, the LED array comprises white, green, and red LEDs. In another embodiment of this invention, the LED array comprise at least one green and blue LED and two types of red LEDs with one type having a lower luminous efficacy or a lower wavelength than the other type of red LED. As used herein, the white LED may be a phosphor converted blue LED or a phosphor converted UV LED.

In another embodiment of this invention, the input array of LEDs can be arranged to compensate for uneven absorption of light through longer vs. shorter lightguides. In another embodiment of this invention, the absorption is compensated for by directing more light into the light input coupler corresponding to the longer coupling lightguides or longer lightguides. In another embodiment of this invention, light within a first wavelength band is absorbed within the lightguide more than light within a second wavelength band and the radiant light flux coupled into the light input coupler within the first wavelength band divided by the radiant light flux within the second wavelength band input is greater than the radiant light flux emitted from at least one of the lightguide, light emitting surface of the light emitting device, lightguide region corresponding to light illuminating the waveguide from the two wavelength bands, within the first wavelength band divided by the radiant light flux emitted within the second wavelength band.

Applications of the Light Emitting Device

Since the present invention enables inexpensive coupling into thin-films, there are many general illumination and backlighting applications. The first example is general home and office lighting using roll-out films on walls or ceiling. Beyond that, the film can bend to shape to non-planar shapes for general illumination. Additionally, it can be used as the backlight or frontlight in the many thin displays that have been or are being developed. For example, LCD and E-ink thin-film displays may be improved using a thin back-lighting film or thin front-lighting film; Handheld devices with flexible and scrollable displays are being developed and they need an efficient, low-cost method for getting light into the backlighting film. In one embodiment of this invention, the light emitting device comprises a light input coupler, lightguide, and light source which provides illumination for translucent objects or film such as stained glass windows or signs or displays such as point-of-purchase displays. In one embodiment of this invention, the thin film enables the light extraction features to be printed such that they overall negligibly scatter light that propagates normal to the face of the film. In this embodiment, when the film is not illuminated, objects can be seen clearly through the film without significant haze. When placed behind a transparent or partially transparent stained glass window, the overall assembly allows low-scattering transmission of light through the assembly if desired. Furthermore, the flexibility of the film allows for much greater positional tolerances and design freedom than traditional plate lightguide backlights because the film can be bent and adapted to the various stained glass window shapes, sizes and topologies. In this embodiment, when not illuminated, the stained glass appears as a regular non-illuminated stained glass window. When illuminated, the stained glass window glows. Additional embodiments of this invention include light emitting devices wherein the stained glass window is strictly aesthetic and does not require viewing of objects through it (e.g. cabinet stained glass windows or art displays), and the overall see-through clarity of the backlight does not need to be achieved. In this embodiment, a diffuse or specular reflector can be placed behind the film to capture light that illuminates out of the film in the direction away from the stained glass window. Diffusing films, light redirecting films, reverse prism films, diffuser films (volumetric, surface relief or a combination thereof) may be disposed between the lightguide and the object to be illuminated. Other films may be used such as other optical films known to be suitable to be used within an LCD backlight.

The light emitting device of one embodiment of this invention can be used for backlighting or frontlighting purposes in passive displays, e.g., as a backlight for an illuminated advertising poster, as well as for active (changing) displays such as LCD displays. Such applications generally require compact, low-cost white-light illumination of consistent brightness and color across the illuminated area. It is cost-effective and energy-efficient to mix the light from red, blue, and green LEDs for this purpose, but color mixing is often problematic. However, with embodiments of the present invention, red, blue, and green light sources can all be input into each stack of legs/input areas, and by the time the light reaches the sheet, it will be sufficiently mixed that it appears as white light. The light sources can be geometrically situated, and adjusted in intensity, to better provide uniform intensities and colors across the body. A similar arrangement can be attained by providing stacked sheets (more specifically stacked sheet bodies or lightguides) wherein the colors in the sheets combine to provide white light. Since some displays are provided on flexible substrates—for example, "E-ink" thin-film displays on printed pages—the sheets provide a means for allowing backlighting while maintaining the flexibility of the display's media.

In some embodiments of this invention, the light emitting device is a novel LCD backlighting solution, which includes mixing multiple colors of LEDs into a single lightguide. In one embodiments of this invention, the length and geometry of the strips uniformly mixes light into the lightguide region of the film lightguide without a significant are of light mixing region located around the edge. The enhanced uniformity of the colors can be used for a static display or a color-sequential LCD and BLU system. One method for a color-sequential system is based on pulsing between red, green, and blue backlight color while synced to the LCD screen pulsing. Moreover, a layered version of red-, green- and blue-lighted films that combine to make white light is presented. A pixel-based display region can have multiple pixels that are designated to be red, green or blue. Behind it are three separate film lightguides that each have a separate color of light coupled to them. Each of the lightguides has light extraction features that match up with the corresponding color of the pixel-based display. For example red light is coupled into coupling lightguide and then into the lightguide or lightguide region and is extracted from the feature into the red pixel. The film lightguides are considerably thinner than the width of the pixels so that geometrically a high percentage of the light from a given color goes into its corresponding set of pixels. Ideally, no color filter needs to be used within the pixels, but in case there is cross-talk between pixels, they should be used.

It is also notable that the invention has utility when operated "in reverse"—that is, the light-emitting face(s) of a sheet could be used as a light collector, with the sheet collecting light and transmitting it through the legs to a photosensitive element. As an example, sheets in accordance with the invention could collect incoming light and internally reflect it to direct it to a photovoltaic device for solar energy collection purposes. Such an arrangement can also be useful for environmental monitoring sensing purposes, in that the sheet can detect and collect light across a broad area, and the detector(s) at the legs will then provide a measurement representative of the entire area. A sheet could perform light collection of this nature in addition to light emission. For example, in lighting applications, a sheet might monitor ambient light, and then might be activated to emit light once twilight or darkness is detected. Usefully, since it is known that LEDs can also be "run in reverse"—that is, they can provide output current/voltage when exposed to light—if LEDs are used as an illumination source when a sheet is used for light emission, they can also be used as detectors when a sheet is used for light collection. In one embodiment of this invention, the lightguide captures a portion of incident light and directs it to a detector wherein the detector is designed to detect a specific wavelength (such as by including a bandpass filter, narrowband filter or a diode with a specific bandgap used in reverse). These light detection devices have the advantages of collecting a percentage of light over a large area and detecting light of a specific wavelength is directed toward the film while the film/sheet/lightguide/device remains substantially transparent. These can be useful in military operations where one is interested in detecting lasers or light sources (such as used in sighting devices, aiming devices, laser-based weapons, LIDAR or laser based ranging devices, target designation, target ranging, laser countermeasure detection, directed energy weapon detection, eye-targeted or dazzler laser detection) or infra-red illuminators (that might be used with night vision goggles).

In another embodiment of this invention, a light emitting device comprises a light source, light input coupler, and film-based lightguide wherein the light emitting device is one selected from the group of can light, troffer light, cove light, torch lamp, floor lamp, chandelier, surface mounted light, pendant light, sconce, track light, under-cabinet light, emergency light, wall-socket light, exit light, high bay light, low bay light, strip light, garden light, landscape light, building light, outdoor light, street light, pathway light, bollard light, yard light, accent light, background light, blacklight, flood light, safelight, safety lamp, searchlight, security light, step light, strobe light, followspot light, or wallwasher light.

In another embodiment of this invention, a light emitting device comprises a light source, light input coupler, and film-based lightguide wherein the light emitting device is one selected from the group of building mounted sign, freestanding sign, interior sign, wall sign, fascia sign, awning sign, projecting sign, sign band, roof sign, parapet sign, window sign, canopy sign, pylon sign, joint tenant sign, monument sign, pole sign, high-rise pole sign, directional sign, electronic message center sign, video sign, electronic sign, billboard, electronic billboard, interior directional sign, interior directory sign, interior regulatory sign, interior mall sign, and interior point-of-purchase sign.

The sheets are also highly useful for use in illuminated signs, graphics, and other displays. For example, the film may be placed on walls or windows without significantly changing the wall or window appearance. However, when the sign is illuminated, the image etched into the film lightguide would become visible. The present invention could also be useful for coupling light into the films that sit in front of some grocery store freezers as insulation. Lighting applications where there is limited space, such as in the ice at hockey rinks may also require plastic film lighting. Since a sheet can be installed on a wall or window without significantly changing its appearance, with the light-emitting area(s) becoming visible when the light source(s) are activated, the invention allows displays to be located at areas where typical displays would be aesthetically unacceptable (e.g., on windows). The sheets may also be used in situations where space considerations are paramount, e.g., when lighting is desired within the ice of skating rinks (as discussed in U.S. Pat. No. 7,237,396, which also describes other features and applications that could be utilized with the invention). The flexibility of the sheets allows them to be used in lieu of the curtains sometimes used for 15 climate containment, e.g., in the film curtains that are sometimes used at the fronts of grocery store freezers to better maintain their internal temperatures. The flexibility of the sheets also allows their use in displays that move, e.g., in light emitting flags that may move in the breeze.

Method of Manufacturing Light Input/Output Coupler

In one embodiment of this invention, the lightguide and light input or output coupler are formed from a light transmitting film by creating segments of the film corresponding to the coupling lightguides and translating and bending the segments such that a plurality of segments overlap. In a further embodiment of this invention, the input surfaces of the coupling lightguides are arranged to create a collective light input surface by translation of the coupling lightguides to create at least one bend or fold.

In another embodiment of this invention, a method of manufacturing a lightguide and light input coupler comprising a light transmitting film with a lightguide region continuously coupled to each coupling lightguide in an array of coupling lightguides, said array of coupling lightguides comprising a first linear fold region and a second linear fold region, comprises the steps of: (a) increasing the distance between the first linear fold region and the second linear fold region of the array of coupling lightguides in a direction perpendicular to the light transmitting film surface at the first linear fold region; (b) decreasing the distance between the first linear fold region and the second linear fold region of the array of coupling lightguides in a direction substantially perpendicular to the first linear fold region and parallel to the light transmitting film surface at the first linear fold region; (c) increasing the distance between the first linear fold region and the second linear fold region of the array of coupling lightguides in a direction substantially parallel to the first linear fold region and parallel to the light transmitting film surface at the first linear fold region; decreasing the distance between the first linear fold region and the second linear fold region of the array of coupling lightguides in a direction perpendicular to the light transmitting film surface at the first linear fold region; (d) such that the coupling lightguides are bent, disposed substantially one above another, and aligned substantially parallel to each other. These steps (a), (b), (c) and (d) do not need to occur in alphabetical order and the linear fold regions may be substantially parallel.

In one embodiment of this invention, the method of assembly includes translating the first and second linear fold regions of the array of coupling lightguides (segments) in relative directions such that the coupling lightguides are arranged in an ordered, sequential arrangement and a plurality of coupling lightguides comprise a curved bend. The coupling lightguides can overlap and can be aligned relative to one another to create a collection of coupling lightguides. The first linear fold region of the collection of coupling may be further bent, curved, or folded, glued, clamped, cut, or otherwise modified to create a light input surface wherein the surface area is suitable to receive and transmit light from a light source into the coupling lightguides. Linear fold regions are regions of the light transmitting film that comprise a fold after the coupling lightguides are bent in at least one direction. The linear fold regions have a width that at least comprises at least one bend of a coupling lightguide and may further include the region of the film physically, optically, or mechanically coupled to a relative position maintaining element. The linear fold regions are substantially co-planar with the surface of the film within the region and the linear fold regions have a length direction substantially larger than the width direction such that the linear fold regions have a direction of orientation in the length direction parallel to the plane of the film. The linear fold direction is shown, for example, in FIG. 29a where the linear fold direction 2906 is parallel to the x axis. In one embodiment of this invention, the array of coupling lightguides are oriented at an angle greater than 0 degrees and less than 90 degrees to the first linear fold region. As shown in FIG. 30a, the array of lightguides are oriented at an angle 3001 of about 45 degrees to the first linear fold direction 2906.

As used herein, the first linear fold region or the second linear fold region may be disposed near or include the input or output end of the coupling lightguides. In embodiments where the device is used to collect light, the input end may be near the light mixing region, lightguide region, or lightguide and the output end may be near the light emitting edges of the coupling lightguides such as in the case where the coupling lightguides couple light received from the lightguide or lightguide region into a light emitting surface which is disposed to direct light onto a photovoltaic cell. In the embodiments and configurations disclosed herein, the first linear fold region or second linear fold region may be transposed to create further embodiments for configurations where the direction of light travel is substantially reversed.

In one embodiment of this invention, the array of coupling lightguides have a first linear folding region and a second linear folding region and the method of manufacturing the light input coupler comprises translating steps that create the overlap and bends while substantially maintaining the relative position of the coupling lightguides within the first and second linear folding regions. In one embodiment of this invention, maintaining the relative position of the coupling lightguides assists with the ordered bending and alignment and can allow the coupling lightguide folding and overlap without creating a disordered or tangled arrangement of coupling lightguides. This can significantly improve the assembly and alignment and reduce the volume required, particularly for very thin films or coupling lightguides and/or very narrow coupling light strip widths.

In one embodiment of this invention, the aforementioned steps for a method of manufacturing a lightguide and light input coupler comprising a light transmitting film with a lightguide region are performed such that at least at least one of steps (a) and (b) occur substantially simultaneously; steps (c) and (d) occur substantially simultaneously; and steps (c) and (d) occur following steps (a) and (b). In another embodiment of this invention, the aforementioned steps for a method of manufacturing a lightguide and light input coupler comprising a light transmitting film with a lightguide region are performed such that steps (a), (b), and (c) occur substantially simultaneously. The relative translation first linear folding region and the second linear folding region of the coupling lightguides may be achieved by holding a linear folding region stationary and translating the other linear folding region. In a further embodiment of this invention, a relative position maintaining elements disposed at the first folding region remains substantially stationary while a second relative position maintaining element at the second linear folding region is translated. The translation may occur in an arc-like pattern within one or more planes, or in directions parallel to or at an angle to the x, y, or z axis.

In another embodiment of this invention, the aforementioned steps are performed while substantially maintaining the relative position of the of the array of coupling lightguides within the first linear fold region relative to each other in a direction parallel to the first linear fold region and substantially maintaining the relative position of the array of coupling lightguides within the second linear fold region relative to each other in a direction parallel to the first linear fold region.

In a further embodiment of this invention, the distance between the first linear fold region and second linear fold region of the array of coupling lightguides is increased by at least the distance, D, that is the total width, $W_t$, of the array of the coupling lightguides in a direction substantially parallel to the first linear fold region.

In another embodiment of this invention, the array of coupling lightguides comprises a number, N, of coupling lightguides that have substantially the same width, $W_s$, in a direction parallel to the first linear fold region and $D=N \times W_s$.

Relative Position Maintaining Element

In one embodiment of this invention, at least one relative position maintaining element substantially maintains the relative position of the coupling lightguides in the region of the first linear fold region, the second linear fold region or both the first and second linear fold regions. In one embodiment of this invention, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides. The relative position maintaining element may be adhered, clamped, disposed in contact, disposed against a linear fold region or disposed in-between a linear fold region and a lightguide region. The relative position maintaining element may be a polymer or metal component that is adhered or held against the surface of the coupling lightguides, light mixing region, lightguide region or film at least during one of the translational steps. In one embodiment of this invention, the relative position maintaining element is a polymeric strip with planar or saw-tooth-like teeth adhered to either side of the film near the first linear fold region, second linear fold region, or both first and second linear fold regions of the coupling lightguides. By using saw-tooth-like teeth, the teeth can promote or facilitate the bends by providing angled guides. In another embodiment of this invention, the relative position maintaining element is a mechanical device with a first clamp and a second clamp that holds the coupling lightguides in relative position in a direction parallel to the clamps parallel to the first linear fold region and translates the position of the clamps relative to each other such that the first linear fold region and the second linear fold region are translated with respect to each other to create overlapping coupling lightguides and bends in the coupling lightguides. In another embodiment of this invention, the relative position maintaining element maintains the relative position of the coupling lightguides in the first linear fold region, second linear fold region, or both the first and second linear fold regions and provides a mechanism to exert force upon the end of the coupling lightguides to translate them in at least one direction.

In a further embodiment of this invention, the input ends and output ends of the array of coupling lightguides are each disposed in physical contact with relative position maintaining elements during the aforementioned steps (a), (b), (c) and (d).

In one embodiment of this invention, a relative position maintaining element disposed proximal to the first linear fold region of the array of coupling lightguides has an input cross-sectional edge in a plane parallel to the light transmitting film that is substantially linear and parallel to the first linear fold region, and a relative position maintaining element disposed proximal to the second linear fold region of the array of coupling lightguides at the second linear fold region of the array of coupling lightguides has a cross-sectional edge in a plane parallel to the light transmitting film at the second linear fold region substantially linear and parallel to the linear fold region.

In another embodiment of this invention, the cross-sectional edge of the relative position maintaining element disposed proximal to the first linear fold region of the array of coupling lightguides remains substantially parallel to the cross-sectional edge of the relative position maintaining element disposed proximal to the second linear fold region of the array of coupling lightguides during steps (a), (b), (c), and (d).

In a further embodiment of this invention, the relative position maintaining element disposed proximal to the first linear fold region has a cross-sectional edge in a plane parallel to the light transmitting film surface disposed proximal to the first linear fold region that comprises a substantially linear section oriented at an angle greater than 10 degrees to the first linear fold region for at least one coupling lightguide. In a further embodiment of this invention, the relative position maintaining element has saw-tooth-like teeth oriented substantially at 45 degrees to a linear fold region of the coupling lightguides.

In one embodiment of this invention, the cross-sectional edge of the relative position maintaining element forms a guiding edge to guide the bend of at least one coupling lightguide.

In another embodiment of this invention, the aforementioned method further comprises the step of cutting through the overlapping coupling lightguides to provide an array of input edges of the coupling lightguides that end in substantially one plane orthogonal to the light transmitting film surface. The coupling lightguides may be formed by cutting the film in lines to form slits in the film. In another embodiment of this invention, the aforementioned method of manufacture further comprises forming an array of coupling lightguides in a light transmitting film by cutting substantially parallel lines within a light transmitting film. In one embodiment, the slits are substantially parallel and equally spaced apart. In another embodiment, the slits are not substantially parallel or have non-constant separations.

In another embodiment of this invention, the aforementioned method further comprises the step of holding the overlapping array of coupling lightguides in a fixed relative position by at least one selected from the group of clamping them together, restricting movement by disposing walls or a housing around one or more surfaces of the overlapping array of coupling lightguides, and adhering them together or to one or more surfaces.

In another embodiment of this invention, a method of manufacturing a lightguide and light input coupler comprising a light transmitting film with a lightguide region continuously coupled to each coupling lightguide in an array of coupling lightguides, said array of coupling lightguides comprising a first linear fold region and a second linear fold region substantially parallel to the first fold region, comprises the steps of: (a) forming an array of coupling lightguides physically coupled to a lightguide region in a light transmitting film by physically separating at least two regions of a light transmitting film in a first direction; (b) increasing the distance between the first linear fold region and the second linear fold region of the array of coupling lightguides in a direction perpendicular to the light transmitting film surface at the first linear fold region; (c) decreasing the distance between the first linear fold region and the second linear fold region of the array of coupling lightguides in a direction substantially perpendicular to the first linear fold region and parallel to the light transmitting film surface at the first linear fold region; (d) increasing the distance between the first linear fold region and the second linear fold region of the array of coupling lightguides in a direction substantially parallel to the first linear fold region and parallel to the light transmitting film surface at the first linear fold region; and (e) decreasing the distance between the first linear fold region and the second linear fold region of the array of coupling lightguides in a direction perpendicular to the light transmitting film surface at the first linear fold region; such that the coupling lightguides are bent, disposed substantially one above another, and aligned substantially parallel to each other.

In another embodiment of this invention, a method of manufacturing a lightguide and light input coupler comprising a light transmitting film with a lightguide region optically and physically coupled to each coupling lightguide in an array of coupling lightguides, said array of coupling lightguides comprising a first fold region and a second fold region, comprises the steps of: (a) translating the first fold region and the second fold region away from each other in a direction substantially perpendicular to the film surface at the first fold region such that they move toward each other in a plane parallel to the film surface at the first fold region and (b) translating the first fold region and the second fold region away from each other in a direction parallel to the first fold region such that the first fold region and second fold region move toward each other in a direction substantially perpendicular to the film surface at the first fold region such that the coupling lightguides are bent and disposed substantially one above another.

Packaging

In one embodiment of this invention, a kit suitable for providing illumination comprises a light source, a light input coupler, and a lightguide.

Roll-Up or Retractable Lightguide

In one embodiment of this invention, the flexible light emitting device can be rolled up into a tube of a diameter less than one selected from the group of 6 inches, 3 inches, 2 inches and 1 inch. In another embodiment of this invention, the flexible light emitting device comprises a spring or elastic-based take-up mechanism which can draw a portion of the lightguide, the light emitting region, or the lightguide region inside the housing. For example, the light emitting region of the film can be retracted into a cylindrical tube when a button on the device is pressed to provide secure, protected storage.

Lamination or Use with Other Films

In one embodiment of this invention, at least one of the lightguide, light transmitting film, light emitting device housing, thermal transfer element, or component of the light emitting device is laminated to or disposed adjacent to at least one selected from the group of reflection film, prismatic film reflective polarizer, low refractive index film, pressure sensitive adhesive, air gaps, light absorbing films, anti-glare coatings, anti-reflection coatings, protective film, barrier film and low tack adhesive film.

Film Production

In one embodiment of this invention, the film or lightguide is one selected from the group of extruded film, co-extruded film, cast film, solvent cast film, UV cast film, pressed film, injection molded film, knife coated film, spin coated film and coated film. In one embodiment of this invention, one or two cladding layers are co-extruded on one or both sides of a lightguide region. In another embodiment of this invention, tie layers, adhesion promotion layers, materials or surface modifications are disposed on a surface of or in-between the cladding layer and the lightguide layer.

In another embodiment of this invention, at least one of the lightguide layer, light transmitting film, cladding region, adhesive region, adhesion promotion region, or scratch resistant layer is coated onto one or more surfaces of the film or lightguide.

In another embodiment of this invention, the lightguide or cladding region is coated onto, extruded onto or otherwise disposed onto a carrier film. In one embodiment of this invention, the carrier film permits at least one of easily handling, fewer static problems, the ability to use traditional paper or packaging folding equipment, surface protection (scratches, dust, creases, etc), assisting in obtaining flat edges of the lightguide during the cutting operation, UV absorption, transportation protection, and the use of winding and film equipment with a wider range of tension and flatness or alignment adjustments. In one embodiment of this invention, the carrier film is removed before coating the film, before bending the coupling lightguide, after folding the coupling lightguides, before adding light extraction features, after adding light extraction features, before printing, after printing, before or after converting processes (further lamination, bonding, die cutting, hole punching, packaging, etc.), just before installation, after installation (when the carrier film is the outer surface), and during the removal process of the lightguide from installation.

In another embodiment of this invention, the carrier film is slit or removed across a region of the coupling lightguides. In this embodiment, the coupling lightguides can be bent or folded to a smaller radius of curvature after the carrier film is removed from the linear fold region.

Separate Coupling Lightguides

In another embodiment of this invention, the coupling lightguides are discontinuous with the lightguide and are subsequently optically coupled to the lightguide. In one embodiment of this invention, the coupling lightguides are one selected from the group of extruded onto the lightguide, optically coupled to the lightguide using an adhesive, optically coupled to the lightguide by injection molding a light transmitting material that bonds or remains in contact with the coupling lightguides and lightguide, thermally bonded to the lightguide, solvent bonded to the lightguide, laser welded to the lightguide, sonic welded to the lightguide, chemically bonded to the lightguide, and otherwise bonded, adhered or disposed in optical contact with the lightguide. In one embodiment of this invention, the thickness of the coupling lightguides is one selected from the group of less than 80%, less than 70%, less than 50%, less than 40%, less than 20%, less than 10% of the thickness of the lightguide.

Glass Laminate

In another embodiment of this invention, the lightguide is disposed within or on one side of a glass laminate. In another embodiment of this invention, the lightguide is disposed within a safety glass laminate. In a further embodiment of this invention, at least one of the lightguide, cladding, or adhesive layer comprises polyvinyl butyrate.

Patterned Lightguides

In another embodiment of this invention, at least one of the lightguide or coupling lightguides is a coated region disposed on a cladding, carrier film, substrate or other material. By using a coated pattern for the lightguide, different pathways for the light can be achieved for light directed into the coupling lightguides or lightguide. In one embodiment of this invention, the lightguide region comprises lightguide regions which direct light to separate light emitting regions wherein the neighboring lightguide regions with light extracting features emit light of a different color. In another embodiment of this invention, a lightguide pattern is disposed on a cladding layer, carrier film, or other layer which comprises regions disposed to emit light of two or more colors from two or more light sources coupled into input couplers with coupling lightguides disposed to direct light from the light source to the corresponding patterned (or trace) lightguide. For example, a red LED may be disposed to couple light into a light input coupler with coupling lightguides (which may be film-based or coating based or the same material used for the pattern lightguide coating) to a lightguide pattern wherein the light extraction features emit light in a pattern to provide color in a pixilated color display. The lightguide pattern or the light extracting region patterns within the lightguide pattern may comprise curved sections, bend straight sections, shapes, and other regular and irregular patterns. The coupling lightguides may be comprised of the same material as the patterned lightguides or they may be a different material.

Light Extraction Features

In one embodiment of this invention, the light extraction features are disposed on or within a film, lightguide region or cladding region by embossing or employing a "knurl roll" to imprint surface features on a surface. In another embodiment of this invention, the light extraction features are created by radiation (such as UV exposure) curing a polymer while it is in contact with a drum, roll, mold or other surface with surface features disposed thereon. In another embodiment of this invention, light extraction features are formed in regions where the cladding or low refractive index material or other material on or within the lightguide is removed or formed as a gap. In another embodiment of this invention, the lightguide region comprises a light reflecting region wherein light extraction features are formed where the light reflecting region is removed. Light extraction may comprise or be modified (such as the percent of light reaching the region that is extracted or direction profile of the extracted light) by adding scattering, diffusion, or other surface or volumetric prismatic, refracting, diffracting, reflecting, or scattering elements within or adjacent the light extraction features or regions where the cladding or other layer has been removed.

In one embodiment of this invention, the light extraction features are volumetric light redirecting features that refract, diffract, scatter, reflect, totally internally reflect, diffuse or otherwise redirect light. The volumetric features may be disposed within the lightguide, lightguide region, core, cladding, or other layer or region during the production of the layer or region or the features may be disposed on a surface whereupon another surface or layer is subsequently disposed.

In one embodiment of this invention, the light extraction features comprise an ink or material within a binder comprising least one selected from the group of titanium dioxide, barium sulfate, metal oxides, microspheres or other non-spherical particles comprising polymers (such as PMMA, polystyrene), rubber, or other inorganic materials. In one embodiment of this invention, the ink is deposited by one selected from the group of thermal inkjet printing, piezoelectric inkjet printing, continuous inkjet printing, screen printing (solvent or UV), laser printing, sublimation printing, dye-sublimation printing, UV printing, toner-based printing, LED toner printing, solid ink printing, thermal transfer printing, impact printing, offset printing, rotogravure printing, photogravure printing, offset printing, flexographic printing, hot wax dye transfer printing, pad printing, relief printing, letterpress printing, xerography, solid ink printing, foil imaging, foil stamping, hot metal typesetting, in-mold decoration, and in-mold labeling.

In another embodiment of this invention, the light extraction features are formed by removing or altering the surface by one selected from the group of mechanical scribing, laser scribing, laser ablation, surface scratching, stamping, hot stamping, sandblasting, radiation exposure, ion bombardment, solvent exposure, material deposition, etching, solvent etching, plasma etching, and chemical etching.

In a further embodiment of this invention, the light extraction features are formed by adding material to a surface or region by one selected from the group of UV casting, solvent casting with a mold, injection molding, thermoforming, vacuum forming, vacuum thermoforming, and laminating or otherwise bonding or coupling a film or region comprising surface relief or volumetric features.

In one embodiment of this invention, at least one selected from the group of mask, tool, screen, patterned film or component, photo resist, capillary film, stencil, and other patterned material or element is used to facilitate the transfer of the light extraction feature to the lightguide, film, lightguide region, cladding region or a layer or region disposed on or within the lightguide.

In another embodiment of this invention, more than one light extraction layer or region comprising light extraction features is used and the light extraction layer or region may be located on one surface, two surfaces, within the volume, within multiple regions of the volume, or a combination of the aforementioned locations within the film, lightguide, lightguide region, cladding, or a layer or region disposed on or within the lightguide.

In another embodiment of this invention, surface or volumetric light extraction features are disposed on or within the lightguide or cladding or a region or surface thereon or in-between that direct at least one selected from the group of 20%, 40%, 60%, and 80% of light incident from within the lightguide to angles within 30 degrees from the normal to the light emitting surface of the light emitting device or within 30 degrees from the normal of a reflecting surface such as a reflective spatial light modulator.

Folding and Assembly

In one embodiment of this invention, the coupling lightguides are heated to soften the lightguides during the folding or bending step. In another embodiment of this invention, the coupling lightguides are folded while they are at a temperature above one selected from the group of 50 degrees Celsius, 70 degrees Celsius, 100 degrees Celsius, 150 degrees Celsius, 200 degrees Celsius, and 250 degrees Celsius.

Folder

In one embodiment of this invention, the coupling lightguides are folded or bent using opposing folding mechanisms. In another embodiment of this invention, grooves, guides, pins, or other counterparts facilitate the bringing together opposing folding mechanisms such that the folds or bends in the coupling lightguides are correctly folded. In another embodiment of this invention, registration guides, grooves, pins or other counterparts are disposed on the folder to hold in place or guide one or more coupling lightguides or the lightguide during the folding step. In one embodiment of this invention, at least one of the lightguide or coupling lightguides comprises a hole and the holder comprises a registration pin and when the pin is positioned through the hole before and during the folding step, the lightguide or coupling lightguide position relative to the holder is fixed in at least one direction. Examples of folding coupling lightguides or strips for lightguides are disclosed in International Patent Application number PCT/US08/79041 titled "LIGHT COUPLING INTO ILLUMINATED FILMS", the contents of which are incorporated by reference herein.

In one embodiment of this invention, the folding mechanism has an opening disposed to receive a strip that is not to be folded in the folding step. In one embodiment of this invention, this strip is used to pull the coupling lightguides into a folded position, pull two components of the folding mechanism together, align the folding mechanism components together, or tighten the folding such that the radius of curvature of the coupling lightguides is reduced.

In one embodiment of this invention, at least one of the folding mechanism, relative position maintaining element, holder, or housing is formed from one selected from the group of sheetmetal, foil, film, rigid rubber, polymer material, metal material, composite material, and a combination of the aforementioned materials.

Holder

In one embodiment of this invention, a light emitting device comprises a folding mechanism which substantially maintains the relative position of the coupling lightguides subsequent to the folding operation. In another embodiment of this invention, the folder or housing comprises a cover that is disposed over (such as slides over, folds over, hinges over, clips over, snaps over, etc.) the coupling lightguides and provides substantial containment of the coupling lightguides. In a further embodiment of this invention, the folding mechanism is removed after the coupling lightguides have been folded and the holding mechanism is disposed to hold the relative position of the coupling lightguides. In one embodiment of this invention, the holding mechanism is a tube with a circular, rectangular, or other geometric shape cross-sectional profile which slides over the coupling lightguides and further comprises a slit where the coupling lightguides, light mixing region, or lightguide exits the tube. In one embodiment of this invention, the tube is one selected from the group of transparent, black, has inner walls with a diffuse luminous reflectance greater than 70%, and has a gloss less than 50 in a region disposed proximate a coupling lightguide such that the surface area of the inner tube in contact with the coupling lightguide remains small.

In a further embodiment of this invention, a method of manufacturing a light input coupler and lightguide comprises the step of holding at least one of the coupling lightguides and lightguide, cutting the regions in the film corresponding to the coupling lightguides, and folding or bending the coupling lightguides wherein the relative position maintaining element holds the lightguide or coupling lightguide during the cutting and the folding or bending step. In another embodiment of this invention, a method of manufacturing a light input coupler and lightguide comprises cutting the coupling lightguides in a film followed by folding or bending the coupling lightguides wherein the same component holding the coupling lightguides or lightguide in place during the cutting also holds the coupling lightguide or lightguide in place during the folding or bending.

In another embodiment of this invention, the relative position of at least one region of the coupling lightguides are substantially maintained by one or more selected from the group of wrapping a band, wire, string, fiber, line, wrap or similar tie material around the coupling lightguides, disposing a housing tube, case, wall or plurality of walls or components around a portion of the coupling lightguides, wrapping a heat-shrinking material around the coupling lightguides and applying heat, bonding the coupling lightguides using adhesives, thermal bonding or other adhesive or bonding techniques in one or more regions of the coupling lightguides (such as near the input end, for example), clamping the lightguides, disposing a low refractive index epoxy, adhesive, or material around, or in-between one or more regions of the coupling lightguides, pressing together coupling lightguides comprising a pressure sensitive adhesive (or UV cured or thermal adhesive) on one or both sides. In one embodiment of this invention, the coupling lightguide region of a film comprises a pressure sensitive adhesive wherein after the coupling lightguides are cut into the film with the adhesive, the coupling lightguides are folded on top of one another and pressed together such that the pressure sensitive adhesive holds them in place. In this embodiment, the pressure sensitive adhesive can have a lower refractive index than the film, and operate as cladding layer.

In another embodiment of this invention, at least one of the folder or holder has a plurality of surfaces disposed to direct, align, bring the coupling lightguides together, direct the coupling lightguides to become parallel, or direct the input surfaces of the coupling lightguides toward a light input surface disposed to receive light from an LED when the coupling lightguides are translated in the folder or holder. In one embodiment of this invention, the coupling lightguides are guided into a cavity that aligns the coupling lightguides parallel to each other and disposes the input edges of the coupling lightguides near an input window. In one embodiment of this invention, the window is open, comprises a flat outer surface, or a optical outer surface suitable for receiving light from a light source.

Converting or Secondary Operations on the Film or Light Input Coupler

In one embodiment of this invention, at least one of the coupling lightguides, lightguide, light transmitting film, lightguide region, light emitting region, housing, folder, or holder components is stamped, cut, thermoformed, or painted. In one embodiment of this invention, the cutting of the component is performed by one selected from the group of knife, scalpel, heated scalpel, die cutter, water jet cutter, saw, hot wire saw, laser cutter, or other blade or sharp edge. One or more components may be stacked before the cutting operation.

In one embodiment of this invention, the component is thermoformed (under a vacuum, ambient pressure, or at another pressure) to create a curved or bent region. In one embodiment of this invention, the film is thermoformed into a curve and the coupling lightguide strips are subsequently cut from the curved film and folded in a light input coupler.

In one embodiment of this invention, at least one edge of the coupling lightguides, lightguides, light transmitting film, collection of coupling lightguides, or edge of other layer or material within the light emitting device is modified to become more planar (closer to optically flat), roughened, or formed with a predetermined structure to redirect light at the surface (such as forming Fresnel refracting features on edges of the input coupling lightguides in a region of the collection of coupling lightguides to direct light into the coupling lightguides in a direction closer to a direction parallel to the plane of the coupling lightguides at the input surface (for example, forming a Fresnel collimating lens on the surface of the collection of coupling lightguides disposed near an LED). In one embodiment of this invention, the edge modification substantially polishes the edge by laser cutting the edge, mechanically polishing the edge, thermally polishing (surface melting, flame polishing, embossing with a flat surface), chemically polishing (caustics, solvents, methylene chloride vapor polishing, etc.).

Reflective Coating or Element

In one embodiment of this invention, at least one region of at least one edge of a coupling lightguide, film, or lightguide comprises a substantially specularly reflecting coating or element optically coupled to the region or disposed proximal to the edge. In one embodiment of this invention, the substantially specularly reflecting element or coating can redirect light a portion of the light exiting the coupling lightguide, lightguide, or film edge back into the coupling lightguide, lightguide or film at an angle that will travel by TIR within the lightguide. In one embodiment of this invention, the specularly reflective coating is a dispersion of light reflecting material disposed in an ink or other binder selected from the group of dispersions of aluminum, silver, coated flakes, core-shell particles, glass particles, silica particles. In another embodiment of this invention, the dispersion comprises particle sizes selected from one of the group of less than 100 microns in average size, less than 50 microns in average size, less than 10 microns in average size, less than 5 microns in average size, less than 1 micron in average size, less than 500 nm in average size. In another embodiment of this invention, the dispersion comprises substantially planar flakes with an average dimension in a direction parallel to the flake surface selected from one of the group of less than 100 microns in average size, less than 50 microns in average size, less than 10 microns in average size, less than 5 microns in average size, less than 1 micron in average size, less than 500 nm in average size. In another embodiment of this invention, the coupling lightguides are folded and stacked and a light reflecting coating is applied in regions on the edges of the lightguide. In another embodiment of this invention, the light reflecting coating is applied to the tapered region of the collection of coupling lightguides. In a further embodiment of this invention, the blade which cuts through the film, coupling lightguide or lightguide passes through the film during the cutting operation, makes contact with a well comprising reflective ink and the ink is applied to the edge when the blade passes back by the edge of the film. In another embodiment of this invention, a multilayer reflection film, such as ESR film from 3M is disposed adjacent to or in optical contact with the coupling lightguides in a region covering at least the region near the edges of the coupling lightguides, and the ESR film is formed into substantially a 90 bend forming a reflected side to the coupling lightguide. The bending or folding of the reflective film may be achieved during the cutting of the lightguide, coupling lightguides, or tapered region of the coupling lightguides. In this embodiment, the reflective film may be adhered or otherwise physically coupled to the film, coupling lightguide, collection of coupling lightguides, or lightguide and the fold creates a flat reflective surface near the edge to reflect light back into the lightguide, film, coupling lightguide or collection of coupling lightguides. The folding of the reflective film may be accomplished by bending, pressure applied to the film, pressing the lightguide such that a wall or edge bends the reflective film. The reflective film may be disposed such that it extends past the edge prior to the fold. The folding of the reflective film may be performed on multiple stacked edges substantially simultaneously.

The following are more detailed descriptions of various embodiments of this invention illustrated in the Figures.

FIG. 1 is a top view light emitting device 100 of one embodiment of this invention comprising a light input coupler disposed on one side of a film-based lightguide. The light input coupler 101 comprises coupling lightguides 104 and a light source 102 disposed to direct light into the coupling lightguides 104 through the light input surface 103 comprising the input edges of the coupling lightguides 104. The light emitting device 100 further comprises a lightguide region 106 comprising a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as it travels through the lightguide 107. Light is emitted from the lightguide 107 in the light emitting region 108 due to light extraction features (not shown).

Figure 2:
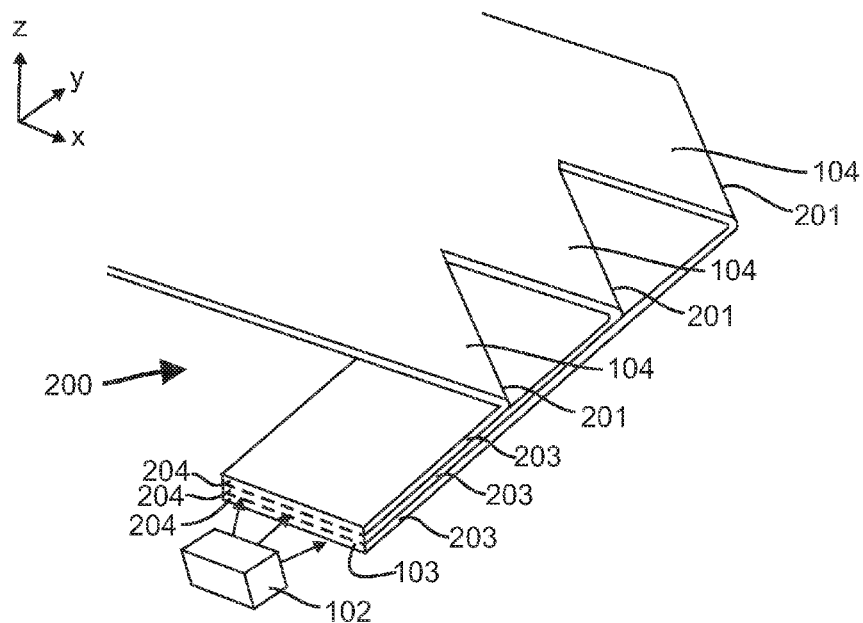
FIG. 2 is a perspective view of one embodiment of this invention light input coupler with coupling lightguides folded in the −y direction.

FIG. 2 is a perspective view of one embodiment of this invention of a light input coupler 200 with coupling lightguides folded in the −y direction. A first portion of light from the light source 102 is directed into the light input surface 103 comprising the input edges 204 of the coupling lightguides 104. A portion of the light from the light source 102 travelling within the coupling lightguides 104 in the +y direction will reflect in the +x and −x directions from the lateral edges 203 of the coupling lightguides 104 and will reflect in the +z and −z directions from the top and bottom surfaces of the coupling lightguides 104 and be directed by reflection at the bends 201 in the coupling lightguides 104 toward the −x direction.

Figure 3:
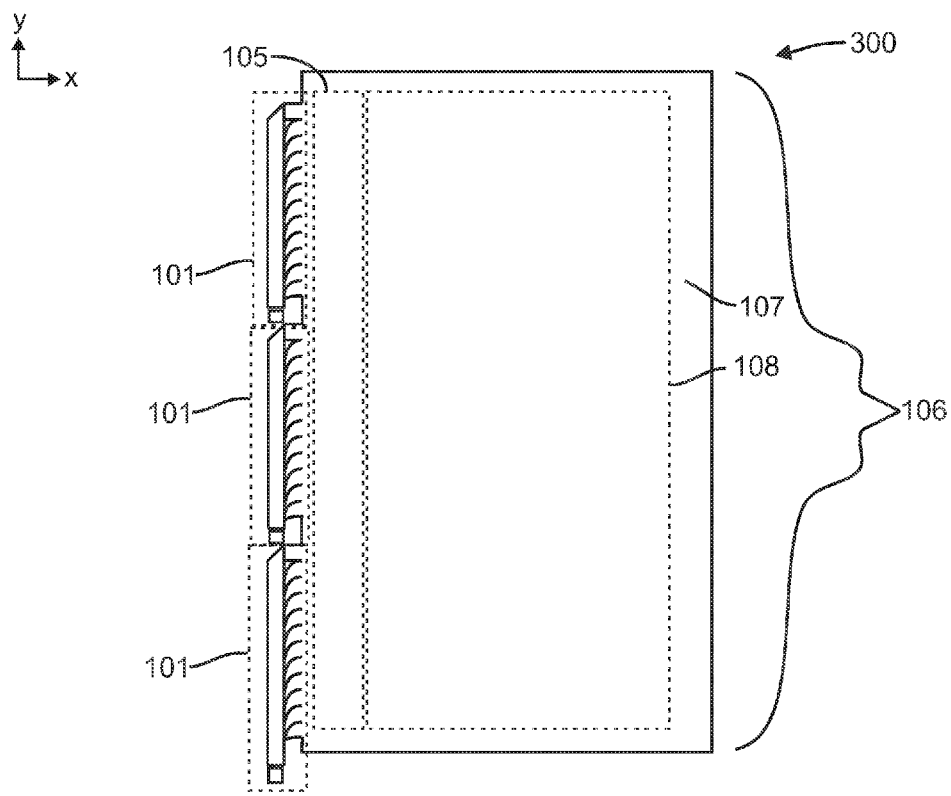
FIG. 3 is a top view of one embodiment of this invention of a light emitting device with three light input couplers on one side of a lightguide.

FIG. 3 is a top view of one embodiment of this invention of a light emitting device 300 with three light input couplers 101 on one side of a lightguide region 106 comprising a light mixing region 105, a lightguide 107, and a light emitting region 108.

Figure 4:
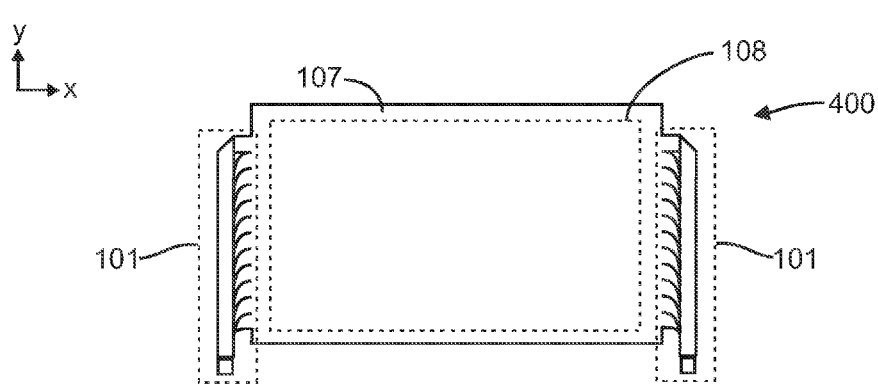
FIG. 4 is a top view of one embodiment of this invention of a light emitting device with two light input couplers disposed on opposite sides of a lightguide.

FIG. 4 is a top view of one embodiment of this invention of a light emitting device 400 with two light input couplers 101 disposed on opposite sides of a lightguide 107.

Figure 5:
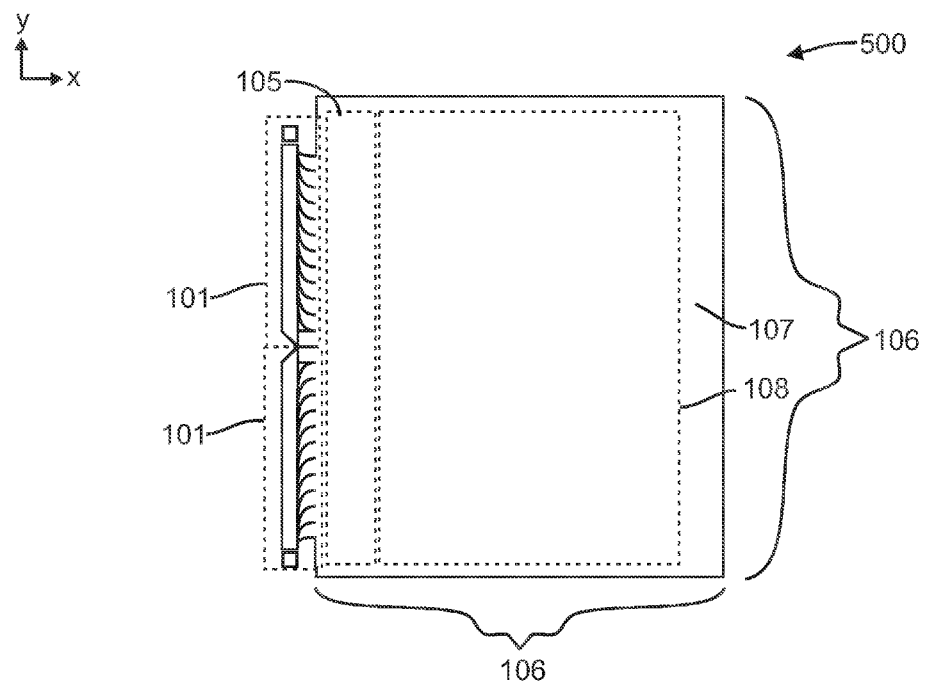
FIG. 5 is a top view of one embodiment of this invention of a light emitting device with two light input couplers disposed on the same side of a lightguide wherein the optical axes of the light sources are oriented substantially toward each other.

FIG. 5 is a top view of one embodiment of this invention of a light emitting device 500 with two light input couplers 101 disposed on the same side of the lightguide region 106 wherein the light sources 102 are oriented substantially with the light directed toward each other in the +y and −y directions.

Figure 6:
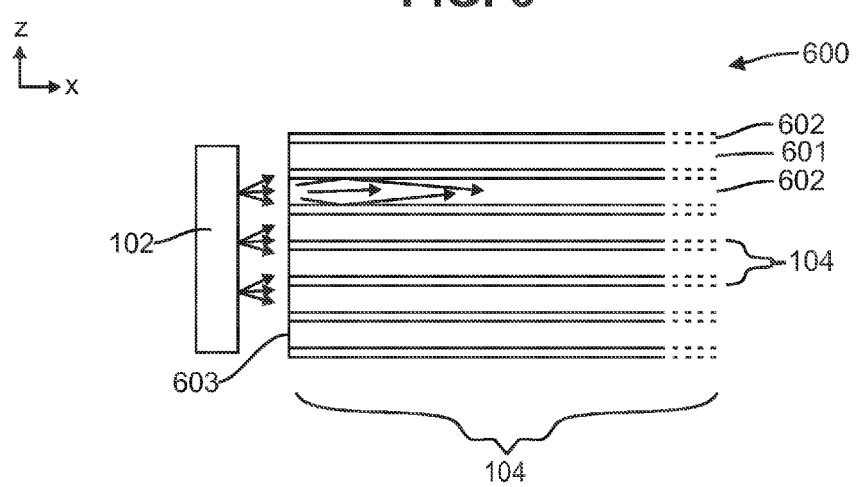
FIG. 6 is a cross-sectional side view of one embodiment of this invention of a light emitting device with a substantially flat light input surface comprised of flat edges of coupling lightguide disposed to receive light from a light source.

FIG. 6 is a cross-sectional side view of one embodiment of this invention of the region near the input surface of a light emitting device 600 with a substantially flat light input surface 603 comprised of flat edges of coupling lightguides 104 disposed to receive light from a light source 102. The coupling lightguides comprise core regions 601 and cladding regions wherein a portion of the light from the light source 102 input into the core region 601 of the coupling lightguides 104 will totally internally reflect from the interface between the core region 601 and the cladding region 602 of the coupling lightguides. FIG. 6 illustrates an embodiment of this invention wherein there is a single cladding region between each core region. In another embodiment of this invention, a light input coupler comprises two cladding regions disposed between each core region.

Figure 7:
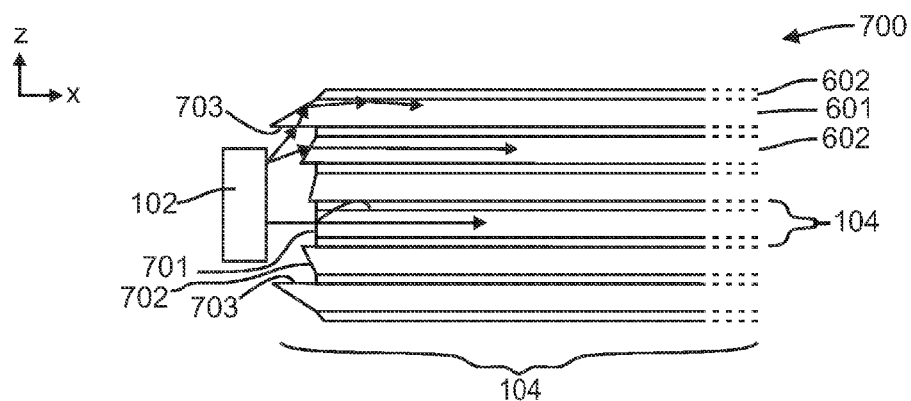
FIG. 7 is a cross-sectional side view of one embodiment of this invention of a light emitting device with a light input coupler with a light input surface with refractive and flat surface features on the light input surface wherein light totally internal reflects on some outer surfaces similar to a hybrid refractive-TIR Fresnel lens.

FIG. 7 is a cross-sectional side view of one embodiment of this invention of the region near the input surface of a light emitting device 700 wherein the light input coupler has a light input surface with flat surface features 701 parallel to the array stack of coupling lightguides, refractive surface features 702, and a flat input surface 703 on the light input surface with a bevel on the opposite side that totally internally reflects a portion of incident light into the coupling lightguides similar to a hybrid refractive-TIR Fresnel lens.

Figure 8:
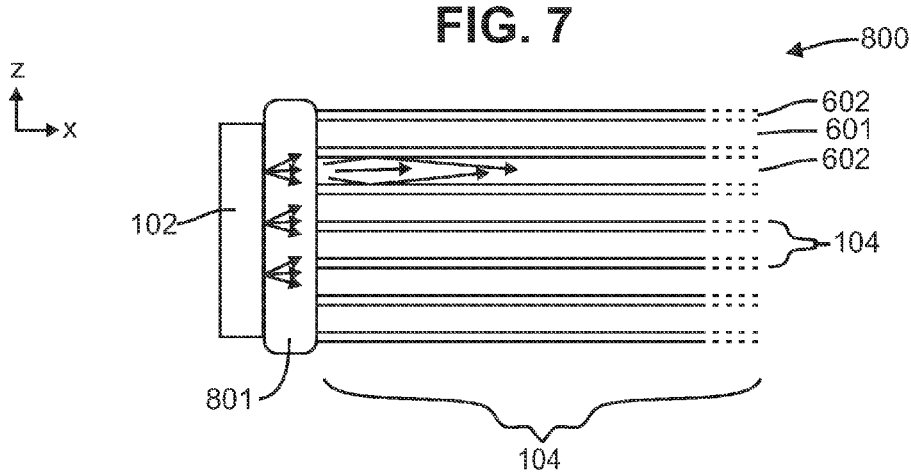
FIG. 8 is a cross-sectional side view of one embodiment of this invention of a light emitting device wherein the coupling lightguides and the light input surface are optically coupled to the light source.

FIG. 8 is a cross-sectional side view of one embodiment of this invention of the region near the input surface of a light emitting device 800 wherein the coupling lightguides 104 are optically coupled to the light source 102 by an optical adhesive 801. In this embodiment, the less of the light from the light source 102 is lost due to reflection (and absorption at the light source or in another region) and the positional alignment of the light source 102 relative to the coupling lightguides 104 is easily maintained.

Figure 9:
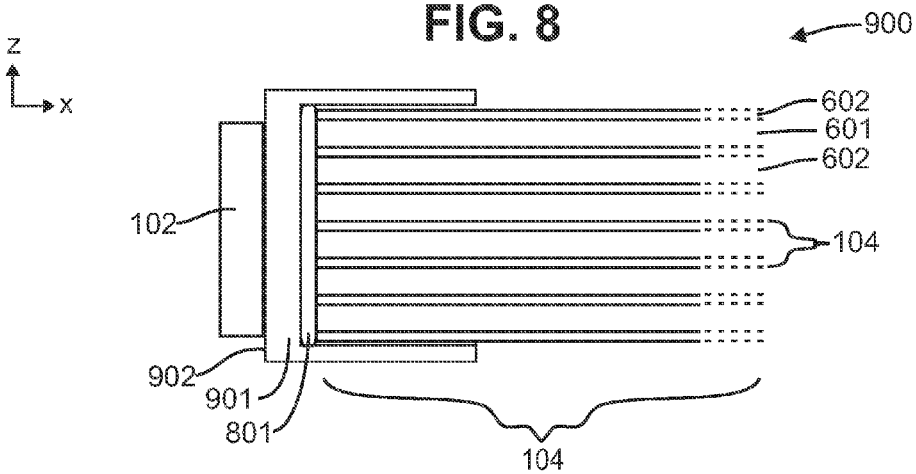
FIG. 9 is a cross-sectional side view of one embodiment of this invention of a light emitting device wherein the coupling lightguides are held in place by a sleeve and the edge surfaces are effectively planarized by an optical adhesive or material such as a gel between the ends of the coupling lightguides and the sleeve with a flat outer surface adjacent the light source.

FIG. 9 is a cross-sectional side view of one embodiment of this invention of the region near the input surface of a light emitting device 900 wherein the coupling lightguides 104 are held in place by a sleeve 901 with a flat outer coupling surface 902 and the edge surfaces of the coupling lightguides 104 are effectively planarized by an optical adhesive 801 between the ends of the coupling lightguides and the sleeve 901 with a flat outer surface 902 adjacent the light source 102. In this embodiment, the surface finish of the cutting of the coupling lightguides is less critical because the sleeve with a flat outer surface is optically coupled to the edges using an optical adhesive which reduces the refraction (and scattering loss) that could otherwise occur at the air-input edge interface of the input edge due to imperfect cutting of the edges. In another embodiment of this invention, an optical gel, fluid or non-adhesive optical material may be used instead of the optical adhesive to effectively planarize the interface at the edges of the coupling lightguides. In one embodiment of this invention, the difference in the refractive index between the optical adhesive, optical gel, fluid, or non-adhesive optical material and the core region of the coupling lightguides is less than one selected from group of 0.6, 0.5, 0.4, 0.3, 0.2, 0.1, 0.05, and 0.01.

Figure 10:
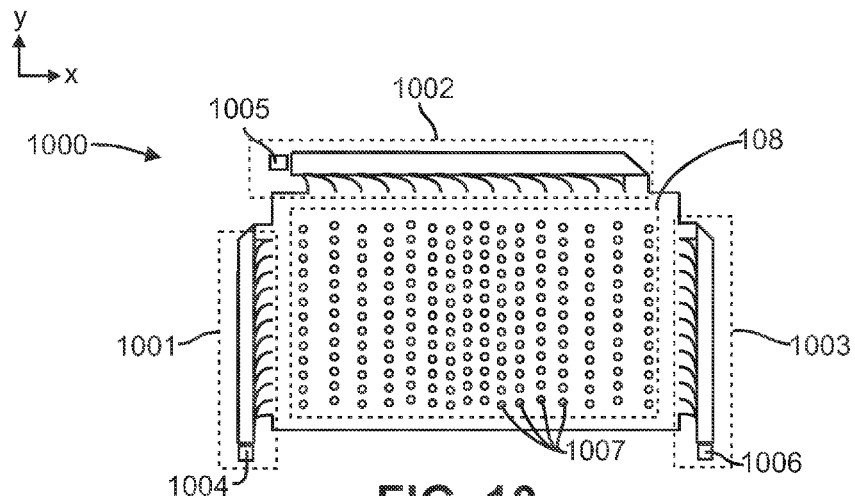
FIG. 10 is a top view of one embodiment of this invention of a backlight emitting red, green, and blue light.

FIG. 10 is a top view of a light emitting backlight 1000 of one embodiment of this invention emitting red, green, and blue light comprising a red light input coupler 1001, a green light input coupler 1002, and a blue light input coupler 1003 disposed to receive light from a red light source 1004, a green light source 1005, and a blue light source 1006, respectively. Light from each of the light input couplers 1001, 1002, and 1003 is emitted from the light emitting region 108 due to the light extraction features 1007 which redirect a portion of the light to angles closer to the surface normal within the lightguide region such that it does not remain within the lightguide and exits the light emitting device 1000. The pattern of the light extraction features may vary in size, space, spacing, pitch, shape, or location within the x-y plane or throughout the thickness of the lightguide in the z direction.

Figure 11:
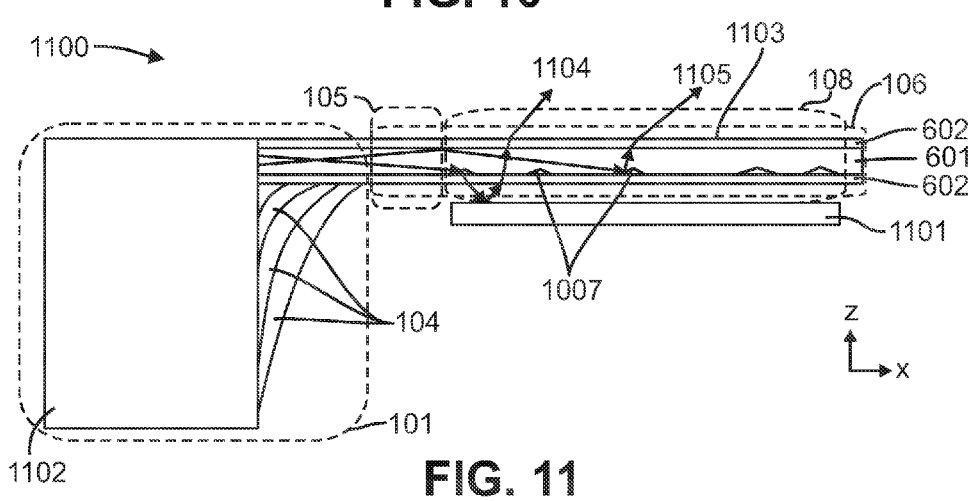
FIG. 11 is a cross-sectional side view of one embodiment of this invention of a light emitting device comprising a light input coupler and lightguide with a reflective optical element disposed adjacent a surface.

FIG. 11 is a cross-sectional side view of a light emitting device 1100 of one embodiment of this invention comprising a light input coupler 101 and lightguide 106 with a reflective optical element 1101 disposed adjacent a surface and a light source 1102 with an optical axis in the +y direction disposed to direct light into the coupling lightguides 104. Light from the light source 1102 travels through the coupling lightguides 104 within the light input coupler 101 and through the light mixing region 105 and light output region 108 within the lightguide region 106. A first portion of light 1104 reaching the light extraction features 1007 is redirected toward the reflecting optical element 1101 at an angle such that it can escape the lightguide, reflect from the reflective optical element 1101, pass back through the lightguide, and exit the lightguide through the light emitting surface 1103 of the light emitting region 108. A second portion of light 1105 reaching the light extraction features 1007 is redirected toward the light emitting surface 1103 at an angle less than the critical angle, escapes the lightguide, and exits the lightguide through the light emitting surface 1103 of the light emitting region 108.

Figure 12:
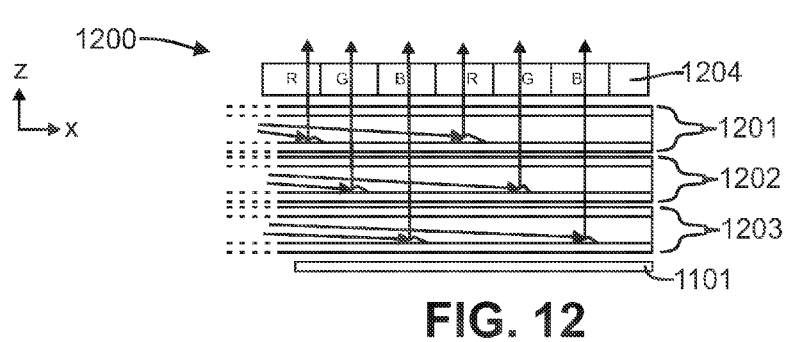
FIG. 12 is a cross-sectional side view of one embodiment of this invention of a display illuminated by red, green, and blue lightguides wherein the locations of the pixels of the display correspond to light emitting regions of the lightguide separated by color.

FIG. 12 is a cross sectional side view of a light emitting display 1200 of one embodiment of this invention illuminated by a red lightguide 1201, a green lightguide 1202, and a blue lightguide 1203 wherein the locations of the pixels of the display panel 1204 with corresponding red, green, and blue pixels correspond to light emitting regions of the lightguide separated by color. In this embodiment, the light extracting features within the red lightguide substantially correspond in the x-y plane to the pixels of the display panel driven to display red information. Similarly, the green and blue light extracting features within the green and blue lightguides substantially correspond in the x-y plane to the pixels of the display panel driven to display green and blue information, respectively. In another embodiment of this invention, the display panel is a spatial light modulator such as a liquid crystal panel, electrophoretic display, MEMs based display, ferroelectric liquid crystal panel, or other spatial light modulating device such as known in the display industry. In another embodiment of this invention, the display panel further comprises color filters within the pixel regions to further reduce crosstalk from lightguide illumination reaching the pixel from neighboring light extracting features. In another embodiment of this invention, the lightguides are optically coupled to each other and the reflecting optical element is a specularly reflecting optical element. In a further embodiment of this invention, the liquid crystal panel is a transparent LCD (such as a vertical alignment type from Samsung Electronics with a transparent cathode) and there is no reflecting optical element on the opposite side of the lightguides than the display panel. In this embodiment, the display and backlight are substantially transparent and "see-through" with an ASTM D1003 total luminous transmittance greater than one selected from the group of 20%, 30%, 40%, and 50%.

Figure 13:
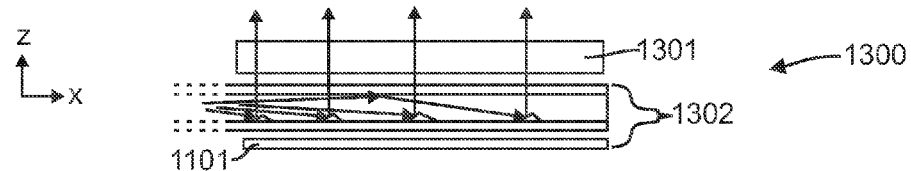
FIG. 13 is a cross-sectional side view of one embodiment of this invention of a color sequential display.

FIG. 13 is a cross-sectional side view of one embodiment of this invention of a color sequential display 1300 comprising a color sequential display panel 1301 and a red, green, and blue color sequential light emitting backlight 1302 comprising a film based lightguide. In this embodiment, red, green, and blue light from red, green and blue light sources is coupled into the lightguide through one or more light input couplers. The light sources are driven in a color sequential mode and the pixel regions of the display panel are switched accordingly to display the desired color information. In one embodiment of this invention, the display panel is a spatial light modulator without color filters.

Figure 14:
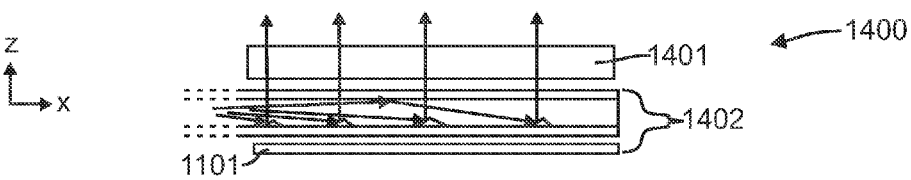
FIG. 14 is a cross-sectional side view of one embodiment of this invention of a spatial display (such as a liquid crystal display).

FIG. 14 is a cross-sectional side view of one embodiment of this invention of a spatial display 1400 comprising a spatial light modulator 1401 and a film-based backlight 1402 emitting light from light sources of different colors. In one embodiment of this invention, the spatial display is a liquid crystal display. In another embodiment of this invention, the spatial light modulator is a liquid crystal panel. In a further embodiment of this invention, the film-based backlight emits light from one selected from the group of red, green, and blue; white and red; red, green, blue, and yellow; red, green, blue, yellow, and cyan; and cyan, yellow, and magenta.

Figure 15:
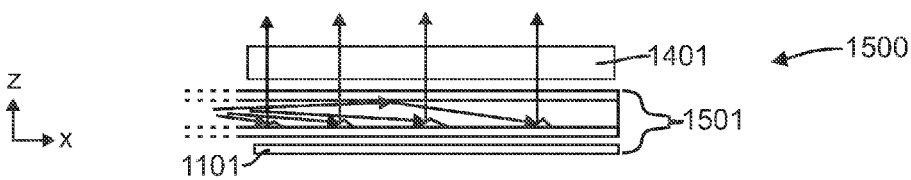
FIG. 15 is a cross-sectional side view of one embodiment of this invention of a display comprising a white light source backlight.

FIG. 15 is a cross-sectional side view of one embodiment of this invention of a spatial display 1500 comprising a spatial light modulator 1401 and a film-based backlight 1501 emitting white light.

Figure 16:
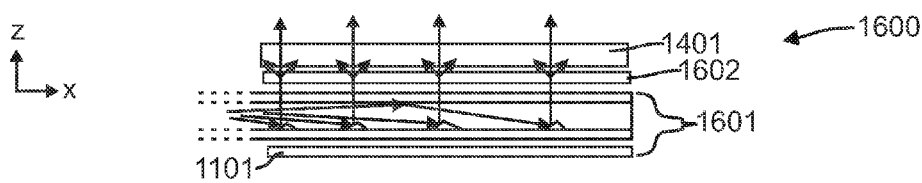
FIG. 16 is a cross-sectional side view of one embodiment of this invention of a display comprising a wavelength converting backlight.

FIG. 16 is a cross-sectional side view of one embodiment of this invention of a spatial display 1600 comprising a spatial light modulator 1401 and a backlight comprising a film-based lightguide 1601 emitting blue light, UV light, or a combination of blue and UV light. A portion of this light passes through a wavelength converting layer 1602 and is converted to light of a second color. In one embodiment of this invention, the wavelength converting layer is a phosphor film. In another embodiment of this invention, the wavelength converting layer is a layer comprising quantum dots.

Figure 17:
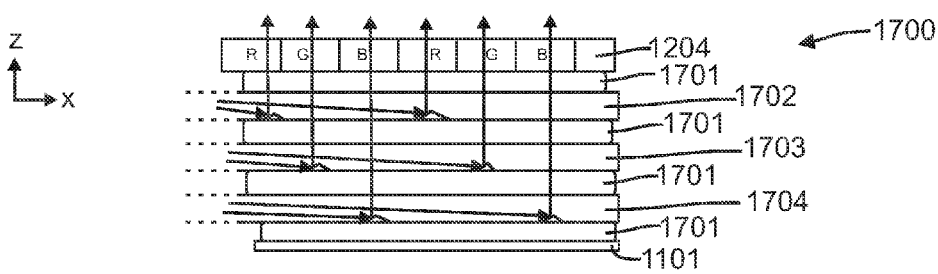
FIG. 17 is a cross-sectional side view of one embodiment of this invention of a display with a backlight comprising a plurality of lightguides emitting different colored light in predetermined spatial patterns.

FIG. 17 is a cross sectional side view of a light emitting display 1700 of one embodiment of this invention illuminated by a backlight comprising a plurality of lightguides emitting different colored light in predetermined spatial patterns. The display panel 1204 is illuminated by a red film-based lightguide 1702, a green film-based lightguide 1703, and a blue film-based lightguide 1704 optically coupled to each other and the display panel 1204 by an optical adhesive 1701 with a refractive index lower than that of the lightguide. In one embodiment of this invention, the refractive index of the optical adhesive is less than the refractive index of the lightguide by one selected from the group of 0.5, 0.4, 0.3, 0.2, 0.1, 0.05 and 0.01. The locations of the pixels of the display panel 1204 with corresponding red, green, and blue pixels correspond to light emitting regions of the lightguide separated by color. In this embodiment, the light extracting features within the red lightguide substantially correspond in the x-y plane to the pixels of the display panel driven to display red information. Similarly, the green and blue light extracting features within the green and blue lightguides substantially correspond in the x-y plane to the pixels of the display panel driven to display green and blue information, respectively. In one embodiment of this invention, the reflective optical element is specularly reflecting. In another embodiment of this invention, the total thickness of the red, green, and blue lightguides and the optical adhesive layers disposed in-between is less than 100 microns. In another embodiment of this invention, the red, green, and blue lightguides are formed by co-extruding the lightguide film layers with low refractive index layers in-between them. Similarly, a yellow lightguide may be added, a cyan lightguide may be added or other combinations of colors of lightguides may be used to increase the color gamut of the display or provide a different predetermined color gamut such one suitable for a night vision compatible display.

Figure 18:
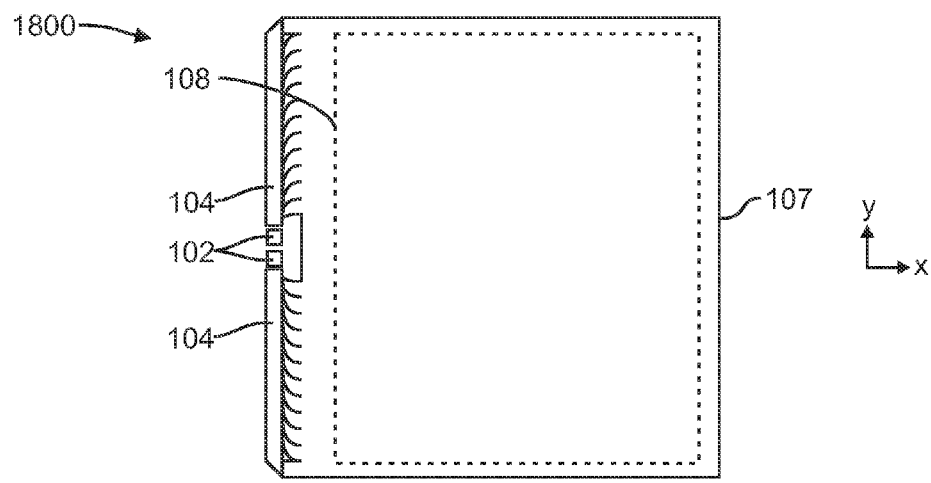
FIG. 18 is a top view of one embodiment of this invention of a light emitting device comprising two light input couplers with light sources on the same edge in the middle region oriented in opposite directions.

FIG. 18 is a top view of one embodiment of this invention of a light emitting device 1800 comprising two light input couplers with two arrays of coupling lightguides 104 and two light sources 102 on the same edge in the middle region oriented in opposite directions.

Figure 19:
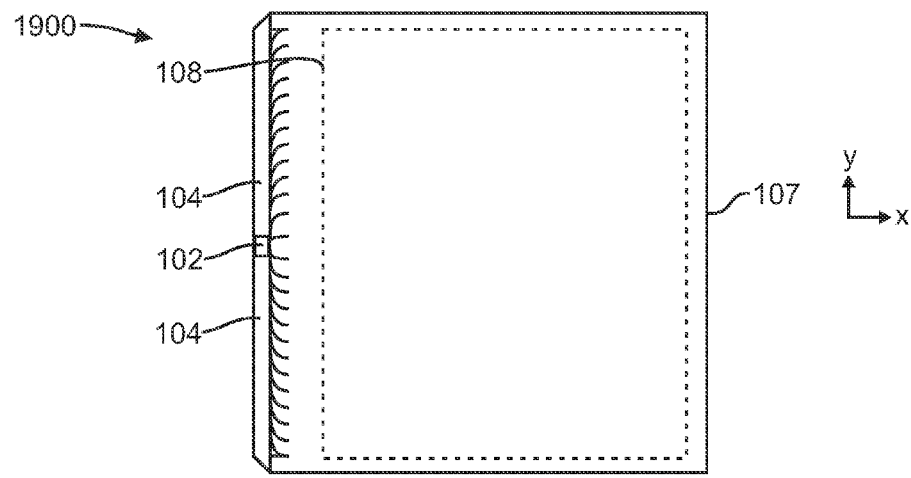
FIG. 19 is a top view of one embodiment of this invention of a light emitting device comprising one light input coupler with coupling lightguide folding toward the −y direction and then folding in the +z direction toward a single light source.

FIG. 19 is a top view of one embodiment of this invention of a light emitting device 1900 comprising one light input coupler with coupling lightguides 104 folded in the +y and −y directions and then folding folded in the +z direction (out of the page in the drawing) toward a single light source 102.

Figure 20:
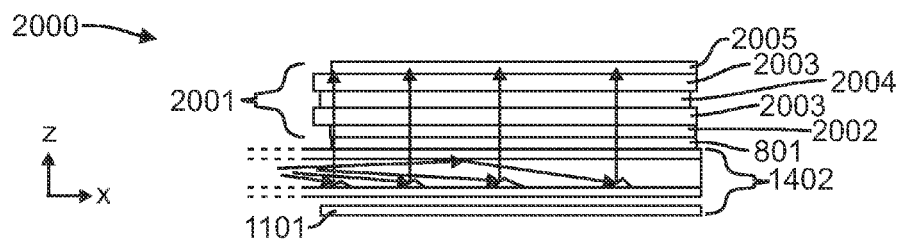
FIG. 20 is a cross-sectional side view of one embodiment of this invention of a display optically coupled to a film lightguide.

FIG. 20 is a cross-sectional side view of one embodiment of this invention of a spatial display 2000 with a rear polarizer 2002 of a liquid crystal display panel 2001 optically coupled to a film-based lightguide backlight 1402 using an optical adhesive 801. The liquid crystal display panel further comprises two display substrates 2003 (glass or a polymer film for example), liquid crystal material 2004, and a front polarizer 2005. The liquid crystal display panel may further comprise other films, materials or layers such as compensation films, alignment layers, color filters, coatings, transparent conductive layers, TFT's, anti-glare films, anti-reflection films, etc. as is commonly known in the display industry.

Figure 21:
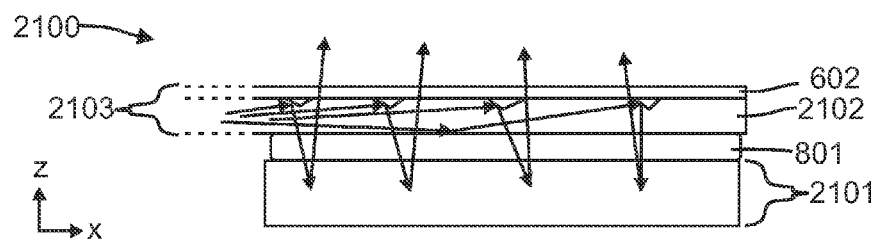
FIG. 21 is a cross-sectional side view of one embodiment of this invention of a light emitting device comprising a front-lit film lightguide optically coupled to a reflective spatial light modulator.

FIG. 21 is a cross-sectional side view of one embodiment of this invention of a spatial display 2100 comprising a frontlight 2103 optically coupled to a reflective spatial light modulator 2101. The frontlight 2103 comprises a film-based lightguide 2102 with light extracting features that direct light to the reflective spatial light modulator 2101 at angles near the surface normal of the reflective spatial light modulator 2101. In one embodiment of this invention, the reflective spatial light modulator is an electrophoretic display, MEMs based display, or reflective liquid crystal display. In one embodiment of this invention, the light extracting features direct at least one selected from the group of 50%, 60%, 70%, 80%, and 90% of the light exiting the frontlight toward the reflective spatial light modulator within an angular range of 60 degrees to 120 degrees from the light emitting surface of the frontlight.

Figure 22:
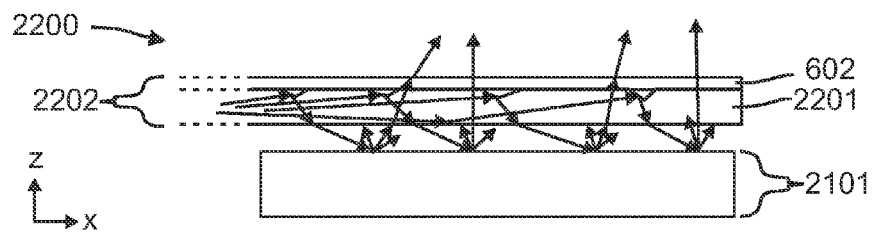
FIG. 22 is a cross-sectional side view of one embodiment of this invention of a light emitting device comprising a front-lit film lightguide disposed adjacent to a reflective spatial light modulator.

FIG. 22 is a cross-sectional side view of one embodiment of this invention of a spatial display 2200 comprising a frontlight 2202 with an air gap in-between a film-based lightguide 2201 disposed adjacent to a reflective spatial light modulator 2101.

Figure 23:
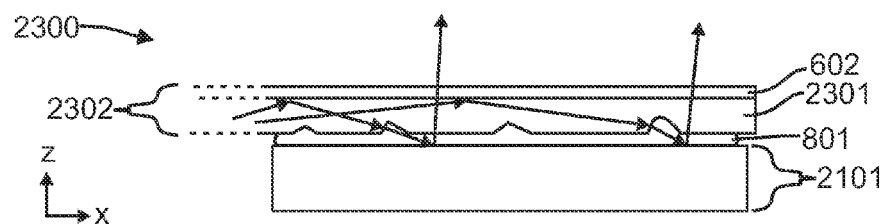
FIG. 23 is a cross-sectional side view of one embodiment of this invention of a light emitting device comprising a front-lit film lightguide optically coupled to a reflective spatial light modulator with light extraction features on side of the lightguide nearest the reflective spatial light modulator.

FIG. 23 is a cross-sectional side view of one embodiment of this invention of a spatial display 2300 comprising a frontlight 2302 with light extraction features on the side of the lightguide nearest the reflective spatial light modulator 2101, optically coupled to a reflective spatial light modulator 2101 using an optical adhesive 801.

Figure 24:
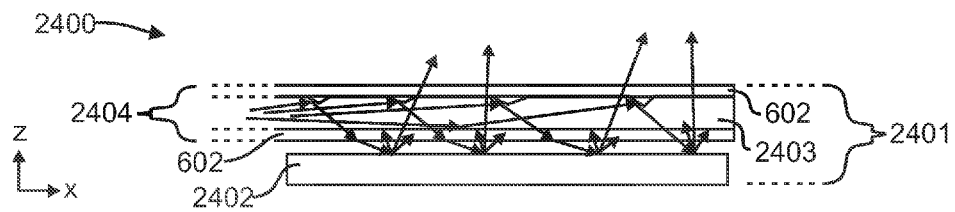
FIG. 24 is a cross-sectional side view of one embodiment of this invention of a light emitting device comprising a front-lit film lightguide disposed within a reflective spatial light modulator.

FIG. 24 is a cross-sectional side view of one embodiment of this invention of a spatial display 2400 comprising a frontlight 2404 comprising a film-based lightguide disposed within a reflective spatial light modulator 2401 comprising a reflective component layer 2402. In one embodiment of this invention, the film-based lightguide is a substrate for the reflective spatial light modulator. In another embodiment of this invention, the film-based lightguide is lightguide wherein the intensity of light for the reflective spatial light modulator is controlled by frustrating the total internal reflection occurring within the film-based lightguide. In another embodiment of this invention the film-based lightguide is lightguide wherein the intensity of light for a transmissive spatial light modulator is controlled by frustrating the total internal reflection occurring within the film-based lightguide.

Figure 25:
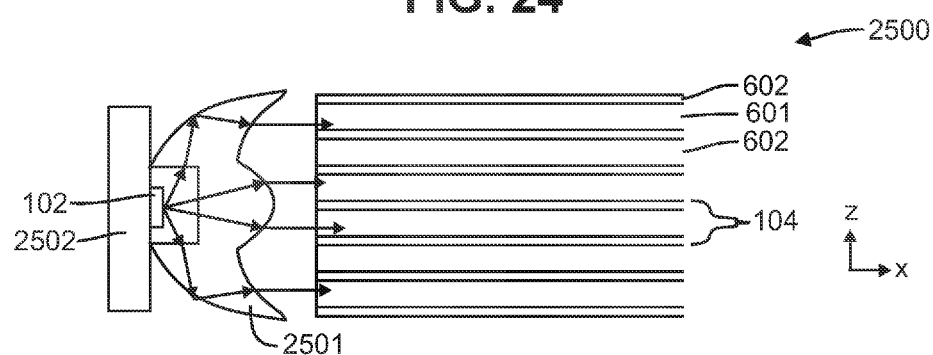
FIG. 25 is a cross-sectional side view of one embodiment of this invention of a light emitting device comprising a light input coupler disposed adjacent a light source with a collimating optical element.

FIG. 25 is a cross-sectional side view of one embodiment of this invention of a light emitting device 2500 comprising a light input coupler disposed adjacent a light source 102 with a substrate 2502 and a collimating optical element 2501. In one embodiment of this invention, the collimating optical element is a lens which refracts and totally internally reflects light to provide collimation.

Figure 26:
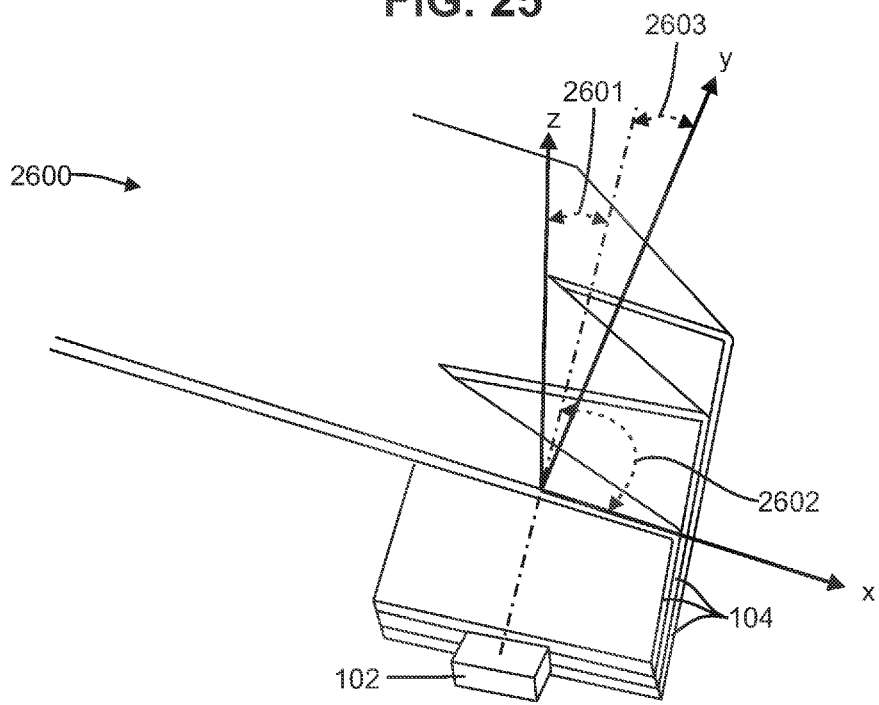
FIG. 26 is a perspective view of one embodiment of this invention of a light emitting device comprising light coupling lightguides and a light source oriented at an angle to the x, y, an z axis.

FIG. 26 is a perspective view of one embodiment of this invention of a light emitting device 2600 comprising a light source 102 and coupling lightguides 104 oriented at an angle to the x, y, and z axis. The coupling lightguides are oriented at a first redirection angle 2601 from the +z axis (light emitting device optical axis), a second redirection angle 2602 from the +x direction, and a third redirection angle 2603 from the +y direction. In another embodiment of this invention, the light source optical axis and the coupling lightguides are oriented at a first redirection angle 2601 from the +z axis (light emitting device optical axis), a second redirection angle 2602 from the +x direction, and a third redirection angle 2603 from the +y direction.

Figure 27:
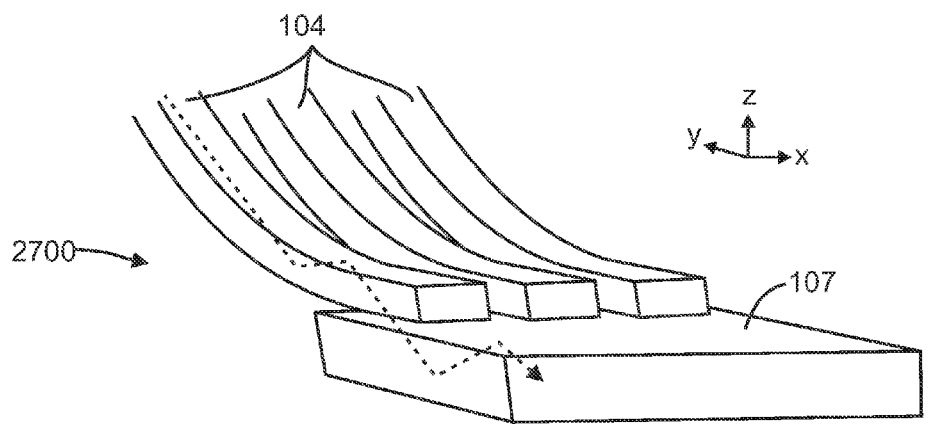
FIG. 27 is a perspective view of one embodiment of this invention of a light emitting device wherein the coupling lightguides are optically coupled to a surface of a lightguide.

FIG. 27 is a perspective view of one embodiment of this invention of a light emitting device 2700 comprising coupling lightguides 104 that are optically coupled to a surface of a lightguide 107. In one embodiment of this invention, the coupling lightguides optically coupled to the lightguide have a thickness less than one selected from the group of 40%, 30%, 20%, 10%, and 5% of the thickness of the lightguide.

Figure 28:
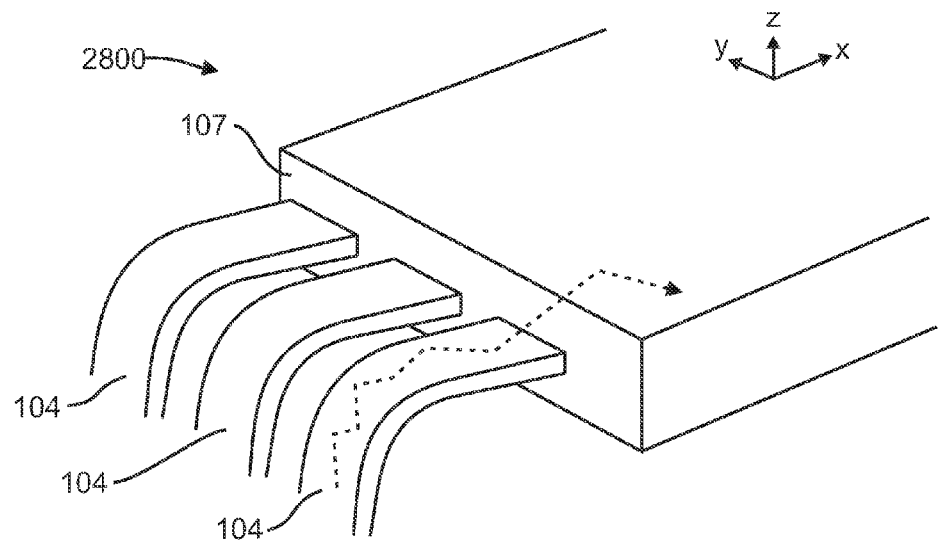
FIG. 28 is a perspective view of one embodiment of this invention of a light emitting device wherein the coupling lightguides are optically coupled to the edge of a lightguide.

FIG. 28 is a perspective view of one embodiment of this invention of a light emitting device 2800 comprising coupling lightguides 104 that are optically coupled to the edge of a lightguide 107. In one embodiment of this invention, the coupling lightguides optically coupled to the edge of the lightguide have a thickness less than one selected from the group of 90%, 80%, 70%, 60%, 50%, 40%, 30%, 20%, and 10% of the thickness of the lightguide.

Figure 29A:
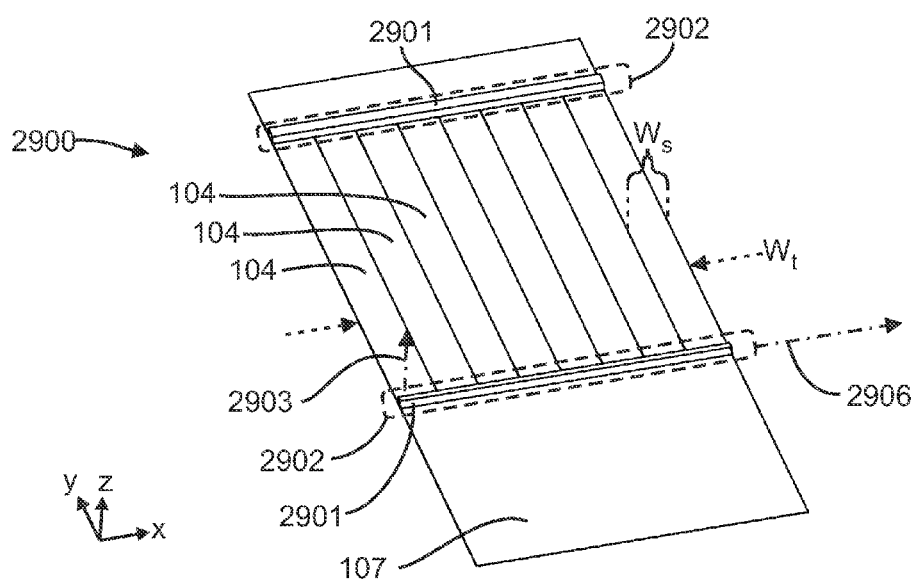
FIG. 29a is a perspective view of one embodiment of this invention of a light input coupler comprising an array of coupling lightguides that are substantially within the same plane as the lightguide and the coupling lightguides are regions of a light transmitting film comprising two linear fold regions.

FIGS. 29a, 29b, 29c, 29d, and 29e illustrate steps comprised in embodiments of this invention for a method of manufacturing a light input coupler and lightguide 2900 using a light transmitting film. FIG. 29a illustrates a lightguide 107 continuously coupled to each coupling lightguide 104 in an array of coupling lightguides 104. The array of coupling lightguides 104 comprise linear fold regions 2902 substantially parallel to each other which further comprise relative position maintaining elements 2901 disposed within the linear fold regions 2902. In the configuration shown in FIG. 29a, the array of coupling lightguides are substantially within the same plane (x-y plane) as the lightguide 107 and the coupling lightguides 104 are regions of a light transmitting film. The total width, $W_t$, of the array of the coupling lightguides in a direction substantially parallel to the linear fold regions is illustrated in FIG. 29a. In the embodiment of this invention illustrated in FIG. 29a, the coupling lightguides have substantially the same width, $W_s$, in a direction 2906 parallel to the linear fold region. The direction 2902 normal to film surface at the linear fold region is shown in FIG. 29a.

Figure 29B:
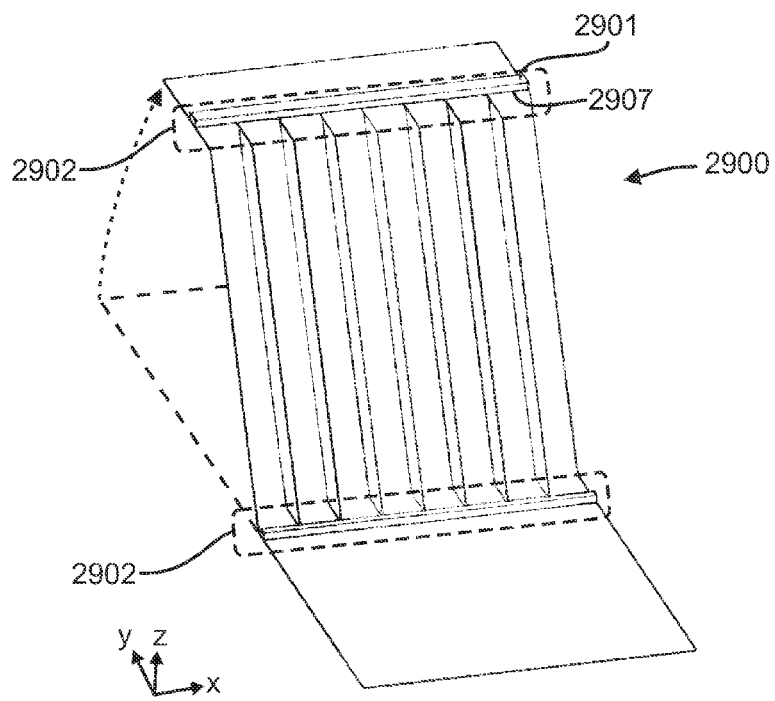
Figure 30A:
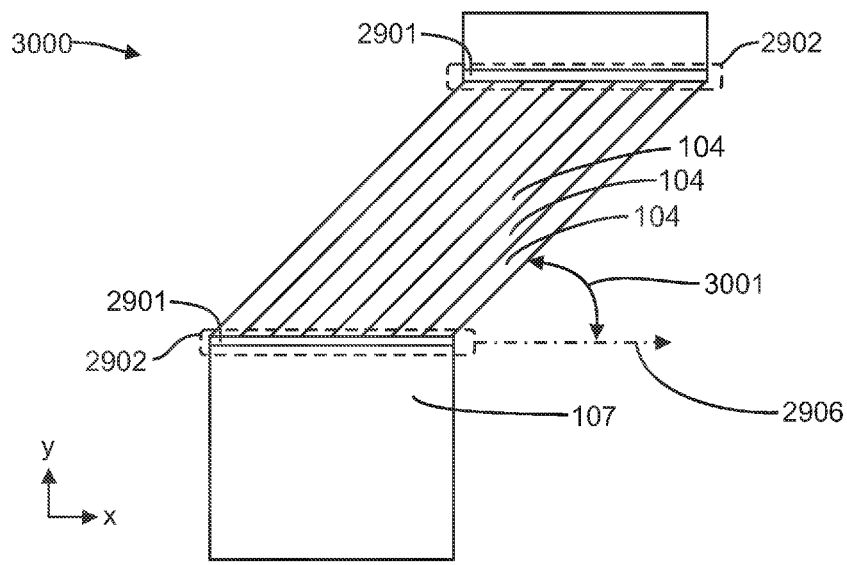
FIG. 30a is a perspective view of one embodiment of this invention of a light input coupler and lightguide comprising two linear fold regions and an array of coupling lightguides that are substantially within the same plane (x-y plane) and the coupling lightguides are regions of a light transmitting film oriented at an angle to the linear fold region.

FIG. 29b illustrates steps comprised in one embodiment of this invention for a method of manufacturing a light input coupler and lightguide 2900. As shown in FIG. 29b, the linear fold regions 2902 are translated with respect to each other from their locations shown in FIG. 29a. The distance between the two linear fold regions 2902 of the array of coupling lightguides 104 in a direction 2903 perpendicular to the light transmitting film surface at the linear fold region 2902 is increased. As shown in FIG. 29b, the distance between the linear fold regions 2902 is increased in the z direction which is parallel to the direction 2903 perpendicular to the light transmitting film surface at the linear fold region 2902. In addition, as shown in FIG. 29b, the distance between the linear fold regions 2902 of the array of coupling lightguides in a direction (y direction) substantially perpendicular to the direction 2906 of the linear fold region and parallel to the light transmitting film surface (x-y plane) at the linear fold region 2902 is decreased.

Figure 29C:
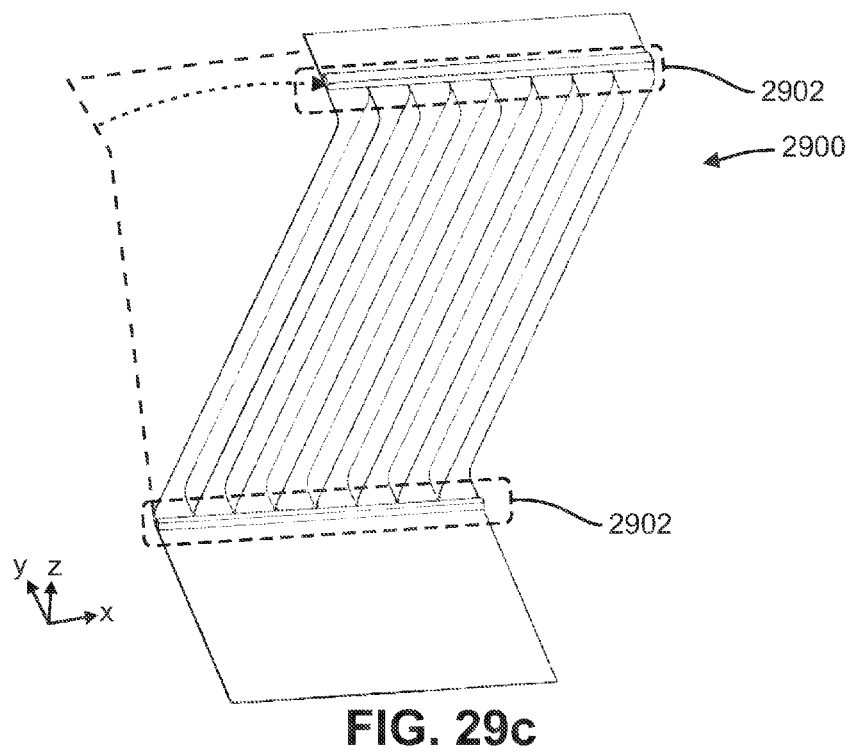
FIG. 29c is a perspective view of an embodiment of this invention for manufacturing an input coupler and lightguide comprising the step of translating one of the linear fold regions of FIG. 29b.

FIG. 29c illustrates steps comprised in one embodiment of this invention for a method of manufacturing a light input coupler and lightguide 2900. As shown in FIG. 29c, the linear fold regions 2902 are translated with respect to each other from their locations shown in FIG. 29b. In FIG. 29c, the distance between the linear fold regions 2902 of the array of coupling lightguides 104 in a direction (x direction) substantially parallel to the direction 2906 of the linear fold regions and parallel to the light transmitting film surface at the linear fold regions 2902 is increased.

Figure 29D:
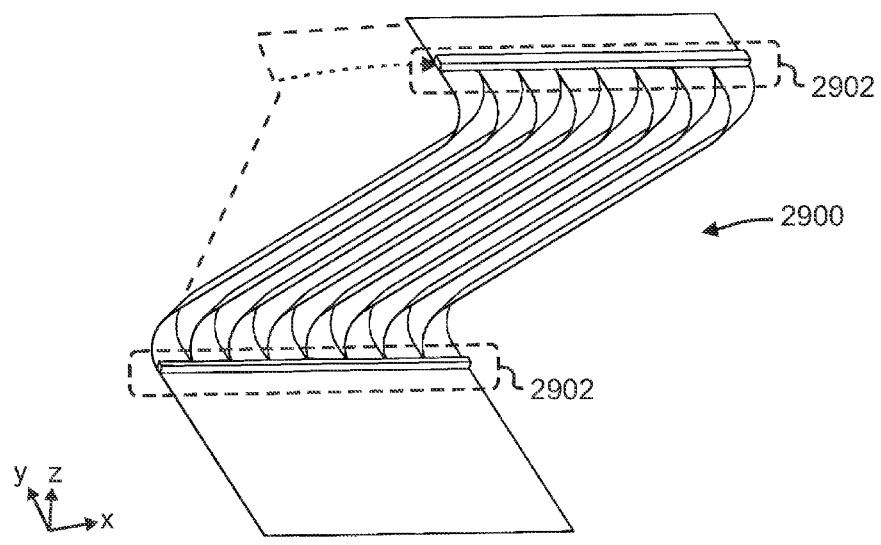
FIG. 29d is a perspective view of an embodiment of this invention for manufacturing an input coupler and lightguide comprising the step of translating one of the linear fold regions of FIG. 29c.

FIG. 29d illustrates further translation of the linear fold regions 2902 where the distance between the linear fold regions 2902 of the array of coupling lightguides 104 in a direction (x direction) substantially parallel to the direction 2906 of the linear fold regions and parallel to the light transmitting film surface at the linear fold regions 2902 is increased and the distance between the linear fold regions 2902 of the array of coupling lightguides 104 in a direction 2903 perpendicular to the light transmitting film surface at the linear fold region 2902 is decreased.

Figure 29E:
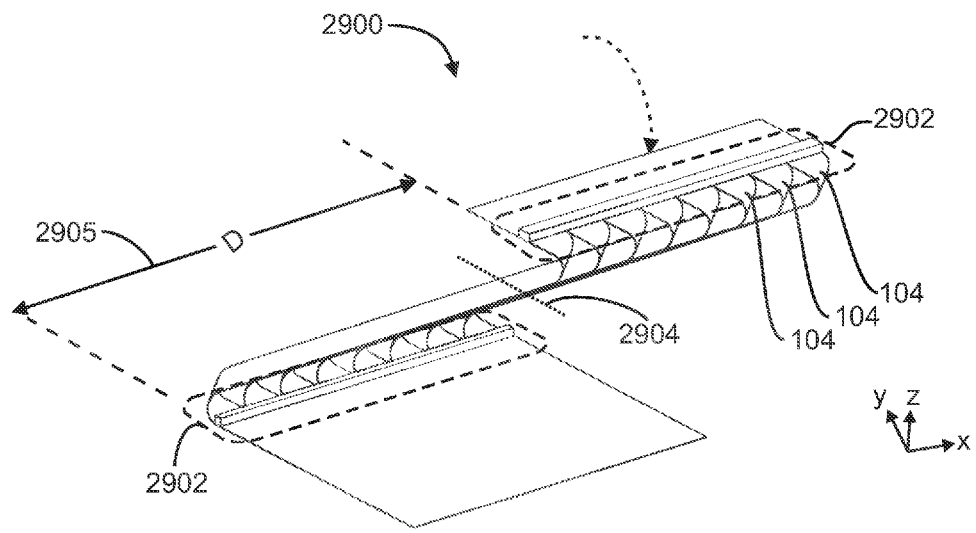
FIG. 29e is a perspective view of an embodiment of this invention for manufacturing an input coupler and lightguide comprising the step of translating one of the linear fold regions of FIG. 29d.

FIG. 29e illustrates steps comprised in one embodiment of this invention for a method of manufacturing a light input coupler and lightguide 2900. As shown in FIG. 29e, the linear fold regions 2902 are translated with respect to each other from their locations shown in FIG. 29d. In FIG. 29e, the distance between the linear fold regions 2902 of the array of coupling lightguides 104 in a direction (x direction) substantially parallel to the direction 2906 of the linear fold regions and parallel to the light transmitting film surface at the linear fold regions 2902 is further increased from that of FIG. 29d and the distance between the linear fold regions 2902 of the array of coupling lightguides 104 in a direction 2903 perpendicular to the light transmitting film surface at the linear fold region 2902 is further decreased over that of FIG. 29d.

As a result of the translations of the linear fold regions 2902 in the steps of FIG. 29a-e, the linear fold regions are separated by a distance, D. In one embodiment of this invention, the distance, D, is at least the total width, $W_t$, of the array of the coupling lightguides in a direction substantially parallel to the first linear fold region. In another embodiment of this invention, $D=N \times W_s$, where the array of coupling lightguides 104 comprise a number, N, of coupling lightguides that have substantially the same width, $W_s$, in a direction parallel to the first linear fold region.

The array of coupling lightguides 104 disposed substantially one above another may be cut along a first direction 2904 to provide an array of input edges of the coupling lightguides 104 that end in substantially one plane perpendicular to the linear fold regions. The cut may be at other angles and may include angled or arcuate cuts that can provide collimation or light redirection of light from a light source disposed to couple light into the input surface of the coupling lightguides.

In a further embodiment of this invention, a method of manufacturing a light input coupler and lightguide comprises the step of cutting the coupling lightguides such that two input couplers and two lightguides are formed from the same film. For example, by cutting the coupling lightguides along the direction 2904, the light transmitting film can be divided into two parts, each comprising a light input coupler and lightguide.

FIGS. 30a, 30b, 30c, and 30d illustrate steps comprised in one embodiment of this invention for a method of manufacturing a light input coupler and lightguide 3000 using a light transmitting film. FIG. 30a illustrates a top view of a lightguide 107 continuously coupled to each coupling lightguide 104 in an array of coupling lightguides 104. The array of coupling lightguides 104 comprise linear fold regions 2902 substantially parallel to each other which further comprise relative position maintaining elements 2901 disposed within the linear fold regions 2902. In the embodiment illustrated in FIG. 30a, the coupling lightguides are oriented at an angle 3001 to the direction 2906 parallel to the linear fold region 2902. Furthermore, in the configuration shown in FIG. 30a, the array of coupling lightguides are substantially within the same plane (x-y plane) as the lightguide 107 and coupling lightguides 104 are regions of a light transmitting film.

Figure 30B:
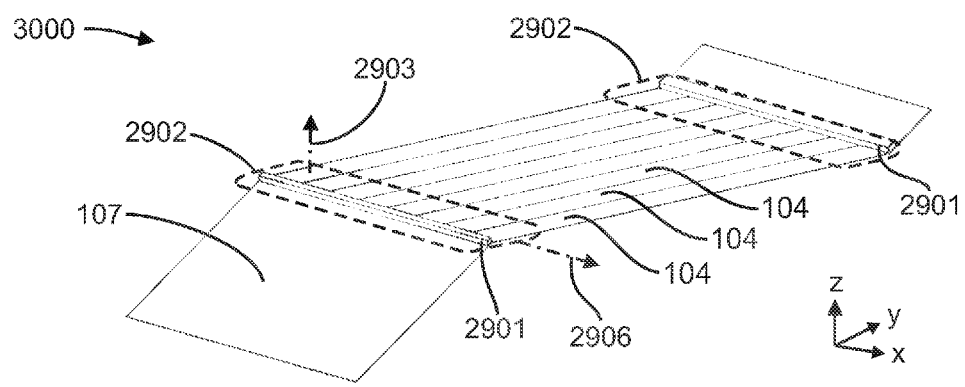
Figure 30C:
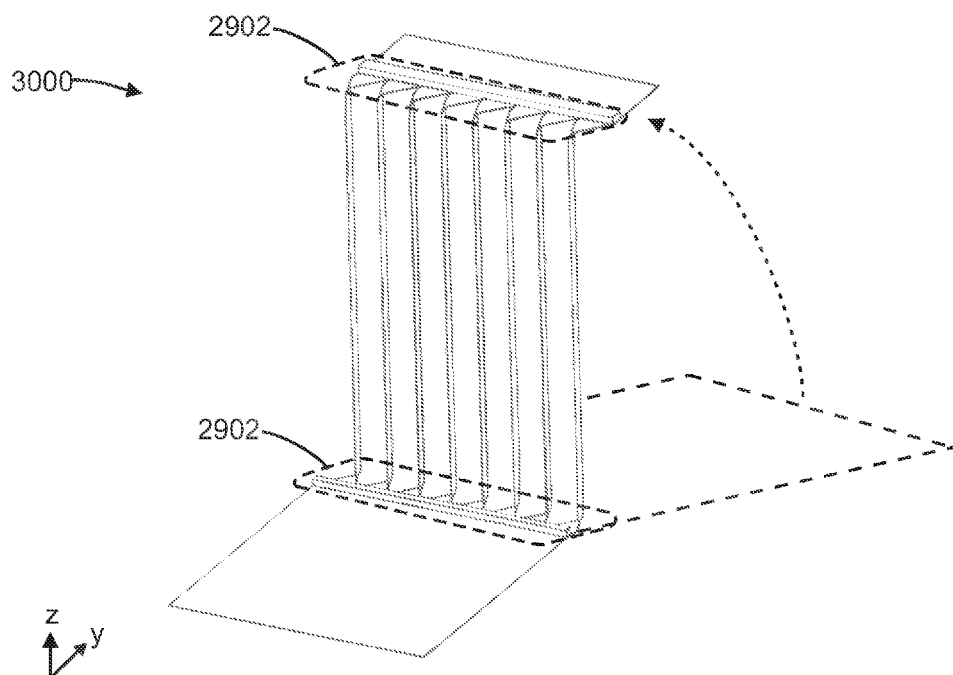
FIG. 30c is a perspective view of an embodiment of this invention for manufacturing an input coupler and lightguide comprising the step of translating one of the linear fold regions of FIG. 30b.

FIG. 30b illustrates a perspective view of light input coupler and lightguide 3000 of FIG. 30a. FIG. 30c illustrates steps comprised in one embodiment of this invention for a method of manufacturing a light input coupler and lightguide 3000. As shown in FIG. 30c, the linear fold regions 2902 are translated with respect to each other from their locations shown in FIG. 30b. The distance between the two linear fold regions 2902 of the array of coupling lightguides 104 in a direction 2903 perpendicular to the light transmitting film surface at the linear fold region 2902 is increased. As shown in FIG. 30c, the distance between the linear fold regions 2902 is increased in the z direction which is parallel to the direction 2903 perpendicular to the light transmitting film surface at the linear fold region 2902. In addition, as shown in FIG. 30c, the distance between the linear fold regions 2902 of the array of coupling lightguides in a direction (y direction) substantially perpendicular to the direction 2906 of the linear fold region and parallel to the light transmitting film surface (x-y plane) at the linear fold region 2902 is decreased.

Figure 30D:
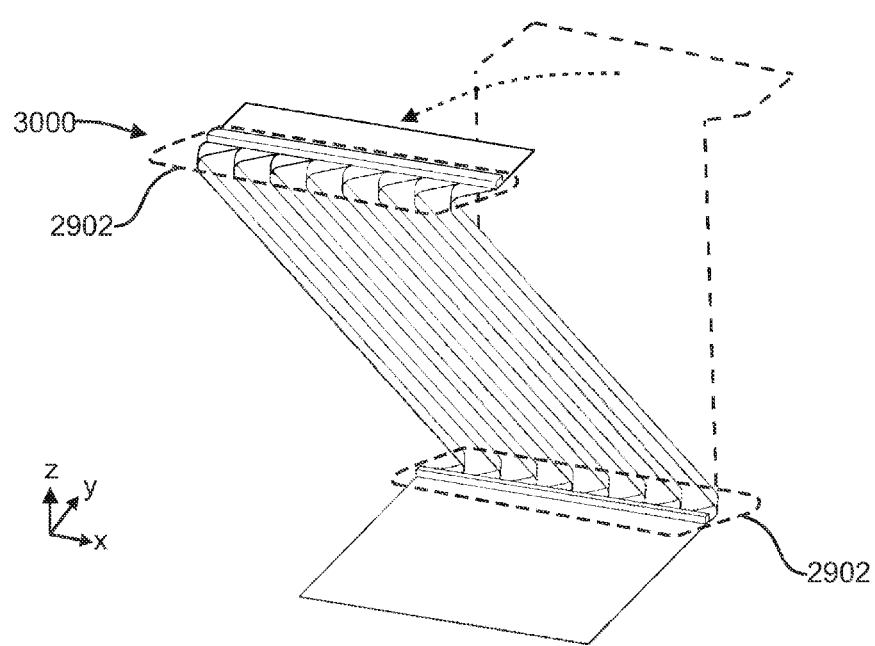
FIG. 30d is a perspective view of an embodiment of this invention for manufacturing an input coupler and lightguide comprising the step of translating one of the linear fold regions of FIG. 30c.

FIG. 30d illustrates further step of the embodiment of this invention for a method of manufacturing a light input coupler and lightguide 3000 comprising a translation of the linear fold regions 2902 where the distance between the linear fold regions 2902 of the array of coupling lightguides 104 in a direction (x direction) substantially parallel to the direction 2906 of the linear fold regions and parallel to the light transmitting film surface at the linear fold regions 2902 is increased and the distance between the linear fold regions 2902 of the array of coupling lightguides 104 in a direction 2903 perpendicular to the light transmitting film surface at the linear fold region 2902 is decreased.

Figure 30E:
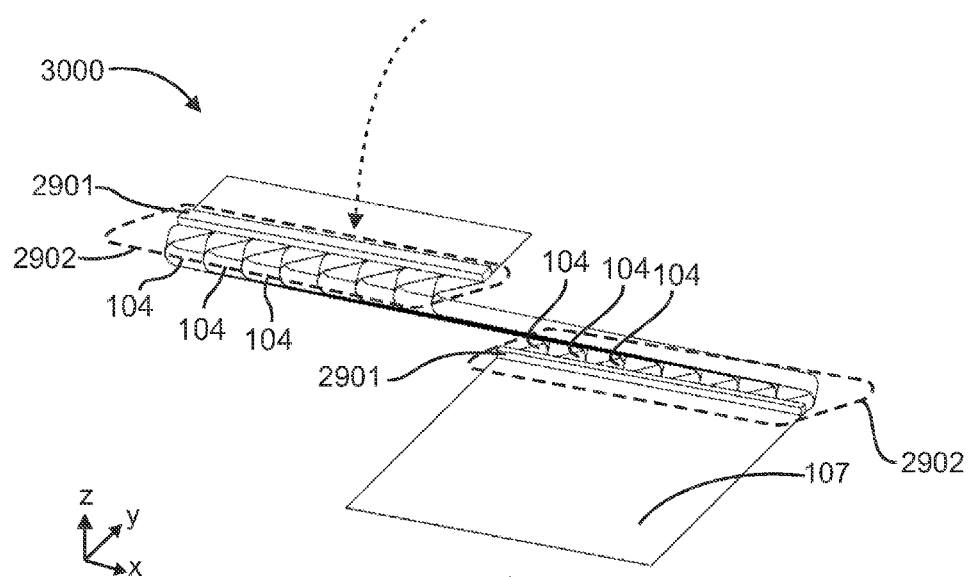
FIG. 30e is a perspective view of an embodiment of this invention for manufacturing an input coupler and lightguide comprising the step of translating one of the linear fold regions of FIG. 30d.

FIG. 30e illustrates steps comprised in one embodiment of this invention for a method of manufacturing a light input coupler and lightguide 3000. As shown in FIG. 30e, the linear fold regions 2902 are translated with respect to each other from their locations shown in FIG. 30d. In FIG. 30e, the distance between the linear fold regions 2902 of the array of coupling lightguides 104 in a direction (x direction) substantially parallel to the direction 2906 of the linear fold regions and parallel to the light transmitting film surface at the linear fold regions 2902 is further increased from that of FIG. 30d and the distance between the linear fold regions 2902 of the array of coupling lightguides 104 in a direction 2903 perpendicular to the light transmitting film surface at the linear fold region 2902 is further decreased over that of FIG. 30d.

Figure 31:
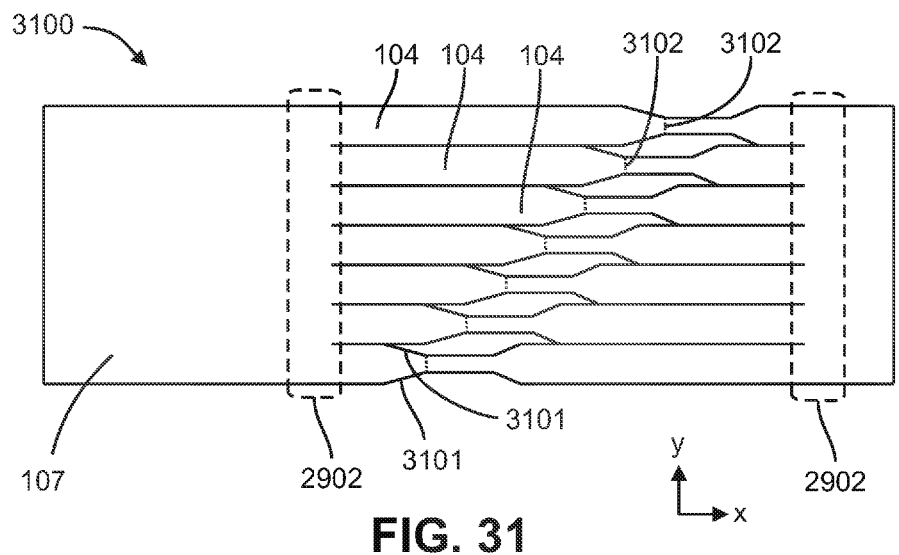
FIG. 31 illustrates a top view of an embodiment of this invention of an input coupler and lightguide wherein the array of coupling lightguides has non-parallel regions.

FIG. 31 illustrates a top view of a further embodiment of this invention of an input coupler and lightguide 3100 wherein the array of coupling lightguides has non-parallel regions. In another embodiment of this invention, the coupling lightguides are not substantially parallel such that they have regions wherein the angles between the edges vary by more than about 2 degrees. In the embodiment illustrated in FIG. 31, the coupling lightguides 104 have non-parallel sections with a tapered region 3101 and linear fold regions 2902. In another embodiment of this invention, the coupling lightguides have non-constant separations. In another embodiment of this invention, a method for manufacturing an input coupler and lightguide 3100 with a tapered region 3101 of the coupling lightguides 104 includes the step of cutting the coupling lightguides in regions 3102 disposed near the tapered region 3101 such that when the array of coupling lightguides are folded, they overlap to form a profiled, non-planar input surface that is capable of redirecting light input through the light input surface so that the light is more collimated.

Figure 32:
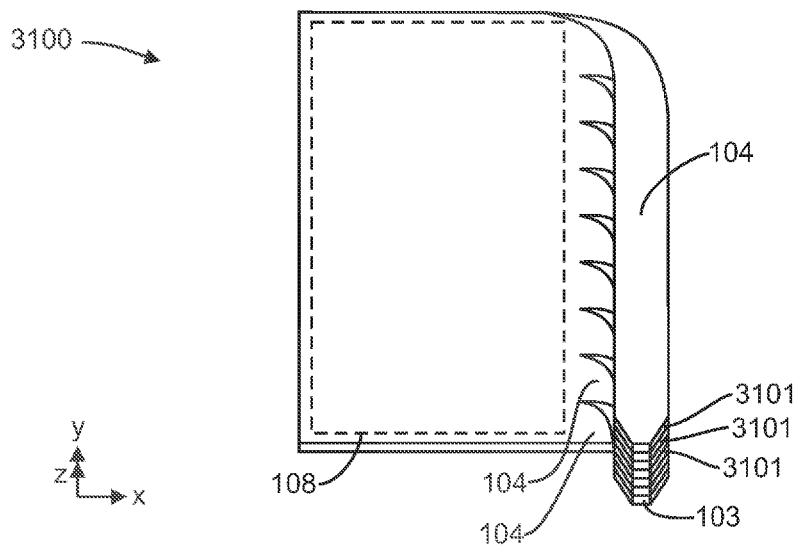
FIG. 32 is a perspective view of the input coupler and lightguide of FIG. 31.

FIG. 32 is an angled top view of the input coupler and lightguide 3100 of FIG. 31 where the coupling lightguides 104 have been cut in regions 2904 disposed near the tapered 3101 region and folded such that they overlap to form a profiled, non-planar light input surface 103 that is capable of redirecting light input through the light input surface so that the light is more collimated.

Figure 33:
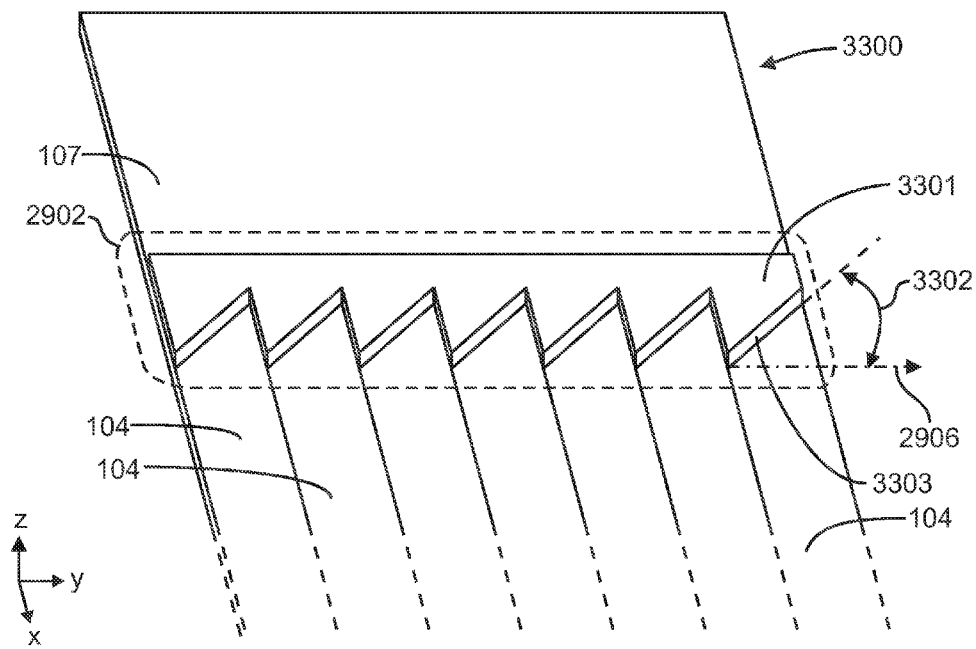
FIG. 33 is a perspective view of one embodiment of this invention of a light input coupler and lightguide comprising a relative position maintaining element disposed proximal to a linear fold region.

FIG. 33 is a perspective view of one embodiment of this invention of a light input coupler and lightguide comprising a relative position maintaining element 3301 disposed proximal to a linear fold region. In this embodiment, the relative position maintaining element 3301 has a cross-sectional edge in a plane (x-y plane as shown) parallel to the light transmitting film surface disposed proximal to the linear fold region 2902 that comprises a substantially linear section 3303 oriented at an angle 3302 greater than 10 degrees to the direction 2906 parallel to the linear fold region 2902 for at least one coupling lightguide 104. In one embodiment of this invention, the linear fold region comprises a substantially linear section at an angle of about 45 degrees to a direction parallel to the linear fold region.

Figure 34:
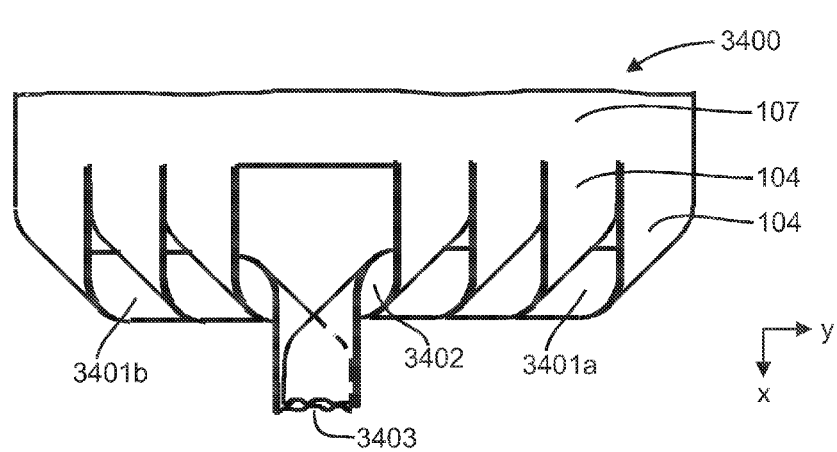
FIG. 34 is a top view of an embodiment of this invention a light input coupler and lightguide comprising bundles of coupling lightguides that are folded along a 45 degree fold and recombined in the same plane as the film-based lightguide.
Figure 35A:
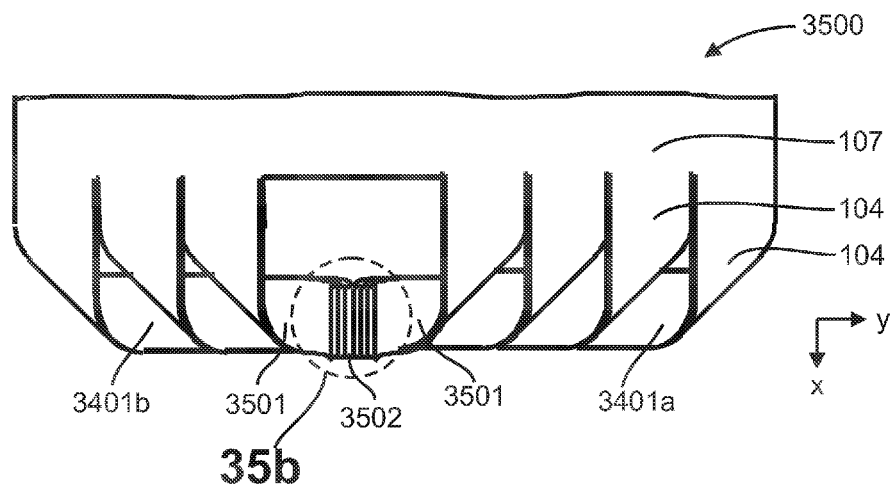
FIG. 35a is a top view of an embodiment of this invention a light input coupler and lightguide comprising bundles of coupling lightguides that are folded upwards (+z direction) and combined in a stack that is substantially perpendicular to the plane of the film-based lightguide.
Figure 35B:
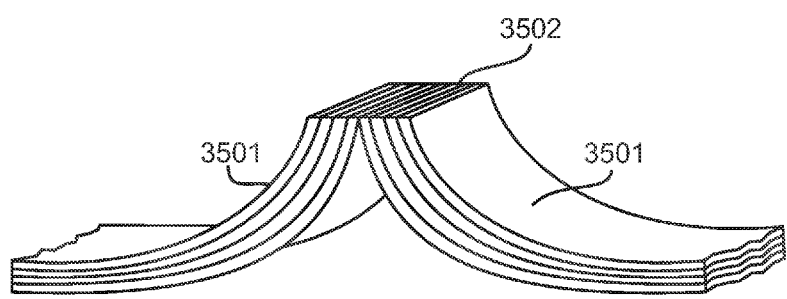
FIG. 35b is a magnification of the region of FIG. 35a comprising the upward folds of the coupling lightguides.

FIGS. 34 and 35 illustrate top views of further embodiments of this invention of light input couplers and lightguides where the volume and/or size of the overall device is reduced while retaining TIR light transfer from the light source into the lightguide. In FIG. 34, a light input coupler and lightguide 3400 comprises bundles of coupling lightguides (3401a, 3401b) that are folded along a 45 degree fold 3402 and recombined 3403 in the same plane as the film-based lightguide 107. In FIGS. 35a and 35b, a light input coupler and lightguide 3500 comprises bundles (3401a, 3401b) that are folded upwards 3501 (+z direction) and combined in a stack 3502 that is substantially perpendicular to the plane of the film-based lightguide 107. In another embodiment of this invention, the bundles may be folded downwards (−z direction).

EXAMPLES

Preferred embodiments of the present invention are illustrated in the following Example(s). The following examples are given for the purpose of illustrating the invention, but not for limiting the scope or spirit of the invention.

In one embodiment of this invention, coupling lightguides are formed by cutting strips at one or more ends of a film which forms coupling lightguides (strips) and a lightguide region (remainder of the film). On the free end of the strips, the strips are bundled together into an arrangement much thicker than the thickness of the film itself. On the other end, they remain physically and optically attached and aligned to the larger film lightguide. The film cutting is achieved by stamping, laser-cutting, mechanical cutting, water jet cutting, local melting or other film processing methods. Preferably the cut results in an optically smooth surface to promote total internal reflection of the light to improve light guiding through the length of the strips. A light source is coupled to the bundled strips. The strips are arranged so that light travels through them via total internal reflection and is transferred into the film lightguide portion. The bundle input of the strips has a thickness much greater than the film light guide region so the light source can more efficiently transfer light into the lightguide compared to trying to couple to the edge or top of the film. The strips can be melted or mechanically forced together at the input to improve coupling efficiency. If the bundle. is square shaped, the length of one of its sides I, is given by I·$\sqrt{w \times tI}$ where w is the total width of the lightguide input edge and t is the thickness of the film. For example, a 0.1 mm thick film with 1m edge would give a square input bundle with dimensions of 1 cm×1 cm. Considering these dimensions, the bundle is much easier to couple light into compared to coupling along the length of the film when using typical light sources (e.g. incandescent, fluorescent; metalhalide, xenon and LED sources). The improvement in coupling efficiency and cost is particularly pronounced at film thicknesses below 0.25 mm, because that thickness is approximately the size of many LED and laser diode chips. Therefore, it would be difficult and/or expensive to manufacture micro-optics to efficiently couple light into the film edge from an LED chip because of the étendue and manufacturing tolerance limitations. Also, it should be noted that the folds in the slots are not creases but rather have some radius of curvature to allow effective light transfer. Typically the fold radius of curvature will be at least ten times the thickness of the film.

An example of the present invention that can be brought to practice is given here. The assembly starts with 0.25 mm thick polycarbonate film that is 40 cm wide and 100 cm long. A cladding layer of a lower refractive index material of approximately 0.01 mm thickness is disposed on the top and bottom surface of the film. The cladding layer can be added by coating or co-extruding a material with lower refractive index onto the film core. One edge of the film is mechanically cut into 40 strips of 1 cm width using a sharp cutting tool such as a razor blade. The edges of the slots are then exposed to a flame to improve the smoothness for optical transfer. The slots are combined into a bundle of approximately 1 cm×1 cm cross-section. To the end of the bundle a number of different types of light sources can be coupled (e.g. xenon, metal halide, incandescent, LED or Laser). Light travels through the bundle into the film and out of the image area. Light may be extracted from the film lightguide by laser etching into the film, which adds a surface roughness that results in frustrated total internal reflectance. Multiple layers of film can be combined to make multi-color or dynamic signs.

An example of one embodiment of the present invention that has been brought to practice is described here. The apparatus began with a 15 mil thick polycarbonate film which was 18 inches wide and 30 inches long. The 18 inch edge of the film is cut into 0.25 inch wide strips using an array of razor blades. These strips are grouped into three six inch wide sets of strips, which are further split into two equal sets that were folded towards each other and stacked separately into 0.165" by 0.25" stacks. Each of the three pairs of stacks was then combined together in the center in the method shown in FIG. 35 to create a combined and singular input stack of 0.33" by 0.25" size. An LED module, MCE LED module from Cree Inc., is coupled into each of the three input stacks. Light emitted from the LED enters the film stack with an even input, and a portion of this light remains within each of the 15 mil strips via total internal reflections while traveling through the strip. The light continues to travel down each strip as they break apart in their separate configurations, before entering the larger lightguide. Furthermore, a finned aluminum heatsink was placed down the length of each of the three coupling apparatuses to dissipate heat from the LED. This assembly shows a compact design that can be aligned in a linear array, to create uniform light.

A method to manufacture one embodiment of this invention of a backlight comprising three film-based lightguides is as follows. Three layers of thin film lightguides (<250 microns) are laminated to each other with a layer of lower refractive index material between them (e.g. methyl-based silicone PSA). Then, an angled beam of light, ions or mechanical substance (i.e. particles and/or fluid) patterns lines or spots into the film. If necessary, a photosensitve material should be layered on each material beforehand. The angle of the beam is such that the extraction features on the layers have the proper offset. The angle of the beam is dictated by the lightguide thickness and the width of the pixels and is given by $$\theta = \tan^{-1}\left(\frac{t}{w}\right),$$

where θ is the relative angle of light to the plane of the lightguide, t is the lightguide and cladding thickness and w is the width of the pixels. Ideally the extraction features direct the light primarily in a direction toward the intended pixel to minimize cross-talk.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof. This application is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

What is claimed is:

1. A method of manufacturing a lightguide and light input coupler comprising a light transmitting film with a lightguide region continuously coupled to each coupling lightguide in an array of coupling lightguides, the array of coupling lightguides comprising a first linear fold region and a second linear fold region, said method comprising the steps of:
   a. increasing a distance between the first linear fold region and the second linear fold region of the array of coupling lightguides coupled to the lightguide region in a direction perpendicular to a light transmitting film surface at the first linear fold region;
   b. decreasing the distance between the first linear fold region and the second linear fold region of the array of coupling lightguides in a direction substantially perpendicular to the first linear fold region and parallel to the light transmitting film surface at the first linear fold region;
   c. increasing the distance between the first linear fold region and the second linear fold region of the array of coupling lightguides in a direction substantially parallel to the first linear fold region and parallel to the light transmitting film surface at the first linear fold region; and
   d. decreasing the distance between the first linear fold region and the second linear fold region of the array of coupling lightguides in a direction perpendicular to the light transmitting film surface at the first linear fold region such that the array of coupling lightguides are bent, disposed substantially one above another, and aligned substantially parallel to each other.

2. The method of claim 1 wherein the second linear fold region is substantially parallel to the first linear fold region.

3. The method of claim 1 wherein the steps are performed while substantially maintaining a first position of the array of coupling lightguides at the first linear fold region relative to each other in a direction parallel to the first linear fold region and substantially maintaining a second position of the array of coupling lightguides at the second linear fold region relative to each other in a direction parallel to the second linear fold region.

4. The method of claim 1 wherein the distance between the first linear fold region and the second linear fold region of the array of coupling lightguides is increased by at least a distance, D, equal to a total width, $W_r$, of the array of the coupling lightguides in a direction substantially parallel to the first linear fold region.

5. The method of claim 4 wherein the array of coupling lightguides comprises a number, N, of coupling lightguides that have substantially a same width, $W_s$, in a direction parallel to the first linear fold region and $D=N \times W_s$.

6. The method of claim 1 wherein steps (c) and (d) occur following steps (a) and (b).

7. The method of claim 1 wherein steps (a) and (b) occur substantially simultaneously and steps (c) and (d) occur substantially simultaneously.

8. The method of claim 1 wherein the array of coupling lightguides are bent with a radius of curvature at least 10 times a thickness of the array of coupling lightguides.

9. The method of claim 1 wherein a thickness of the light transmitting film is less than 500 microns.

10. The method of claim 1 wherein a width of at least one coupling lightguide of the array of coupling lightguides is less than 20 millimeters.

11. The method of claim 2 wherein the first linear fold region and the second linear fold region of the array of coupling lightguides are each disposed proximal to a relative position maintaining element during steps (a), (b), (c), and (d).

12. The method of claim 11 wherein the first linear fold region and the second linear fold region are held proximal to the relative position maintaining element by at least one selected from the group of magnetic grips, mechanical grips, clamps, screws, mechanical adhesion, chemical adhesion, dispersive adhesion, diffusive adhesion, electrostatic adhesion, vacuum holding, or an adhesive.

13. The method of claim 11 wherein a first relative position maintaining element disposed proximal to the first linear fold region of the array of coupling lightguides has a cross-sectional edge in a plane parallel to the light transmitting film at the first linear fold region substantially linear and parallel to the first linear fold region, and a second relative position maintaining element disposed proximal to the second linear fold region of the array of coupling lightguides has a cross-sectional edge in a plane parallel to the light transmitting film at the second linear fold region substantially linear and parallel to the linear fold region.

14. The method of claim 13 wherein the cross-sectional edge of the first relative position maintaining element disposed proximal to the first linear fold region of the array of coupling lightguides remains substantially parallel to the cross-sectional edge of the second relative position maintaining element disposed proximal to the second linear fold region of the array of coupling lightguides during steps (a), (b), (c), and (d).

15. The method of claim 11 wherein the relative position maintaining element disposed proximal to the first linear fold region has a cross-sectional edge in a plane parallel to the light transmitting film surface disposed proximal to the first linear fold region that comprises a substantially linear section in a region proximal at least one coupling lightguide of the array of coupling lightguides oriented at an angle greater than 10 degrees to the first linear fold region.

16. The method of claim 15 wherein the cross-sectional edge of the relative position maintaining element is a guiding edge that guides the bend of the at least one coupling lightguide.

17. The method of claim 1 further comprising cutting through the array of coupling lightguides disposed substantially one above another to provide an array of coplanar input edges of the array of the coupling lightguides.

18. The method of claim 1 wherein the array of coupling lightguides are oriented at an angle greater than 0 degrees and less than 90 degrees to the first linear fold region.

19. The method of claim 1 further comprising holding the array of coupling lightguides disposed substantially one above another in a fixed relative position by at least one selected from the group of clamping the array of coupling lightguides together, restricting movement by disposing walls or a housing around one or more surfaces of the overlapping array of coupling lightguides, and adhering the array of coupling lightguides together or to one or more surfaces.

20. A method of manufacturing a lightguide and light input coupler comprising a light transmitting film with a lightguide region continuously coupled to each coupling lightguide in an array of coupling lightguides, the array of coupling lightguides comprising a first linear fold region and a second linear fold region, said method comprising the steps of:
 a. forming an array of coupling lightguides physically coupled to a lightguide region in a light transmitting film;
 b. increasing a distance between the first linear fold region and the second linear fold region of the array of coupling lightguides in a direction perpendicular to a light transmitting film surface at the first linear fold region;
 c. decreasing the distance between the first linear fold region and the second linear fold region of the array of coupling lightguides in a direction substantially perpendicular to the first linear fold region and parallel to the light transmitting film surface at the first linear fold region;
 d. increasing the distance between the first linear fold region and the second linear fold region of the array of coupling lightguides in a direction substantially parallel to the first linear fold region and parallel to the light transmitting film surface at the first linear fold region; and
 e. decreasing the distance between the first linear fold region and the second linear fold region of the array of coupling lightguides in a direction perpendicular to the light transmitting film surface at the first linear fold region such that the array of coupling lightguides are bent and disposed substantially one above another.

21. The method of claim 20 wherein the array of coupling lightguides have substantially parallel lateral edge surfaces and upon completion of steps (a), (b), (c), and (d) are aligned substantially parallel to each other.

22. The method of claim 20 wherein the array of coupling lightguides have substantially non-parallel lateral edge surfaces.

23. A method of manufacturing a lightguide and light input coupler comprising a light transmitting film with a lightguide region optically and physically coupled to each coupling lightguide in an array of coupling lightguides, the array of coupling lightguides comprising a first fold region and a second fold region, said method comprising the steps of:
 a. translating the first fold region and the second fold region away from each other in a direction substantially perpendicular to a surface of the light transmitting film at the first fold region such that the first fold region and the second fold region move toward each other in a plane parallel to the surface at the first fold region; and
 b. translating the first fold region and the second fold region away from each other in a direction parallel to the first fold region such that the first fold region and the second fold region move toward each other in a direction substantially perpendicular to the surface at the first fold region such that the array of coupling lightguides are bent and disposed substantially one above another.

* * * * *